(12) United States Patent
Hayashida et al.

(10) Patent No.: US 10,824,223 B2
(45) Date of Patent: Nov. 3, 2020

(54) DETERMINATION APPARATUS AND DETERMINATION METHOD

(71) Applicant: FUJITSU LIMITED, Kawasaki-shi, Kanagawa (JP)

(72) Inventors: Naoko Hayashida, Yokohama (JP); Kenji Suzuki, Ibaraki (JP); Hideaki Kuzuoka, Ibaraki (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 16/222,331

(22) Filed: Dec. 17, 2018

(65) Prior Publication Data
US 2019/0187780 A1 Jun. 20, 2019

(30) Foreign Application Priority Data
Dec. 19, 2017 (JP) .................. 2017-242963

(51) Int. Cl.
| | |
|---|---|
| G06F 3/01 | (2006.01) |
| G06T 13/40 | (2011.01) |
| G06K 9/00 | (2006.01) |
| A63F 13/00 | (2014.01) |
| G06T 7/50 | (2017.01) |

(52) U.S. Cl.
CPC .............. *G06F 3/011* (2013.01); *A63F 13/00* (2013.01); *G06K 9/00335* (2013.01); *G06T 13/40* (2013.01); *G06F 3/012* (2013.01); *G06F 3/015* (2013.01); *G06T 7/50* (2017.01); *G06T 2207/10028* (2013.01)

(58) Field of Classification Search
CPC .... G06F 3/011; G06F 2203/011; G06F 3/015; G06F 3/012; A63F 13/00; A63F 13/211; A63F 13/212; A63F 13/25; A63F 13/5255; G06K 9/00335; G06T 13/40; G06T 2207/10028; G06T 7/50
See application file for complete search history.

(56) References Cited

U.S. PATENT DOCUMENTS

| | | | |
|---|---|---|---|
| 6,559,870 B1 | 5/2003 | Anabuki et al. | |
| 2009/0058862 A1* | 3/2009 | Finn ........................ | G06T 13/40 345/473 |
| 2011/0004481 A1* | 1/2011 | Jones ...................... | G06F 3/011 705/1.1 |
| 2011/0007142 A1 | 1/2011 | Perez et al. | |

(Continued)

FOREIGN PATENT DOCUMENTS

| | | |
|---|---|---|
| JP | 2000-250677 | 9/2000 |
| JP | 2000-276610 | 10/2000 |

(Continued)

*Primary Examiner* — Abhishek Sarma
(74) *Attorney, Agent, or Firm* — Fujitsu Patent Center

(57) ABSTRACT

A determination apparatus includes one or more memories, and one or more processors configured to perform, on the basis of data detected by a sensor that measures a first user who operates a first avatar, detection of a first behavior of the first user, determine a first type of behavior corresponding to the detected first behavior by referring to information indicating correspondence between a plurality of behaviors and a plurality of types of behavior, and perform, on the basis of a behavior tendency of the first user determined in accordance with the first type of behavior, control of an output to an environment where the first avatar exists.

19 Claims, 44 Drawing Sheets

(56) References Cited

U.S. PATENT DOCUMENTS

| | | | |
|---|---|---|---|
| 2011/0148916 A1* | 6/2011 | Blattner | G06Q 10/107 345/619 |
| 2011/0279461 A1* | 11/2011 | Hamilton, II | G06F 3/04815 345/473 |
| 2012/0304126 A1* | 11/2012 | Lavigne | G06F 3/011 715/848 |
| 2013/0257877 A1* | 10/2013 | Davis | A63F 13/12 345/473 |
| 2016/0134840 A1* | 5/2016 | McCulloch | H04N 7/157 348/14.03 |
| 2016/0267699 A1* | 9/2016 | Borke | G02B 30/56 |

FOREIGN PATENT DOCUMENTS

| | | |
|---|---|---|
| JP | 2012-533120 | 12/2012 |
| JP | 2013-078969 | 5/2013 |
| WO | 2011005784 | 1/2011 |

\* cited by examiner

| ELECTROMYOGRAPHY DATA TABLE ||||||
|---|---|---|---|---|
| DATABASE RECORDING TIME | SENSOR RECORDING TIME | USER NAME | INFORMATION COLLECTION APPARATUS ID | ELECTROMYOGRAPHIC ACTIVITY VALUE (EMG($\mu$V)) |
| ⋮ | ⋮ | ⋮ | ⋮ | ⋮ |
| JULY 27,2015 11:00:01.035 | JULY 27,2015 11:00:01.000 | userA | TcA_c3_zygomaticus(cheek) | 33.9 |
| JULY 27,2015 11:00:01.040 | JULY 27,2015 11:00:01.010 | userA | TcA_c3_orbicularis(under eye) | 52.0 |
| JULY 27,2015 11:01:05.069 | JULY 27,2015 11:00:04.000 | userA | TcA_c3_corrugator(brow) | 20.2 |
| ⋮ | ⋮ | ⋮ | ⋮ | ⋮ |

| HEAD POSE DATA TABLE ||||||
|---|---|---|---|---|
| DATABASE RECORDING TIME | SENSOR RECORDING TIME | USER NAME | INFORMATION COLLECTION APPARATUS ID | HEAD POSE DATA (POSITION AND ANGLES) |
| ⋮ | ⋮ | ⋮ | ⋮ | ⋮ |
| JULY 27,2015 11:00:01.030 | JULY 27,2015 11:00:00.000 | userA | TcA_c1 | (0,18,-10),(0,0,0) |
| JULY 27,2015 11:00:03.0.25 | JULY 27,2015 11:00:02.000 | userA | TcA_c1 | (0,18,-10),(0,0,1) |
| JULY 27,2015 11:01:05.069 | JULY 27,2015 11:00:04.000 | userA | TcA_c1 | (0,18,-10),(0,0,2.5) |
| ⋮ | ⋮ | ⋮ | ⋮ | ⋮ |

FIG. 7C

DEPTH SENSOR DATA FILE TABLE 830

| DATABASE RECORDING TIME | SENSOR RECORDING START TIME | SENSOR RECORDING END TIME | USER NAME | INFORMATION COLLECTION APPARATUS ID | DEPTH SENSOR DATA RECORDING FILE URI |
|---|---|---|---|---|---|
| JULY 27, 2015 11:00:01.030 | JULY 27, 2015 11:00:00.000 | JULY 27, 2015 11:00:01.000 | userA | TcA_c2 | 20150712_0011100_00.exf |
| JULY 27, 2015 11:00:03.0.25 | JULY 27, 2015 11:00:02.000 | JULY 27, 2015 11:00:03.000 | userA | TcA_c2 | 20150712_0011102_00.exf |
| JULY 27, 2015 11:01:05.069 | JULY 27, 2015 11:00:04.000 | JULY 27, 2015 11:01:05.000 | userA | TcA_c2 | 20150712_0011104_00.exf |
| ... | ... | ... | ... | ... | ... |

FIG. 9A

| DATABASE RECORDING TIME | RECORDING START TIME | RECORDING UPDATE TIME | BEHAVING AVATAR NAME | BEHAVIOR LOG TYPE LABEL | UPDATE MONITORING TARGET | UPDATE STATUS | RECORDING START TIME DATA | RECORDING UPDATE TIME DATA | SOCIAL BEHAVIOR LOG RECORDING ID REFERENCE VALUE |
|---|---|---|---|---|---|---|---|---|---|
| ... | ... | ... | ... | ... | ... | ... | ... | ... | ... |
| FEB. 21, 2017 12:00:01.010 | | | AV1 | Orientation_Face | Bone_Head | NO CHANGE RECORDED | NULL | NULL | |
| FEB. 21, 2017 12:00:02.010 | FEB. 21, 2017 12:00:00.000 | FEB. 21, 2017 12:00:02.000 | AV1 | Orientation_Upperbody | Bone_Chest | CHANGE BEING RECORDED | ((2.24, 1.17, 1.68), (-2.40, 3.61, 2.74)) | ((2.24, 1.17, 1.68), (-2.40, 20, 2.74)) | 100 |
| FEB. 21, 2017 12:00:02.020 | FEB. 21, 2017 12:00:00.000 | FEB. 21, 2017 12:00:02.000 | AV1 | Lean_Upperbody | Bone_Spine | CHANGE BEING RECORDED | ((-1.07, 0.87, 1.99), (22.35, -4.21, -7.15)) | ((-1.07, 0.87, 1.99), (25, -4.21, -7.15)) | 101 |
| FEB. 21, 2017 12:00:03.010 | | | AV1 | Orientation_Upperbody | Bone_Chest | NO CHANGE RECORDED | NULL | NULL | |
| FEB. 21, 2017 12:00:03.020 | FEB. 21, 2017 12:00:02.000 | FEB. 21, 2017 12:00:03.000 | AV1 | Lean_Upperbody | Bone_Spine | CHANGE BEING RECORDED | ((-1.07, 0.87, 1.99), (25, -4.21, -7.15)) | ((-1.07, 0.87, 1.99), (30, -4.21, -7.15)) | 101 |
| FEB. 21, 2017 12:00:04.010 | FEB. 21, 2017 12:00:03.000 | FEB. 21, 2017 12:00:04.000 | AV1 | Lean_Upperbody | Bone_Spine | CHANGE BEING RECORDED | ((-1.07, 0.87, 1.99), (30, -4.21, -7.15)) | ((-1.07, 0.87, 1.99), (35, -4.21, -7.15)) | 101 |
| ... | ... | ... | ... | ... | ... | ... | ... | ... | ... |

| DATABASE RECORDING TIME | RECORDING START TIME | RECORDING UPDATE TIME | BEHAVING AVATAR NAME | BEHAVIOR LOG TYPE LABEL | UPDATE MONITORING TARGET | UPDATE STATUS | RECORDING START TIME DATA | RECORDING UPDATE TIME DATA | SOCIAL BEHAVIOR LOG RECORDING ID REFERENCE VALUE |
|---|---|---|---|---|---|---|---|---|---|
| FEB. 21, 2017 12:00:16.010 | FEB. 21, 2017 12:00:16.000 | FEB. 21, 2017 12:00:17.000 | AV1 | Gesture_NegativemeaningGesture1 | Bone_Rightarm | CHANGE BEING RECORDED | ((-0.05, 1.47, -0.14), (0.37, 100.83, -41.40)) | ((-0.05, 1.47, -0.14), (5, 100.83, -41.40)) | 200 |
| FEB. 21, 2017 12:00:16.012 | FEB. 21, 2017 12:00:16.000 | FEB. 21, 2017 12:00:17.000 | AV1 | Gesture_NegativemeaningGesture1 | Bone_Rightforearm | CHANGE BEING RECORDED | ((-5.96, 2.23, -2.17), (44.38, 5.63, 9.83)) | ((-5.96, 2.23, -2.17), (90, 3, -50)) | 200 |
| FEB. 21, 2017 12:00:16.014 | FEB. 21, 2017 12:00:16.000 | FEB. 21, 2017 12:00:17.000 | AV1 | Gesture_NegativemeaningGesture1 | Bone_Righthand | CHANGE BEING RECORDED | ((3.98, 2.52, 7.15), (-2.39, 101.67, 3.14)) | ((3.98, 2.52, 7.15), (-2.39, 150, 3.14)) | 200 |
| FEB. 21, 2017 12:00:16.016 | FEB. 21, 2017 12:00:16.000 | FEB. 21, 2017 12:00:17.000 | AV1 | Gesture_NegativemeaningGesture1 | Bone_Leftarm | CHANGE BEING RECORDED | ((0.09, 1.53, -0.13), (3.30, -95.72, 40.74)) | ((0.09, 1.53, -0.13), (30, -50, 70)) | 200 |
| FEB. 21, 2017 12:00:16.017 | FEB. 21, 2017 12:00:16.000 | FEB. 21, 2017 12:00:17.000 | AV1 | Gesture_NegativemeaningGesture1 | Bone_Leftforearm | CHANGE BEING RECORDED | ((1.18, 2.25, -2.98), (39.83, -3.56, -5.81)) | ((0, 2.25, -2.98), (80, 80, 150)) | 200 |
| FEB. 21, 2017 12:00:16.017 | FEB. 21, 2017 12:00:16.000 | FEB. 21, 2017 12:00:17.000 | AV1 | Gesture_NegativemeaningGesture1 | Bone_Lefthand | CHANGE BEING RECORDED | ((0, 2.45, -3.58), (-30, -120, -9.55)) | ((0, 2.45, -3.58), (-30, -120, -9.55)) | 200 |
| .. | .. | .. | .. | .. | .. | .. | .. | .. | .. |

FIG. 9C

| DATABASE RECORDING TIME | RECORDING START TIME | RECORDING UPDATE TIME | BEHAVING AVATAR NAME | BEHAVIOR LOG TYPE LABEL | UPDATE MONITORING TARGET | UPDATE STATUS | RECORDING START TIME DATA | RECORDING UPDATE TIME DATA | SOCIAL BEHAVIOR LOG RECORDING ID REFERENCE VALUE 840 |
|---|---|---|---|---|---|---|---|---|---|
| FEB. 21, 2017 12:00:19.010 | FEB. 21, 2017 12:00:18.000 | FEB. 21, 2017 12:00:19.000 | AV1 | Gesture_NegativemeaningGesture1 | Bone_Rightarm | NO CHANGE RECORDED | NULL | NULL | 200 |
| FEB. 21, 2017 12:00:19.012 | FEB. 21, 2017 12:00:18.000 | FEB. 21, 2017 12:00:19.000 | AV1 | Gesture_NegativemeaningGesture1 | Bone_Rightforearm | NO CHANGE RECORDED | NULL | NULL | 200 |
| FEB. 21, 2017 12:00:19.014 | FEB. 21, 2017 12:00:18.000 | FEB. 21, 2017 12:00:19.000 | AV1 | Gesture_NegativemeaningGesture1 | Bone_Righthand | NO CHANGE RECORDED | NULL | NULL | 200 |
| FEB. 21, 2017 12:00:19.016 | FEB. 21, 2017 12:00:18.000 | FEB. 21, 2017 12:00:19.000 | AV1 | Gesture_NegativemeaningGesture1 | Bone_Leftarm | NO CHANGE RECORDED | NULL | NULL | 200 |
| FEB. 21, 2017 12:00:19.017 | FEB. 21, 2017 12:00:18.000 | FEB. 21, 2017 12:00:19.000 | AV1 | Gesture_NegativemeaningGesture1 | Bone_Leftforearm | NO CHANGE RECORDED | NULL | NULL | 200 |
| FEB. 21, 2017 12:00:19.017 | FEB. 21, 2017 12:00:18.000 | FEB. 21, 2017 12:00:19.000 | AV1 | Gesture_NegativemeaningGesture1 | Bone_Lefthand | NO CHANGE RECORDED | NULL | NULL | 200 |
| ... | ... | ... | ... | ... | ... | ... | ... | ... | ... |

FIG. 9D

| DATABASE RECORDING TIME | RECORDING START TIME | RECORDING UPDATE TIME | BEHAVING AVATAR NAME | BEHAVIOR LOG TYPE LABEL | UPDATE MONITORING TARGET | UPDATE STATUS | RECORDING START TIME DATA | RECORDING UPDATE TIME DATA | SOCIAL BEHAVIOR LOG RECORDING ID REFERENCE VALUE |
|---|---|---|---|---|---|---|---|---|---|
| FEB. 21,2017 12:00:30.010 | FEB. 21,2017 12:00:29.000 | FEB. 21,2017 12:00:30.000 | AV1 | Gesture_NegativemeaningGesture1 | Bone_Rightarm | NO CHANGE RECORDED | NULL | NULL | 200 |
| FEB. 21,2017 12:00:30.012 | FEB. 21,2017 12:00:29.000 | FEB. 21,2017 12:00:30.000 | AV1 | Gesture_NegativemeaningGesture1 | Bone_Rightforearm | CHANGE BEING RECORDED | ((-5.96, 2.23, -2.17), (40, 80, -70)) | ((-5.96, 2.23, -2.17), (45, 6, 10)) | 200 |
| FEB. 21,2017 12:00:30.014 | FEB. 21,2017 12:00:29.000 | FEB. 21,2017 12:00:30.000 | AV1 | Gesture_NegativemeaningGesture1 | Bone_Righthand | CHANGE BEING RECORDED | ((-5.96, 2.23, -2.17), (70, 10, -50)) | ((3.98, 2.52, 7.15), (-2.39, 100, 3.14)) | 200 |
| FEB. 21,2017 12:00:30.016 | FEB. 21,2017 12:00:29.000 | FEB. 21,2017 12:00:30.000 | AV1 | Gesture_NegativemeaningGesture1 | Bone_Leftarm | NO CHANGE RECORDED | NULL | NULL | 200 |
| FEB. 21,2017 12:00:30.017 | FEB. 21,2017 12:00:29.000 | FEB. 21,2017 12:00:30.000 | AV1 | Gesture_NegativemeaningGesture1 | Bone_Leftforearm | CHANGE BEING RECORDED | ((1.18, 2.25, -2.98), (100, 10, 100)) | ((1.18, 2.25, -2.98), (40, -3, -5)) | 200 |
| FEB. 21,2017 12:00:30.017 | FEB. 21,2017 12:00:29.000 | FEB. 21,2017 12:00:30.000 | AV1 | Gesture_NegativemeaningGesture1 | Bone_Lefthand | CHANGE BEING RECORDED | ((0, 2.45, -3.58), (-40, -30, -9.55)) | ((0, 2.45, -3.58), (-30, -120, -6)) | 200 |
| .. | .. | .. | .. | .. | .. | .. | .. | .. | .. |

| DATABASE RECORDING TIME | RECORDING START TIME | RECORDING END TIME | ACTIVE AVATAR NAME | PASSIVE AVATAR NAME | SOCIAL BEHAVIOR LOG RECORDING ID | SOCIAL BEHAVIOR TYPE LABEL | BEHAVIOR LOG TYPE LABEL |
|---|---|---|---|---|---|---|---|
| .. | .. | .. | .. | .. | .. | .. | .. |
| FEB. 21, 2017 12:00:03.015 | FEB. 21, 2017 12:00:00.000 | FEB. 21, 2017 12:00:02.000 | AV1 | AV2 | 100 | Orientation_Upperbody_Directto | Orientation_Upperbody |
| FEB. 21, 2017 12:00:05.018 | FEB. 21, 2017 12:00:00.000 | FEB. 21, 2017 12:00:05.000 | AV1 | NULL | 101 | Lean_Upperbody_Forward | Lean_Upperbody |
| .. | .. | .. | .. | .. | .. | .. | .. |
| FEB. 21, 2017 12:00:15.018 | FEB. 21, 2017 12:00:05.000 | FEB. 21, 2017 12:00:06.000 | AV1 | AV2 | 109 | Gesture_PositivemeaningGesture | Gesture_PositivemeaningGesture1 |
| FEB. 21, 2017 12:00:15.019 | FEB. 21, 2017 12:00:16.000 | FEB. 21, 2017 12:00:36.000 | AV1 | AV2 | 200 | Gesture_NegativemeaningGesture | Gesture_NegativemeaningGesture1 |
| .. | .. | .. | .. | .. | .. | .. | .. |
| FEB. 21, 2017 12:00:40.017 | FEB. 21, 2017 12:00:39.000 | FEB. 21, 2017 12:00:40.000 | AV1 | AV2 | 250 | Distance_Bodyparts_Closeto | Distance_Bodyparts |
| .. | .. | .. | .. | .. | .. | .. | .. |

| DATABASE RECORDING TIME | RECORDING START TIME | RECORDING END TIME | ACTIVE AVATAR NAME | PASSIVE AVATAR NAME | SOCIAL BEHAVIOR LOG RECORDING ID | SOCIAL BEHAVIOR TYPE LABEL | SOCIAL BEHAVIOR TYPE | SOCIAL BEHAVIOR INTENSITY | SOCIAL BEHAVIOR ATTRIBUTE VALUE | SOCIAL BEHAVIOR DURATION | SOCIAL BEHAVIOR APPROACH/ AVOIDANCE TENDENCY |
|---|---|---|---|---|---|---|---|---|---|---|---|
| : | : | : | : | : | : | : | : | : | : | : | : |
| FEB. 21,2017 12:00:03.017 | FEB. 21,2017 12:00:00.000 | FEB. 21,2017 12:00:02.000 | AV2 | AV1 | 99 | Orientation_Upperbody_ DirectTo | payattention | 5 | 10 | 9 | APPROACH TENDENCY |
| : | : | : | : | : | : | : | : | : | : | : | : |
| FEB. 21,2017 12:00:03.018 | FEB. 21,2017 12:00:00.000 | FEB. 21,2017 12:00:02.000 | AV1 | AV2 | 100 | Orientation_Upperbody_ DirectTo | payattention | 5 | 10 | 2 | APPROACH TENDENCY |
| FEB. 21,2017 12:00:05.020 | FEB. 21,2017 12:00:00.000 | FEB. 21,2017 12:00:05.000 | AV1 | AV2 | 101 | Lean_Upperbody_ Forward | default | 5 | 60 | 5 | APPROACH TENDENCY |
| : | : | : | : | : | : | : | : | : | : | : | : |
| FEB. 21,2017 12:00:15.020 | FEB. 21,2017 12:00:05.000 | FEB. 21,2017 12:00:06.000 | AV1 | AV2 | 199 | Gesture_ PositivemeaningGesture | nod | 1 | 2 | 1 | APPROACH TENDENCY |
| FEB. 21,2017 12:00:36.020 | FEB. 21,2017 12:00:16.000 | FEB. 21,2017 12:00:36.000 | AV1 | AV2 | 200 | Gesture_ NegativemeaningGesture | armholding | 3 | NULL | 20 | AVOIDANCE TENDENCY |
| : | : | : | : | : | : | : | : | : | : | : | : |
| FEB. 21,2017 12:00:40.020 | FEB. 21,2017 12:00:39.000 | FEB. 21,2017 12:00:40.000 | AV2 | AV1 | 250 | Distance_Bodyparts_ CloseTo | indication | 5 | 7 | 10 | APPROACH TENDENCY |
| : | : | : | : | : | : | : | : | : | : | : | : |

FIG. 12

| BEHAVIOR LOG TYPE LABEL | UPDATE THRESHOLD | UPDATE MONITORING TARGET | SENSOR INPUT INFORMATION | INFORMATION COLLECTION APPARATUS TYPE ID |
|---|---|---|---|---|
| : | : | : | : | : |
| Distance_Bodyparts | ((>|1|, >|1|, >|1|), (*, *, *)) | Bone_Head OR Bone_Righthand OR Bone_Lefthand | DEPTH SENSOR DATA RECORDING | C2 |
| : | : | : | : | : |
| Orientation_Upperbody | ((*, *, *), (*, >|5|, *)) | Bone_Chest | DEPTH SENSOR DATA RECORDING | C2 |
| Orientation_Face | ((*, *, *), (*, >|5|, *)) | Bone_Head | HEAD POSE DATA RECORDING | C1 |
| Lean_Upperbody | ((*, *, *), (>|2|, *, *)) | Bone_Spine | DEPTH SENSOR DATA RECORDING | C2 |
| : | : | : | : | : |
| Gesture_Smile | IsSmile (>0.1) | Shape_Mouse | ELECTROMYOGRAPHY SENSOR DATA RECORDING | C3_* |
| : | : | : | : | : |
| Gesture_NegativemeaningGesture1 | ((*, *, *), (>|1|, >|1|, >|1|)) | (Bone_Rightarm AND Bone_Rightforearm) OR (Bone_Leftarm AND Bone_Leftforearm) | DEPTH SENSOR DATA RECORDING | C2 |
| Gesture_NegativemeaningGesture1 | ((*, *, *), (*, *, *)) | Bone_Righthand OR Bone_Lefthand | DEPTH SENSOR DATA RECORDING | C2 |

| SOCIAL BEHAVIOR TYPE LABEL | SOCIAL BEHAVIOR DETERMINATION API | BEHAVIOR LOG TYPE LEBEL |
|---|---|---|
| Distance_Upperbody_Closeto | MOVEMENT CHECK API | Distance_Upperbody |
| Distance_Upperbody_Farfrom | MOVEMENT CHECK API | Distance_Upperbody |
| Distance_Face_Closeto | MOVEMENT CHECK API | Distance_Face |
| Distance_Face_Farfrom | MOVEMENT CHECK API | Distance_Face |
| Distance_Bodyparts_Closeto | MOVEMENT CHECK API | Distance_Bodyparts |
| Distance_Bodyparts_Farfrom | MOVEMENT CHECK API | Distance_Bodyparts |
| Attention_Mutual | ATTENTION CHECK API | Attention |
| Attention_Averted | ATTENTION CHECK API | Attention |
| Attention_Joint | ATTENTION CHECK API | Attention |
| Attention_Following | ATTENTION CHECK API | Attention |
| Orientation_Face_Directto | ORIENTATION CHECK API | Orientation_Face |
| Orientation_Face_Indirectto | ORIENTATION CHECK API | Orientation_Face |
| Orientation_Upperbody_Directto | ORIENTATION CHECK API | Orientation_Upperbody |
| Orientation_Upperbody_Indirectto | ORIENTATION CHECK API | Orientation_Upperbody |
| Lean_Upperbody_Forward | FORWARD AND BACKWARD INCLINATION CHECK API | Lean_Upperbody |
| Lean_Upperbody_Backward | FORWARD AND BACKWARD INCLINATION CHECK API | Lean_Upperbody |
| Gesture_Smileto | FACIAL EXPRESSION CHECK API | Gesture_Smile |
| Gesture_Positivemeaninggestureto | GESTURE CHECK API | Gesture_PositivemeaningGesture1 |
| Gesture_Negativemeaninggestureto | GESTURE CHECK API | Gesture_NegativemeaningGesture1 |
| : | : | : |

| SOCIAL BEHAVIOR TYPE LABEL | APPROACH/ AVOIDANCE TENDENCY |
|---|---|
| Distance_Upperbody_Closeto | APPROACH TENDENCY |
| Distance_Upperbody_Farfrom | AVOIDANCE TENDENCY |
| Distance_Face_Closeto | APPROACH TENDENCY |
| Distance_Face_Farfrom | AVOIDANCE TENDENCY |
| Distance_Bodyparts_Closeto | APPROACH TENDENCY |
| Distance_Bodyparts_Farfrom | AVOIDANCE TENDENCY |
| Attention_Mutual | APPROACH TENDENCY |
| Attention_Avarted | AVOIDANCE TENDENCY |
| Attention_Joint | APPROACH TENDENCY |
| Attention_Following | APPROACH TENDENCY |
| Orientation_Face_Directto | APPROACH TENDENCY |
| Orientation_Face_Indirectto | AVOIDANCE TENDENCY |
| Orientation_Upperbody_Directto | APPROACH TENDENCY |
| Orientation_Upperbody_Indirectto | AVOIDANCE TENDENCY |
| Lean_Upperbody_Forward | APPROACH TENDENCY |
| Lean_Upperbody_Backward | AVOIDANCE TENDENCY |
| Gesture_Smileto | APPROACH TENDENCY |
| Gesture_Positivemeaninggestureto | APPROACH TENDENCY |
| Gesture_Negativemeaninggestureto | AVOIDANCE TENDENCY |
| ⋮ | ⋮ |

FIG. 15

| DATABASE RECORDING TIME | DETERMI-NATION PERIOD START TIME | DETERMI-NATION PERIOD END TIME | ACTIVE AVATAR NAME | PASSIVE AVATAR NAME | APPROACH TENDENCY VALUE (COUNT) | AVOIDANCE TENDENCY VALUE (COUNT) | APPROACH TENDENCY VALUE (TIME [SEC]) | AVOIDANCE TENDENCY VALUE (TIME [SEC]) | APPROACH TENDENCY VALUE (COUNT RATIO) | AVOIDANCE TENDENCY VALUE (COUNT RATIO) | APPROACH TENDENCY VALUE (TIME [SEC] RATIO) | AVOIDANCE TENDENCY VALUE (TIME [SEC] RATIO) |
|---|---|---|---|---|---|---|---|---|---|---|---|---|
| .. | .. | .. | .. | .. | .. | .. | .. | .. | .. | .. | .. | .. |
| FEB. 21, 2017 12:01:00.030 | FEB. 21, 2017 12:00:00.000 | FEB. 21, 2017 12:01:00.000 | AV1 | AV2 | 10 | 12 | 11 | 15 | 0.45 | 0.55 | 0.18 | 0.25 |
| .. | .. | .. | .. | .. | .. | .. | .. | .. | .. | .. | .. | .. |

| DETERMINATION | THRESHOLD-COUNT RATIO | THRESHOLD-TIME [SEC] RATIO |
|---|---|---|
| APPROACH TENDENCY | APPROACH TENDENCY VALUE ≧ 0.55 | APPROACH TENDENCY VALUE ≧ 0.20 |
| AVOIDANCE TENDENCY | AVOIDANCE TENDENCY VALUE ≧ 0.55 | AVOIDANCE TENDENCY VALUE ≧ 0.10 |
| INTERMEDIATE TENDENCY | (APPROACH TENDENCY && AVOIDANCE TENDENCY) \|\| (NOT APPROACH TENDENCY && NOT AVOIDANCE TENDENCY) | (APPROACH TENDENCY && AVOIDANCE TENDENCY) \|\| (NOT APPROACH TENDENCY && NOT AVOIDANCE TENDENCY) |
| . . | . . | . . |

| DATABASE RECORDING TIME | DETERMINATION PERIOD START TIME | DETERMINATION PERIOD END TIME | ACTIVE AVATAR NAME | PASSIVE AVATAR NAME | SOCIAL BEHAVIOR TENDENCY |
|---|---|---|---|---|---|
| FEB. 21,2017 12:01:00.030 | FEB. 21,2017 12:00:00.000 | FEB. 21,2017 12:01:00.000 | AV1 | AV2 | AVOIDANCE TENDENCY |
| FEB. 21,2017 12:01:00.030 | FEB. 21,2017 12:00:00.000 | FEB. 21,2017 12:01:00.000 | AV2 | AV1 | INTERMEDIATE TENDENCY |
| : | : | : | : | : | : |

| CATEGORY ID | CATEGORY NAME | SOCIAL BEHAVIOR TYPE LABEL |
|---|---|---|
| 1 | Distance | Distance_Bodyparts_Closeto; Distance_Bodyparts_Farfrom; Distance_Upperbody_Closeto; Distance_Upperbody_Farfrom; |
| 2 | Orientation | Orientation_Upperbody_Directto; Orientation_Upperbody_Indirectto |
| 3 | Lean | Lean_Forward; Lean_Backward; |
| 4 | Attention | Attention_Mutual; Attention_Avarted; Attention_Joint |
| 5 | Gesture | Gesture_Smileto; Gesture_Positivemeaninggestureto; Gesture_Negativemeaninggestureto |

FIG. 23

| CATEGORY ID | DETERMINATION | THRESHOLD-COUNT RATIO | THRESHOLD-TIME [SEC] RATIO |
|---|---|---|---|
| ⋮ | ⋮ | ⋮ | ⋮ |
| 1 | APPROACH TENDENCY | APPROACH TENDENCY VALUE ≧ 0.55 | APPROACH TENDENCY VALUE ≧ 0.20 |
| 1 | AVOIDANCE TENDENCY | AVOIDANCE TENDENCY VALUE ≧ 0.55 | AVOIDANCE TENDENCY VALUE ≧ 0.10 |
| 1 | INTERMEDIATE TENDENCY | (APPROACH TENDENCY && AVOIDANCE TENDENCY) \|\| (NOT APPROACH TENDENCY && NOT AVOIDANCE TENDENCY) | (APPROACH TENDENCY && AVOIDANCE TENDENCY) \|\| (NOT APPROACH TENDENCY && NOT AVOIDANCE TENDENCY) |
| ⋮ | ⋮ | ⋮ | ⋮ |

| DATABASE RECORDING TIME | DETERMINATION PERIOD START TIME | DETERMINATION PERIOD END TIME | ACTIVE AVATAR NAME | PASSIVE AVATAR NAME | CATEGORY ID | APPROACH TENDENCY VALUE (COUNT) | AVOIDANCE TENDENCY VALUE (COUNT) | APPROACH TENDENCY VALUE (TIME [SEC]) | AVOIDANCE TENDENCY VALUE (TIME [SEC]) | APPROACH TENDENCY VALUE (COUNT RATIO) | AVOIDANCE TENDENCY VALUE (COUNT RATIO) | APPROACH TENDENCY VALUE (TIME [SEC] RATIO) | AVOIDANCE TENDENCY VALUE (TIME [SEC] RATIO) |
|---|---|---|---|---|---|---|---|---|---|---|---|---|---|
| : | : | : | : | : | : | : | : | : | : | : | : | : | : |
| FEB. 21,2017 12:01:00.030 | FEB. 21,2017 12:00:00.000 | FEB. 21,2017 12:01:00.000 | AV1 | AV2 | 1 | 10 | 12 | 11 | 15 | 0.45 | 0.55 | 0.18 | 0.25 |
| FEB. 21,2017 12:01:00.030 | FEB. 21,2017 12:00:00.000 | FEB. 21,2017 12:01:00.000 | AV1 | AV2 | 2 | 35 | 40 | 37 | 43 | 0.47 | 0.53 | 0.62 | 0.72 |
| FEB. 21,2017 12:01:00.030 | FEB. 21,2017 12:00:00.000 | FEB. 21,2017 12:01:00.000 | AV1 | AV2 | 3 | 20 | 15 | 14 | 20 | 0.57 | 0.43 | 0.23 | 0.33 |
| FEB. 21,2017 12:01:00.030 | FEB. 21,2017 12:00:00.000 | FEB. 21,2017 12:01:00.000 | AV1 | AV2 | 4 | 1 | 10 | 1 | 7 | 0.09 | 0.91 | 0.02 | 0.12 |
| FEB. 21,2017 12:01:00.030 | FEB. 21,2017 12:00:00.000 | FEB. 21,2017 12:01:00.000 | AV1 | AV2 | 5 | 3 | 4 | 6 | 8 | 0.43 | 0.57 | 0.10 | 0.13 |
| : | : | : | : | : | : | : | : | : | : | : | : | : | : |

| DATABASE RECORDING TIME | DETERMINATION PERIOD START TIME | DETERMINATION PERIOD END TIME | ACTIVE AVATAR NAME | PASSIVE AVATAR NAME | CATEGORY ID | SOCIAL BEHAVIOR TENDENCY |
|---|---|---|---|---|---|---|
| .. | .. | .. | .. | .. | .. | .. |
| FEB. 21,2017 12:01:00.030 | FEB. 21,2017 12:00:00.000 | FEB. 21,2017 12:01:00.000 | AV1 | AV2 | 1 | AVOIDANCE TENDENCY |
| FEB. 21,2017 12:01:00.030 | FEB. 21,2017 12:00:00.000 | FEB. 21,2017 12:01:00.000 | AV1 | AV2 | 2 | INTERMEDIATE TENDENCY |
| FEB. 21,2017 12:01:00.030 | FEB. 21,2017 12:00:00.000 | FEB. 21,2017 12:01:00.000 | AV1 | AV2 | 3 | INTERMEDIATE TENDENCY |
| FEB. 21,2017 12:01:00.030 | FEB. 21,2017 12:00:00.000 | FEB. 21,2017 12:01:00.000 | AV1 | AV2 | 4 | AVOIDANCE TENDENCY |
| FEB. 21,2017 12:01:00.030 | FEB. 21,2017 12:00:00.000 | FEB. 21,2017 12:01:00.000 | AV1 | AV2 | 5 | AVOIDANCE TENDENCY |
| .. | .. | .. | .. | .. | .. | .. |

| DATABASE RECORDING TIME | DETERMINATION PERIOD START TIME | DETERMINATION PERIOD END TIME | ACTIVE AVATAR NAME | PASSIVE AVATAR NAME | SOCIAL BEHAVIOR TENDENCY |
|---|---|---|---|---|---|
| : | : | : | : | : | : |
| FEB. 21,2017 12:01:00.030 | FEB. 21,2017 12:00:00.000 | FEB. 21,2017 12:01:00.000 | AV1 | AV2 | AVOIDANCE TENDENCY |
| : | : | : | : | : | : |

| CATEGORY ID | CATEGORY NAME | DEGREE OF EFFECT | WEIGHT | SOCIAL BEHAVIOR TYPE LABEL |
|---|---|---|---|---|
| 1 | Distance | 0.25 | 0.25 | Distance_Bodyparts_Closeto; Distance_Bodyparts_Farfrom; Distance_Upperbody_Closeto; Distance_Upperbody_Farfrom; |
| 2 | Orientation | 0.33 | 0.33 | Orientation_Upperbody_Directto; Orientation_Upperbody_Indirectto |
| 3 | Lean | 0 | 0.05 | Lean_Forward; Lean_Backward; |
| 4 | Attention | 0.41 | 0.41 | Attention_Mutual; Attention_Avarted; Attention_Joint |
| 5 | Gesture | 0.1 | 0.1 | Gesture_Smileto; Gesture_Positivemeaninggestureto; Gesture_Negativemeaninggestureto |

| DATABASE RECORDING TIME | DETERMINATION PERIOD START TIME | DETERMINATION PERIOD END TIME | ACTIVE AVATAR NAME | PASSIVE AVATAR NAME | CATEGORY ID | APPROACH TENDENCY VALUE (COUNT) | AVOIDANCE TENDENCY VALUE (COUNT) | APPROACH TENDENCY VALUE (TIME [SEC]) | AVOIDANCE TENDENCY VALUE (TIME [SEC]) |
|---|---|---|---|---|---|---|---|---|---|
| : | : | : | : | : | : | : | : | : | : |
| FEB. 21, 2017 12:01:00.030 | FEB. 21, 2017 12:00:00.000 | FEB. 21, 2017 12:01:00.000 | AV1 | AV2 | 1 | 10 | 12 | 11 | 15 |
| FEB. 21, 2017 12:01:00.030 | FEB. 21, 2017 12:00:00.000 | FEB. 21, 2017 12:01:00.000 | AV1 | AV2 | 2 | 35 | 40 | 37 | 43 |
| FEB. 21, 2017 12:01:00.030 | FEB. 21, 2017 12:00:00.000 | FEB. 21, 2017 12:01:00.000 | AV1 | AV2 | 3 | 20 | 15 | 14 | 20 |
| FEB. 21, 2017 12:01:00.030 | FEB. 21, 2017 12:00:00.000 | FEB. 21, 2017 12:01:00.000 | AV1 | AV2 | 4 | 1 | 10 | 1 | 7 |
| FEB. 21, 2017 12:01:00.030 | FEB. 21, 2017 12:00:00.000 | FEB. 21, 2017 12:01:00.000 | AV1 | AV2 | 5 | 3 | 4 | 6 | 8 |
| : | : | : | : | : | : | : | : | : | : |

| APPROACH TENDENCY VALUE (COUNT RATIO) | AVOIDANCE TENDENCY VALUE (COUNT RATIO) | APPROACH TENDENCY VALUE (TIME [SEC] RATIO) | AVOIDANCE TENDENCY VALUE (TIME [SEC] RATIO) | WEIGHTED APPROACH TENDENCY VALUE (COUNT RATIO) | WEIGHTED AVOIDANCE TENDENCY VALUE (COUNT RATIO) | WEIGHTED APPROACH TENDENCY VALUE (TIME [SEC] RATIO) | WEIGHTED AVOIDANCE TENDENCY VALUE (TIME [SEC] RATIO) |
|---|---|---|---|---|---|---|---|
| .. | .. | .. | .. | .. | .. | .. | .. |
| 0.45 | 0.55 | 0.18 | 0.25 | 0.11 | 0.14 | 0.05 | 0.06 |
| 0.47 | 0.53 | 0.62 | 0.72 | 0.15 | 0.18 | 0.20 | 0.24 |
| 0.57 | 0.43 | 0.23 | 0.33 | 0.03 | 0.02 | 0.01 | 0.02 |
| 0.09 | 0.91 | 0.02 | 0.12 | 0.04 | 0.37 | 0.01 | 0.05 |
| 0.43 | 0.57 | 0.10 | 0.13 | 0.04 | 0.06 | 0.01 | 0.01 |
| .. | .. | .. | .. | .. | .. | .. | .. |

| DATABASE RECORDING TIME | DETERMINATION START TIME | DETERMINATION PERIOD END TIME | ACTIVE AVATAR NAME | PASSIVE AVATAR NAME | CATEGORY ID | SOCIAL BEHAVIOR TENDENCY |
|---|---|---|---|---|---|---|
| .. | .. | .. | .. | .. | .. | .. |
| FEB. 21,2017 12:01:00.030 | FEB. 21,2017 12:00:00.000 | FEB. 21,2017 12:01:00.000 | AV1 | AV2 | 1 | INTERMEDIATE TENDENCY |
| FEB. 21,2017 12:01:00.030 | FEB. 21,2017 12:00:00.000 | FEB. 21,2017 12:01:00.000 | AV1 | AV2 | 2 | INTERMEDIATE TENDENCY |
| FEB. 21,2017 12:01:00.030 | FEB. 21,2017 12:00:00.000 | FEB. 21,2017 12:01:00.000 | AV1 | AV2 | 3 | INTERMEDIATE TENDENCY |
| FEB. 21,2017 12:01:00.030 | FEB. 21,2017 12:00:00.000 | FEB. 21,2017 12:01:00.000 | AV1 | AV2 | 4 | INTERMEDIATE TENDENCY |
| FEB. 21,2017 12:01:00.030 | FEB. 21,2017 12:00:00.000 | FEB. 21,2017 12:01:00.000 | AV1 | AV2 | 5 | INTERMEDIATE TENDENCY |
| .. | .. | .. | .. | .. | .. | .. |

FIG. 32

| DATABASE RECORDING TIME | DETERMINATION PERIOD START TIME | DETERMINATION PERIOD END TIME | ACTIVE AVATAR NAME | PASSIVE AVATAR NAME | SOCIAL BEHAVIOR TENDENCY | 1130 |
|---|---|---|---|---|---|---|
| ⋮ | ⋮ | ⋮ | ⋮ | ⋮ | ⋮ | |
| FEB. 21,2017 12:01:00.030 | FEB. 21,2017 12:00:00.000 | FEB. 21,2017 12:01:00.000 | AV1 | AV2 | INTERMEDIATE TENDENCY | |
| ⋮ | ⋮ | ⋮ | ⋮ | ⋮ | ⋮ | |

FIG. 35

| VALUE TYPE | VALUE DEFINITION |
|---|---|
| ⋮ | ⋮ |
| RATIO OF APPROACH TENDENCY VALUE | Orientation_Face_Directto/Orientation_Upperbody_Directto |
| RATIO OF AVOIDANCE TENDENCY VALUE | Orientation_Face_Indirectto/Orientation_Upperbody_Indirectto |
| RATIO OF APPROACH TENDENCY VALUE AND AVOIDANCE TENDENCY VALUE | Orientation_Face_Directto/Orientation_Face_Indirectto |
| RATIO OF APPROACH TENDENCY VALUE AND AVOIDANCE TENDENCY VALUE | Orientation_Face_Indirectto/Orientation_Upperbody_Directto |
| ⋮ | ⋮ |

FIG. 36

| DATABASE RECORDING TIME | DETERMINATION PERIOD START TIME | DETERMINATION PERIOD END TIME | ACTIVE AVATAR NAME | PASSIVE AVATAR NAME | TIME DURATION EVIDENT FEATURE | REPRESENTATIVE VALUE MATRIX 1230 |
|---|---|---|---|---|---|---|
| .. | .. | .. | .. | .. | .. | .. |
| FEB. 21, 2017 12:10:00.001 | FEB. 21, 2017 12:00:00.000 | FEB. 21, 2017 12:01:00.000 | AV1 | AV2 | APPROACH TENDENCY | [3,5,3,3] |
| FEB. 21, 2017 12:10:00.002 | FEB. 21, 2017 12:03:00.000 | FEB. 21, 2017 12:03:30.000 | AV1 | AV2 | APPROACH TENDENCY | [3,5,3,7] |
| FEB. 21, 2017 12:10:00.003 | FEB. 21, 2017 12:05:00.000 | FEB. 21, 2017 12:06:00.000 | AV1 | AV2 | AVOIDANCE TENDENCY | [1,5,1,10] |
| FEB. 21, 2017 12:10:00.004 | FEB. 21, 2017 12:08:00.000 | FEB. 21, 2017 12:08:30.000 | AV1 | AV2 | AVOIDANCE TENDENCY | [1,5,1,7] |
| .. | .. | .. | .. | .. | .. | .. |

FIG. 37

| DATABASE RECORDING TIME | DETERMINATION PERIOD START TIME | DETERMINATION PERIOD END TIME | ACTIVE AVATAR NAME | PASSIVE AVATAR NAME | TIME DURATION EVIDENT FEATURE | REPRESENTATIVE VALUE MATRIX | DISTANCE |
|---|---|---|---|---|---|---|---|
| : | : | : | : | : | : | : | : |
| FEB. 21, 2017 12:10:01.001 | FEB. 21, 2017 12:00:00.000 | FEB. 21, 2017 12:01:00.000 | AV1 | AV2 | APPROACH TENDENCY | [3,5,3,3] | 0 |
| FEB. 21, 2017 12:10:01.002 | FEB. 21, 2017 12:03:00.000 | FEB. 21, 2017 12:03:30.000 | AV1 | AV2 | APPROACH TENDENCY | [3,5,3,7] | 4 |
| FEB. 21, 2017 12:10:01.003 | FEB. 21, 2017 12:05:00.000 | FEB. 21, 2017 12:06:00.000 | AV1 | AV2 | AVOIDANCE TENDENCY | [1,5,1,10] | 7.55 |
| FEB. 21, 2017 12:10:01.004 | FEB. 21, 2017 12:08:00.000 | FEB. 21, 2017 12:08:30.000 | AV1 | AV2 | AVOIDANCE TENDENCY | [1,5,1,7] | 4.9 |
| : | : | : | : | : | : | : | : |

1220

_US 10,824,223 B2_

DETERMINATION APPARATUS AND DETERMINATION METHOD

CROSS-REFERENCE TO RELATED APPLICATION

This application is based upon and claims the benefit of priority of the prior Japanese Patent Application No. 2017-242963, filed on Dec. 19, 2017, the entire contents of which are incorporated herein by reference.

FIELD

The embodiments discussed herein are related to a technique for determining a behavior.

BACKGROUND

A technique for enabling users or a user and a machine to communicate with each other through avatars in a virtual space is known. A virtual space is not limited to one achieved using a virtual reality (VR) technique but may be a real space where avatars are projected using an augmented reality (AR) technique or the like.

In order to achieve smooth communication and build a good relationship in a virtual space through avatars, it is desirable to be able to convey users' feelings of intimacy to each other and control the balance of intimacy as in a real space.

Examples of the related art include, for example, Japanese Laid-open Patent Publication No. 2000-250677, Japanese National Publication of International Patent Application No. 2012-533120, Japanese Laid-open Patent Publication No. 2013-078969, and Japanese Laid-open Patent Publication No. 2000-276610.

SUMMARY

According to an aspect of the embodiments, a determination apparatus includes one or more memories, and one or more processors configured to perform, on the basis of data detected by a sensor that measures a first user who operates a first avatar, detection of a first behavior of the first user, determine a first type of behavior corresponding to the detected first behavior by referring to information indicating correspondence between a plurality of behaviors and a plurality of types of behavior, and perform, on the basis of a behavior tendency of the first user determined in accordance with the first type of behavior, control of an output to an environment where the first avatar exists.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A to 7C are diagrams illustrating an example of data tables stored in a sensor data database;

FIGS. 9A to 9D are diagrams illustrating an example of a behavior log update recording data table according to the first embodiment;

FIG. 10 is a diagram illustrating an example of a social behavior log recording data table according to the first embodiment;

FIG. 11 is a diagram illustrating an example of a social behavior value calculation recording data table according to the first embodiment;

FIG. 12 is a diagram illustrating an example of monitoring target data log definition information according to the first embodiment;

FIG. 13 is a diagram illustrating an example of social behavior determination application programming interface definition information according to the first embodiment;

FIG. 14 is a diagram illustrating an example of social behavior approach/avoidance tendency definition information according to the first embodiment;

FIG. 15 is a diagram illustrating an example of a social behavior tendency value recording data table according to the first embodiment;

FIG. 16 is a diagram illustrating an example of social behavior tendency threshold definition information according to the first embodiment;

FIG. 17 is a diagram illustrating an example of a social behavior tendency recording data table according to the first embodiment;

FIG. 22 is a diagram illustrating an example of social behavior category classification definition information according to the second embodiment;

FIG. 23 is a diagram illustrating an example of categorical social behavior tendency threshold definition information according to the second embodiment;

FIG. 24 is a diagram illustrating an example of a categorical social behavior tendency value recording data table according to the second embodiment;

FIG. 25 is a diagram illustrating an example of a categorical social behavior tendency recording data table according to the second embodiment;

FIG. 26 is a diagram illustrating an example of a social behavior tendency recording data table according to the second embodiment;

FIG. 29 is a diagram illustrating an example of social behavior categorical weight definition information according to degrees of an effect of a circumstance to be taken into consideration according to the third embodiment;

FIGS. 30A and 30B are diagrams illustrating an example of a categorical weighted social behavior tendency value recording data table according to the third embodiment;

FIG. 31 is a diagram illustrating an example of a categorical social behavior tendency recording data table according to the third embodiment;

FIG. 32 is a diagram illustrating an example of a social behavior tendency recording data table according to the third embodiment;

FIG. 35 is a diagram illustrating an example of social behavior tendency representative value matrix definition information according to the fourth embodiment;

FIG. 36 is a diagram illustrating an example of a log duration social behavior tendency representative value recording data table according to the fourth embodiment;

FIG. 37 is a diagram illustrating an example of a representative value time duration social behavior tendency determination recording data table according to the fourth embodiment;

DESCRIPTION OF EMBODIMENTS

Figure 1:
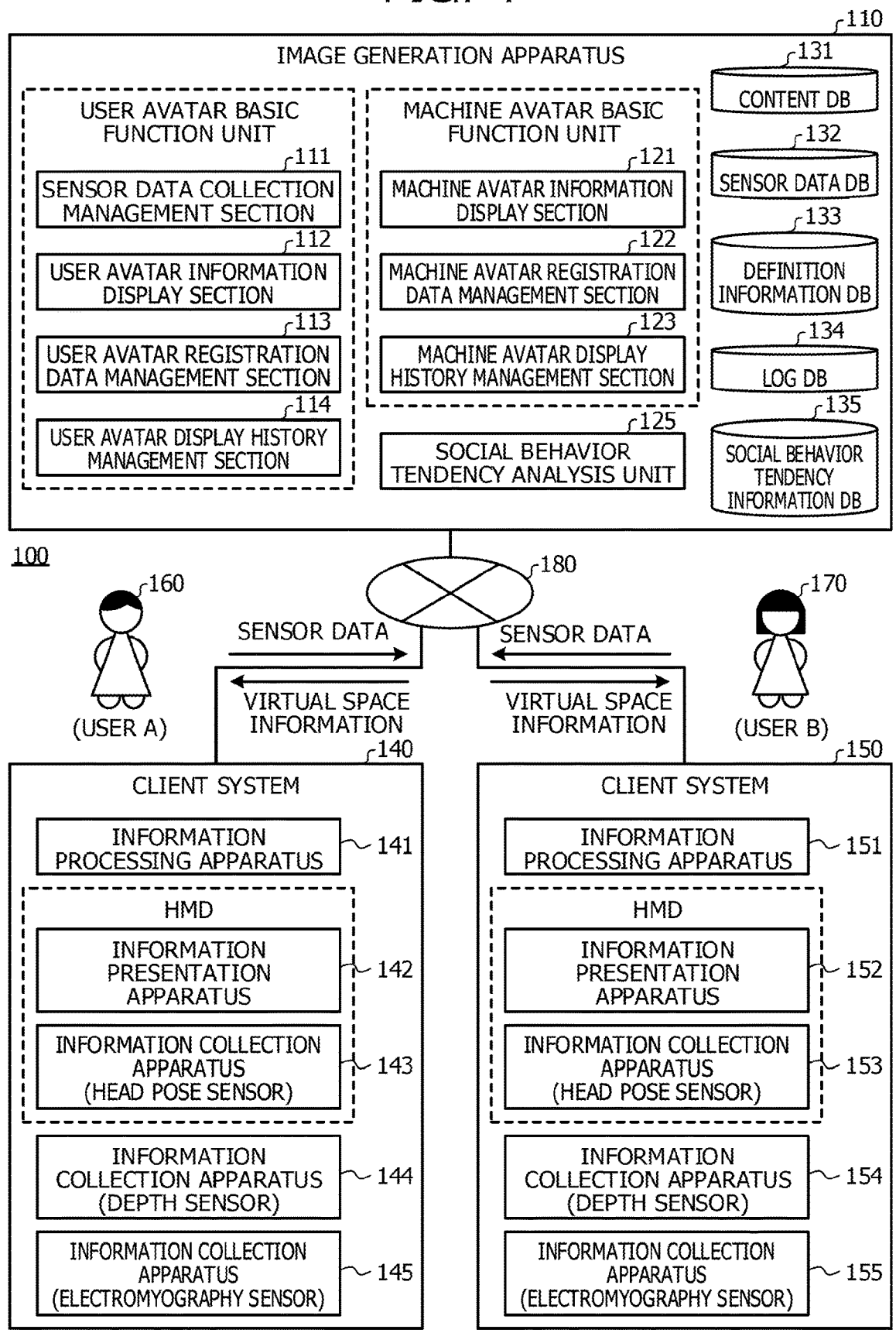
FIG. 1 is a diagram illustrating an example of the overall configuration of an image generation system according to an embodiment.

It is known that, in a real space, the balance of intimacy is controlled using nonverbal behaviors. Because nonverbal behaviors for controlling the balance of intimacy are more specifically behaviors (social behaviors) displayed by a user to another user, such as eye contact, physical closeness, gestures, and smiles, however, it is sometimes difficult to guess the user's intentions especially in a virtual space.

When an avatar a of a user A does not pay attention to an avatar b of another user B, for example, it is difficult for the user B to determine whether the user A does not look at the avatar B simply because a field of vision of the user A is narrow and the user A does not see social behaviors of the avatar B or because the avatar a is displaying a social behavior that exhibits an avoidance tendency in order not to become too intimate with the avatar b. It is therefore difficult to determine an appropriate presentation of the avatar b (for example, presentation of hands of the user B that might not be seen by the user A).

Definitions of Terms

First, terms used to describe an image generation system according to each embodiment will be defined. The image generation system according to each embodiment is a system that provides a virtual space where users separate from each other or a user and a machine communicate with each other. In the embodiments, a virtual space is not limited to a space generated using a VR technique but may be a real space where avatars are projected using an AR technique or the like.

A virtual space refers to a space where an avatar's body is represented based on positions (coordinates) and orientations (rotation angles) of components of a skeleton model. For this reason, a real space where an avatar of another user is projected and a user does not see his/her own avatar will also be referred to as a "virtual space".

Among avatars having components for representing positions and orientations of bodies thereof in a virtual space, one whose image is generated in such a way as to synchronize with nonverbal behaviors (actions) of a user in a real space will be referred to a "user avatar". Among avatars having components for representing positions and orientations of bodies thereof in a virtual space, one that autonomously moves in accordance with a computer program will be referred to as a "machine avatar" (however, a machine that autonomously operates will also be referred to as a "machine avatar" in the following description). A "component" is an object that represents at least one body part of an avatar in a virtual space and has information such as a position and an orientation.

Among nonverbal behaviors of a user in a real space, a nonverbal behavior displayed to a communication partner (communication target) will be referred to as a "social behavior". Hereinafter, the communication partner may be referred to as partner. Social behaviors include nonverbal behaviors such as eye contact, looking at the same thing, turning of one's body to a partner, physical closeness, and smiles at a partner.

Outline of Process Performed by Image Generation System

Next, an outline of a process performed by the image generation system according to each embodiment will be described. The image generation system according to each embodiment monitors, in a virtual space, nonverbal behaviors of a user who is a communication partner of a machine avatar and appropriately determines a tendency of social behaviors of the user.

As a result, the machine avatar determines a state of the user in accordance with the tendency of the social behaviors of the user and behaves in an optimal manner based on the tendency of the social behaviors of the user. Since the machine avatar determines social behaviors thereof based on the social behaviors displayed by the user thereto, the user and the machine avatar smoothly communicate with each other and a relationship is appropriately built.

The embodiments will be described hereinafter with reference to the accompanying drawings. Components having substantially the same functions herein are given the same reference numerals, and redundant description thereof is omitted.

Overall Configuration of Image Generation System

First, an image generation system will be described. FIG. 1 is a diagram illustrating an example of the overall configuration of an image generation system 100. As illustrated in FIG. 1, the image generation system 100 includes an image generation apparatus 110 for which server software is provided and client systems 140 and 150 including information processing apparatuses 141 and 151, respectively, for which client application software are provided. The image generation apparatus 110 and the client systems 140 and 150 are connected to one another through a network 180 such as the Internet or a local area network (LAN).

In the image generation system 100, the image generation apparatus 110 and the client systems 140 and 150 provide a communication service by performing divided parts of a whole process. A user 160 (user identifier (ID)="userA") and a user 170 (user ID="userB") use the communication service provided by the image generation system 100 in different places. As a result, the users 160 and 170 may communicate with each other using user avatars (images associated with the users 160 and 170) in the same virtual space. In an example, the users 160 and 170 are learners and study by communicating with a machine avatar through the user avatars. The communication through the user avatars, however, is not limited to study but may be performed for any purposes.

The image generation apparatus 110 is an example of an information processing apparatus that collects sensor data obtained by sensing the users 160 and 170 and that performs various processes, such as a server apparatus or a personal computer (PC).

A user avatar basic function program, a machine avatar basic function program, and a behavior tendency determination program are installed on the image generation apparatus 110 as the server software. By executing these programs including a plurality of instructions, the image generation apparatus 110 functions as a user avatar basic function unit, a machine avatar basic function unit, and a social behavior tendency analysis unit 125.

The user avatar basic function unit includes a sensor data collection management section 111, a user avatar information display section 112, a user avatar registration data management section 113, and a user avatar display history management section 114. The user avatar basic function unit achieves basic functions of user avatars in order to provide the communication service.

The sensor data collection management section 111 collects sensor data obtained by sensing the users 160 and 170 and stores the sensor data in data tables provided in a sensor data database 132 for corresponding sensors.

The user avatar information display section 112 generates images of user avatars in a virtual space based on sensor data stored in the sensor data database 132. The user avatar information display section 112 generates images of user avatars, for example, using an avatar skeleton model stored in a content database 131. The avatar skeleton model is an image of a human figure for representing the motion of body parts according to nonverbal behaviors using a plurality of components. The user avatar information display section 112 calculates positions and rotation angles of the components in a virtual space and generates images of user avatars by applying the calculated positions and rotation angles to the avatar skeleton model.

The user avatar information display section 112 generates (or updates) virtual space information by incorporating images of user avatars and a machine avatar, which will be described later, into an image of a virtual space (background image) stored in the content database 131. The user avatar information display section 112 transmits the generated or updated virtual space information to the client systems 140 and 150.

The user avatar registration data management section 113 registers various pieces of definition information to the content database 131 used by the user avatar information display section 112 to generate and transmit virtual space information.

The user avatar display history management section 114 records log data used to generate images of user avatars in a log table of a log database 134.

The machine avatar basic function unit includes a machine avatar information display section 121, a machine avatar registration data management section 122, and a machine avatar display history management section 123. The machine avatar basic function unit achieves basic functions of a machine avatar in order to provide the communication service.

The machine avatar information display section 121 refers to log data that has been used to generate an image of a user avatar and stored in the log database 134 and generates an image of a machine avatar in a virtual space. The machine avatar information display section 121 generates an image of a machine avatar such that the machine avatar display standard behaviors in accordance with nonverbal behaviors of a user with whom the machine avatar is communicating and a communication strategy employed by the machine avatar.

The machine avatar information display section 121 transmits the generated image of the machine avatar to the user avatar information display section 112. As a result, the image of the machine avatar is incorporated into the virtual space information generated by the user avatar information display section 112.

The machine avatar information display section 121 changes an image of a machine avatar transmitted to the user avatar information display section 112 based on a result of a determination made by the social behavior tendency analysis unit 125. If it is difficult to determine an appropriate image of a machine avatar based on a result of a determination made by the social behavior tendency analysis unit 125, the machine avatar information display section 121 displays an image of a machine avatar that displays standard behaviors.

The machine avatar registration data management section 122 registers, to the content database 131, various pieces of information used to generate an image of a machine avatar.

The machine avatar display history management section 123 records log data used to generate an image of a machine avatar in the log table of the log database 134.

The social behavior tendency analysis unit 125 monitors, using log data used to generate an image of a user avatar, nonverbal behaviors of a user as a communication partner. The social behavior tendency analysis unit 125 determines, based on a result of the monitoring, whether the user has displayed certain nonverbal behaviors. If determining that the user has displayed certain nonverbal behaviors in a certain time period, the social behavior tendency analysis unit 125 also determines whether one or more nonverbal behaviors of the user in the certain time period exhibit an approach tendency, an avoidance tendency, or an intermediate tendency. The "intermediate tendency" refers to a tendency of social behaviors of a user that does not fall within an approach tendency or an avoidance tendency.

Next, a client system will be described. Because the client systems 140 and 150 have the same configuration, only the client system 140 will be described hereinafter.

The client system 140 includes an information processing apparatus 141, an information presentation apparatus 142, and information collection apparatuses 143 to 145.

An information processing program including a plurality of instructions is installed on the information processing apparatus 141 as a client application. The information processing apparatus 141 transmits sensor data output from the information collection apparatuses 143 to 145 to the image generation apparatus 110, receives virtual space information transmitted from the image generation apparatus 110, and outputs the virtual space information to the information presentation apparatus 142.

Although the information processing apparatus 141 is included in a terminal embedded in an environment around the user 160 in the following embodiments, the information processing apparatus 141 does not have to be included in a terminal embedded in an environment. For example, the information processing apparatus 141 may be included in a head-mounted display (HMD). Alternatively, the information processing apparatus 141 may be included in a wearable mobile terminal such as a contact lens or eyeglasses or a stationary server apparatus.

The information presentation apparatus 142 displays virtual space information transmitted from the image generation apparatus 110 to the user 160. In the embodiments, the information presentation apparatus 142 is achieved by a display unit of the HMD.

The information collection apparatuses 143 to 145 sense nonverbal behaviors of the user 160 in a real space and output sensor data.

In the embodiments, the information collection apparatus 143 is a head orientation sensor and included in the HMD. The head orientation sensor 143 senses orientations of a head of the user 160 included in nonverbal behaviors of the user 160 in the real space and outputs head orientation data.

In the embodiments, the information collection apparatus 144 is a depth sensor. The depth sensor 144 is provided in front of the user 160. The information collection apparatus 144 senses a three-dimensional distance to the user 160 and outputs a two-dimensional depth image or the like that changes in accordance with nonverbal behaviors of the user 160 in the real space. Data (for example, 3 cm) indicating the depth of an object measured by the information collection apparatus 144 will be referred to as "depth data" hereinafter. The two-dimensional depth image is obtained by plotting the depth data obtained from the information collection apparatus 144 on an X-Y plane. On the two-dimensional depth image, a distance to an object (an object closest to the information collection apparatus 144) at each X-Y coordinate position obtained from the information collection apparatus 144 is stored in a corresponding pixel. Data obtained from the information collection apparatus 144 (the depth data, the two-dimensional depth image, a color image, and the like) will be generically referred to as depth sensor data.

In the embodiments, the information collection apparatus 145 is an electromyography sensor. The information collection apparatus 145 senses changes in facial expression of the user 160 included in nonverbal behaviors and outputs electromyography data.

Although one user is allocated to one apparatus (information processing apparatus) for which the client application software is provided in the following description, a plurality of users may be allocated to one apparatus, instead.

Although the server software and the client application software are each provided for one apparatus (an image generation apparatus and an information processing apparatus) in the following description, a plurality of pieces of software may be provided for one apparatus, instead. Alternatively, the server software and the client application software may be provided for one apparatus. Alternatively, functions achieved by the server software and the client application software may be distributed to a plurality of apparatuses.

In the following description, the client application software identifies the user 160 and converts virtual space information transmitted from the image generation apparatus 110 into virtual space information according to the identified user 160. The client application software then displays the virtual space information.

In the following description, sensor data obtained by sensing nonverbal behaviors of the user 160 is transmitted to the image generation apparatus 110 while being associated with the identifier of the user 160. The client application software or the server software performs access control for the information processing apparatus 141 for which the client application software is provided. That is, for example, in the following description, the client application software checks (authenticates) the user 160 for the information processing apparatus 141 for which the client application software is provided.

In the following description, the client application software checks specifications of the information presentation apparatus 142 and converts virtual space information transmitted from the image generation apparatus 110 into virtual space information according to the checked specifications. The client application software then displays the virtual space information.

In the following description, the client application software checks the information processing apparatus 141 and transmits sensor data obtained by sensing nonverbal behaviors of the user 160 to the image generation apparatus 110 while associating the sensor data with the information processing apparatus 141.

In the following description, the user 160 owns one identifier. When the image generation system 100 provides a plurality of services, however, the user 160 may own different identifiers for different services. In this case, the image generation system 100 manages association between the plurality of identifiers owned by the user 160.

Although the head orientation sensor, the depth sensor, and electromyography sensor sense nonverbal behaviors of the user 160 as the information collection apparatuses 143 to 145, respectively, other sensors may sense nonverbal behaviors of the user 160, instead. The other sensors may include, for example, a video image capturing apparatus, a photo image (color image) capturing apparatus, an audio capturing apparatus, and a biological sensor.

Sensor data obtained by a contactless type sensor might not include data regarding the user 160, such as when a photo image captured by a contactless type sensor does not include the user 160. In another case, for example, a photo image captured by a contactless type sensor might include a plurality of users, and it might difficult to identify the user 160. In the embodiments, it is assumed that such problems have been addressed properly and sensor data is correctly associated with the user 160 in the image generation apparatus 110.

Although sensor data obtained by the information collection apparatuses 143 to 145 is transmitted to the image generation apparatus 110 in the following description, intermediate information obtainable from the sensor data may be transmitted to the image generation apparatus 110, instead. When face image data regarding the user 160 is obtained, for example, information indicating the magnitude of changes in a smile of the user 160 obtained by focusing upon facial parts of the user 160 may be transmitted to the image generation apparatus 110. Alternatively, information indicating changes in the orientation of the head of the user 160 obtained by focusing upon the size of a face of the user 160 may be transmitted to the image generation apparatus 110.

In the following description, it is assumed that sensor data transmitted from the information processing apparatuses 141 and 151 are provided with timestamps. It is also assumed that the timestamps are matched between the client systems 140 and 150.

Image of Virtual Space

Figure 2:
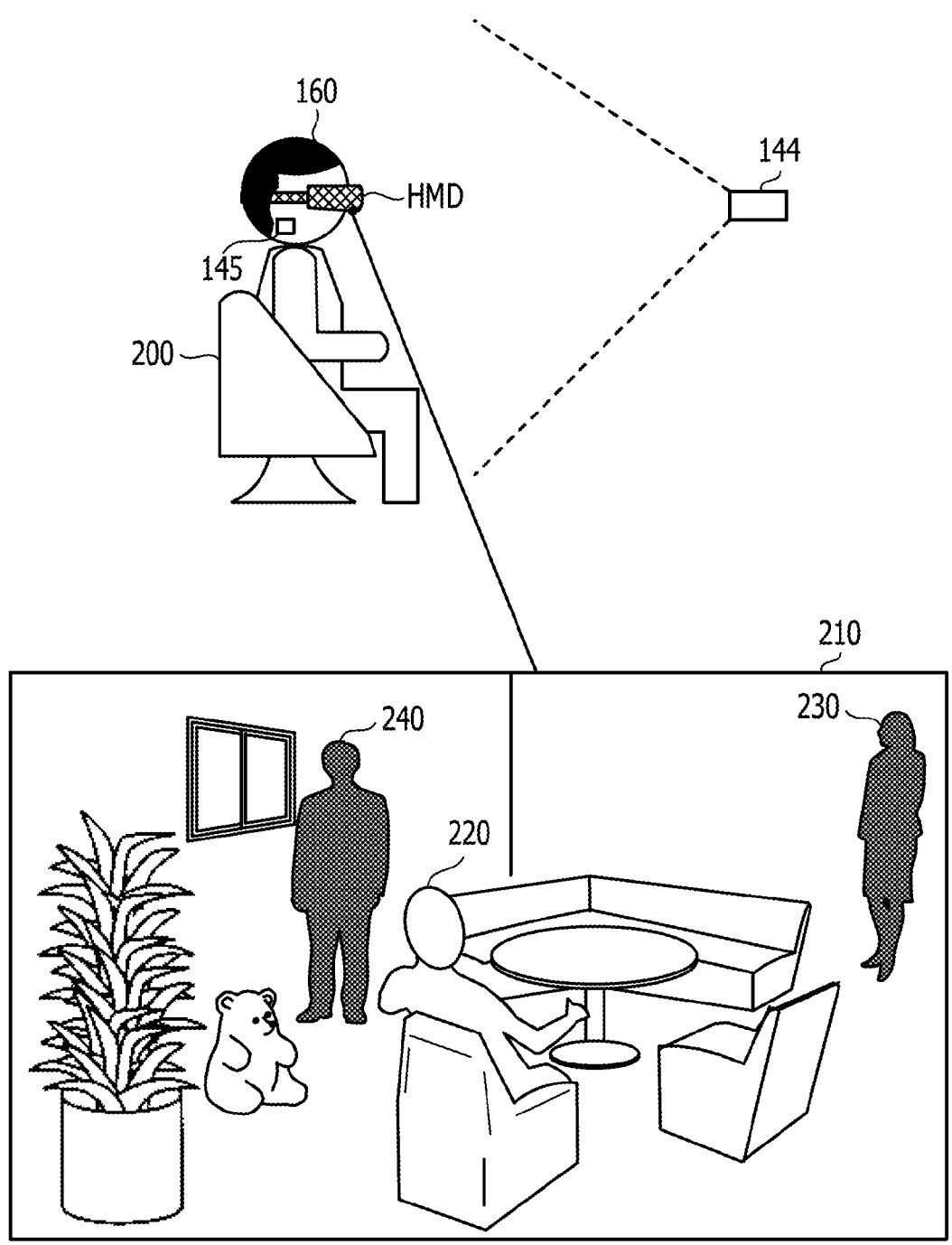
FIG. 2 is a diagram illustrating an example of an image of a virtual space according to the embodiment.

Next, an image of a virtual space including images of the user avatars of the users 160 and 170 and an image of the machine avatar will be described. FIG. 2 is a diagram illustrating an example of an image of a virtual space.

As illustrated in FIG. 2, a user (the user 160 here) who uses the communication service wears an HMD (an HMD including a head orientation sensor and a display unit) and the electromyography sensor 145 in a real space and sits on a chair 200. The depth sensor 144 is provided in front the user 160 and sense the user 160.

Head orientation data, depth sensor data, and electromyography data obtained as a result of sensing performed by the head orientation sensor 143, the depth sensor 144, and the electromyography sensor 145 are transmitted to the image generation apparatus 110, and an image 220 of the user avatar of the user 160 is generated. The same process is performed for the user 170, and an image 230 of the user avatar of the user 170 is generated.

The image generation apparatus 110 also generates an image 240 of the machine avatar that communicates with the users 160 and 170. The images 220, 230, and 240 of the user avatars and the machine avatar generated by the image generation apparatus 110 are incorporated into an image of a virtual space and transmitted to the information processing apparatuses 141 and 151 as virtual space information.

An image 210 illustrated in FIG. 2 is an example of the image of the virtual space included in the virtual space information transmitted to the information processing apparatus 141. The image 220 of the user avatar of the user 160, the image 230 of the user avatar of the user 170, and the image 240 of the machine avatar have been incorporated into the image 210. As illustrated in FIG. 2, the image 210 is displayed such that the user 160 sees the image 220 of the user avatar thereof. If the user 160 displays a nonverbal behavior, the image 220 of the user avatar in the image 210 moves in sync. In the image 210, the user 160 checks the image 220 of the user avatar that moves in the virtual space in sync with nonverbal behaviors thereof from behind.

Method for Representing Images of Avatars

Next, a method for representing images of an avatar (a user avatar or a machine avatar) in a virtual space will be described. In the embodiments, the image generation apparatus 110 represents positions and rotation angles of components in the virtual space using an avatar skeleton model. In the embodiments, the image generation apparatus 110 generates an image of an avatar by representing states (colors of clothes and bodies of the avatars, facial expressions, and the like) of surfaces of the avatar using a set of points called "mesh".

First, the avatar skeleton model will be described. As described above, the avatar skeleton model includes a plurality of components. For example, a head of the avatar skeleton model includes a head component. A position and rotation angles of the head component are calculated based on head orientation data. Body parts of the avatar skeleton model other than the head include components of body parts other than the head component. Positions and rotation angles of these components are calculated based on depth sensor data.

Figure 3:
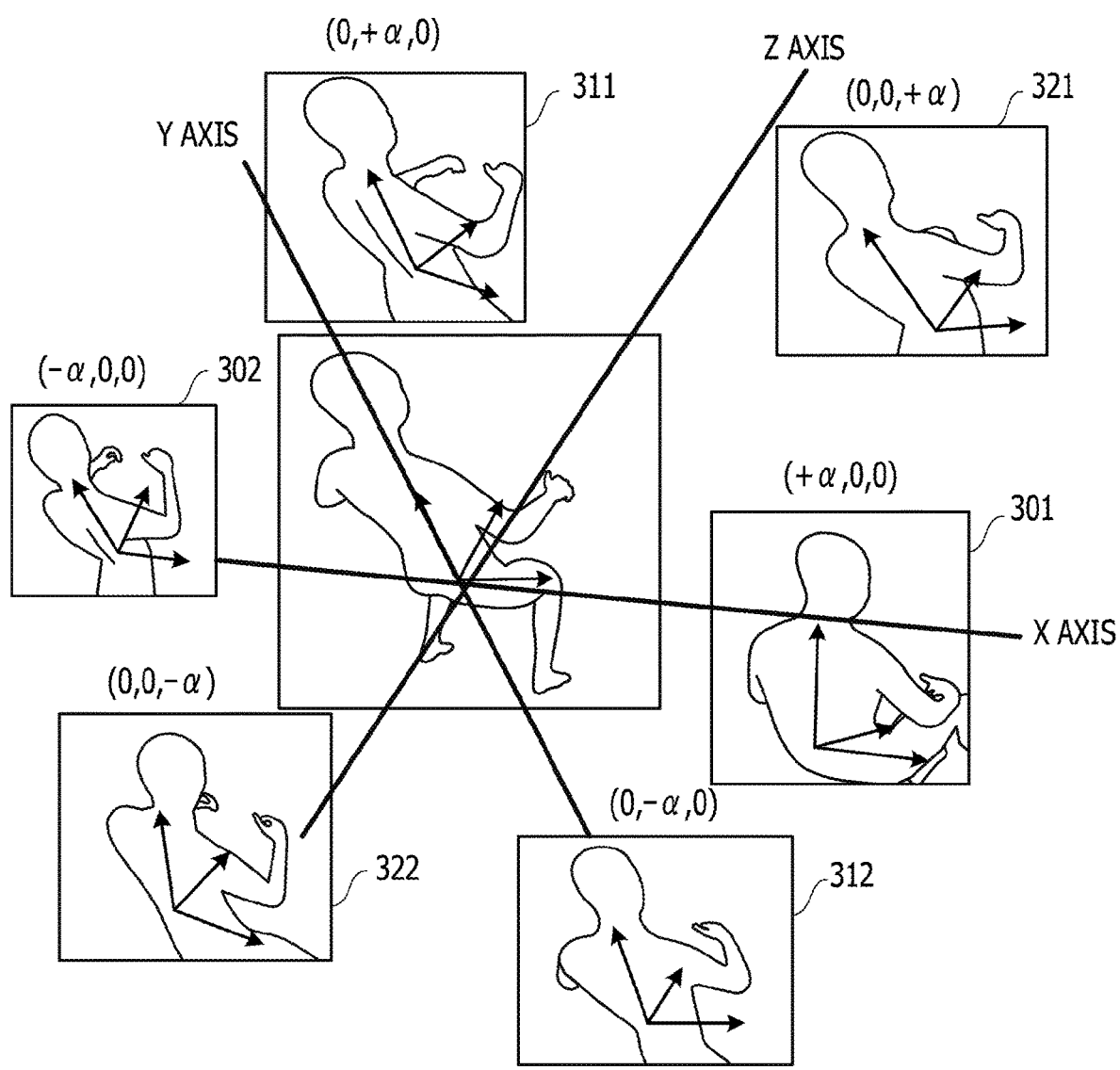
FIG. 3 is a diagram illustrating a method for representing images of an avatar according to the embodiment.

As an example, a method for representing images of an upper body of an avatar using the avatar skeleton model will be described. FIG. 3 is a diagram illustrating an example of a method for representing images of an avatar. In FIG. 3, nonverbal behaviors of inclining a user's upper body forward and backward, nonverbal behaviors of turning the user's upper body to the left and the right, and nonverbal behaviors of inclining the user's upper body to the left and the right are represented as images of an avatar. In the representation method employing the avatar skeleton model, these nonverbal behaviors are represented as changes in rotation angles about three axes of a skeleton whose origin is a component near the avatar's chest ("Bone_Chest").

In FIG. 3, X, Y, and Z axes of a coordinate system uniquely determined in a virtual space indicate a left-and-right direction, an up-and-down direction, and a fore-and-aft direction of the avatar.

An image 301 is an image of the avatar at a time when the component rotates +α [degrees] about the X axis, and an image 302 is an image of the avatar at a time when the component rotates −α [degrees] about the X axis. An image 311 is an image of the avatar at a time when the component rotates +α [degrees] about the Y axis, and an image 312 is an image of the avatar at a time when the component rotates −α [degrees] about the Y axis.

An image 321 is an image of the avatar at a time when the component rotates +α [degrees] about the Z axis, and an image 322 is an image of the avatar at a time when the component rotates −α [degrees] about the Z axis.

It is assumed that each component of the avatar is expressed as ((position coordinates), (rotation angles)) and, for example, "Bone_Chest" is ((0, 8, −10), (2, 0, 0)) at a time $t_1$ and ((0, 8, −10), (4, 0, 0)) at a time $t_{i+1}$. In this case, "Bone_Chest" at the time $t_1$ is located at position coordinates (0, 8, −10), which are unique coordinates in a virtual reality (VR) space, and has rotated 2 degrees about the X axis. After an update based on data obtained as a result of a sensor input, "Bone_Chest" remains at the same position coordinates but has rotated 4 degrees in total about the X axis.

Hardware Configuration of Image Generation Apparatus

Figure 4:
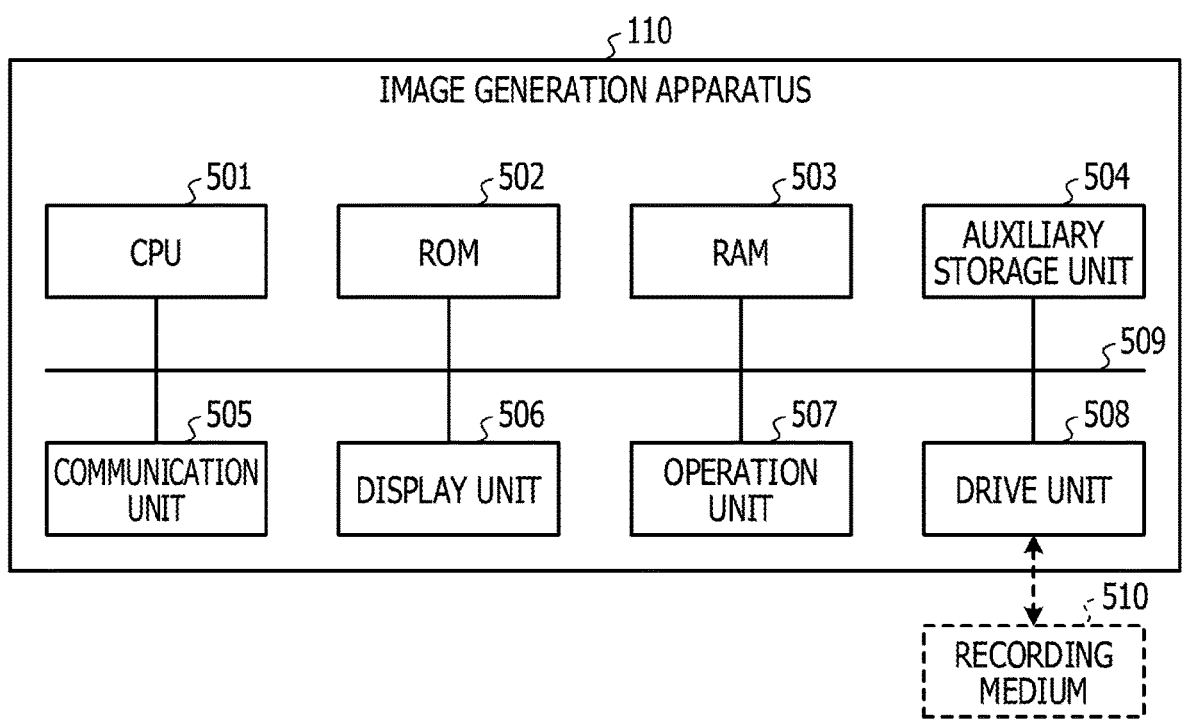
FIG. 4 is a diagram illustrating an example of the hardware configuration of an image generation apparatus according to the embodiment.

Next, the hardware configuration of the image generation apparatus 110 included in the image generation system 100 will be described. FIG. 4 is a diagram illustrating an example of the hardware configuration of the image generation apparatus 110. As illustrated in FIG. 4, the image generation apparatus 110 includes a central processing unit (CPU) 501, a read-only memory (ROM) 502, and a random-access memory (RAM) 503. The image generation apparatus 110 also includes an auxiliary storage unit 504, a communication unit 505, a display unit 506, an operation unit 507, and a drive unit 508. The components of the image generation apparatus 110 are connected to one another through a bus 509.

The CPU 501 executes various programs installed on the auxiliary storage unit 504 (for example, server software). The ROM 502 is a nonvolatile memory. The ROM 502 is a main storage unit storing various programs including a plurality of instructions, data, and the like used by the CPU 501 to execute the various programs stored in the auxiliary storage unit 504. More specifically, for example, the ROM 502 stores boot programs such as a basic input/output system (BIOS) and an extensible firmware interface (EFI).

The RAM 503 is a volatile memory such as a dynamic random-access memory (DRAM) or a static random-access memory (SRAM) and functions as a main storage unit. The RAM 503 provides a working area into which the various programs stored in the auxiliary storage unit 504 are loaded when the CPU 501 executes the various programs.

The auxiliary storage unit 504 stores various programs installed on the image generation apparatus 110 and information (various types of content, various pieces of definition information, and the like) used to execute the various programs. The auxiliary storage unit 504 also stores information (sensor data, log data, and the like) obtained by executing the various programs.

The communication unit 505 is a device for communicating with the information processing apparatuses 141 and 151 of the client systems 140 and 150 connected to the image generation apparatus 110. The display unit 506 is a device that displays states and results of processing performed by the image generation apparatus 110. The operation unit 507 is a device used to input various instructions to the image generation apparatus 110.

The drive unit 508 is a device for setting a recording medium 510. The recording medium 510 may be a medium on which information is optically, electrically, or magnetically recorded, such as a compact disc read-only memory (CD-ROM), a flexible disk, or a magneto-optical disk. The recording medium 510 may be a semiconductor memory such as a ROM or a flash memory, on which information is electrically recorded.

The various programs are installed on the auxiliary storage unit 504 when, for example, the provided recording medium 510 is set in the drive unit 508 and the drive unit 508 reads the various programs recorded on the recording medium 510. Alternatively, the various programs may be installed on the auxiliary storage unit 504 when the various programs are received from the network 180 through the communication unit 505.

Although FIG. 4 illustrates the hardware configuration of the image generation apparatus 110, the information processing apparatus 141 of the client system 140 and the information processing apparatus 151 of the client system 150 also have substantially the same configuration.

Hardware Configuration of HMD

Figure 5:
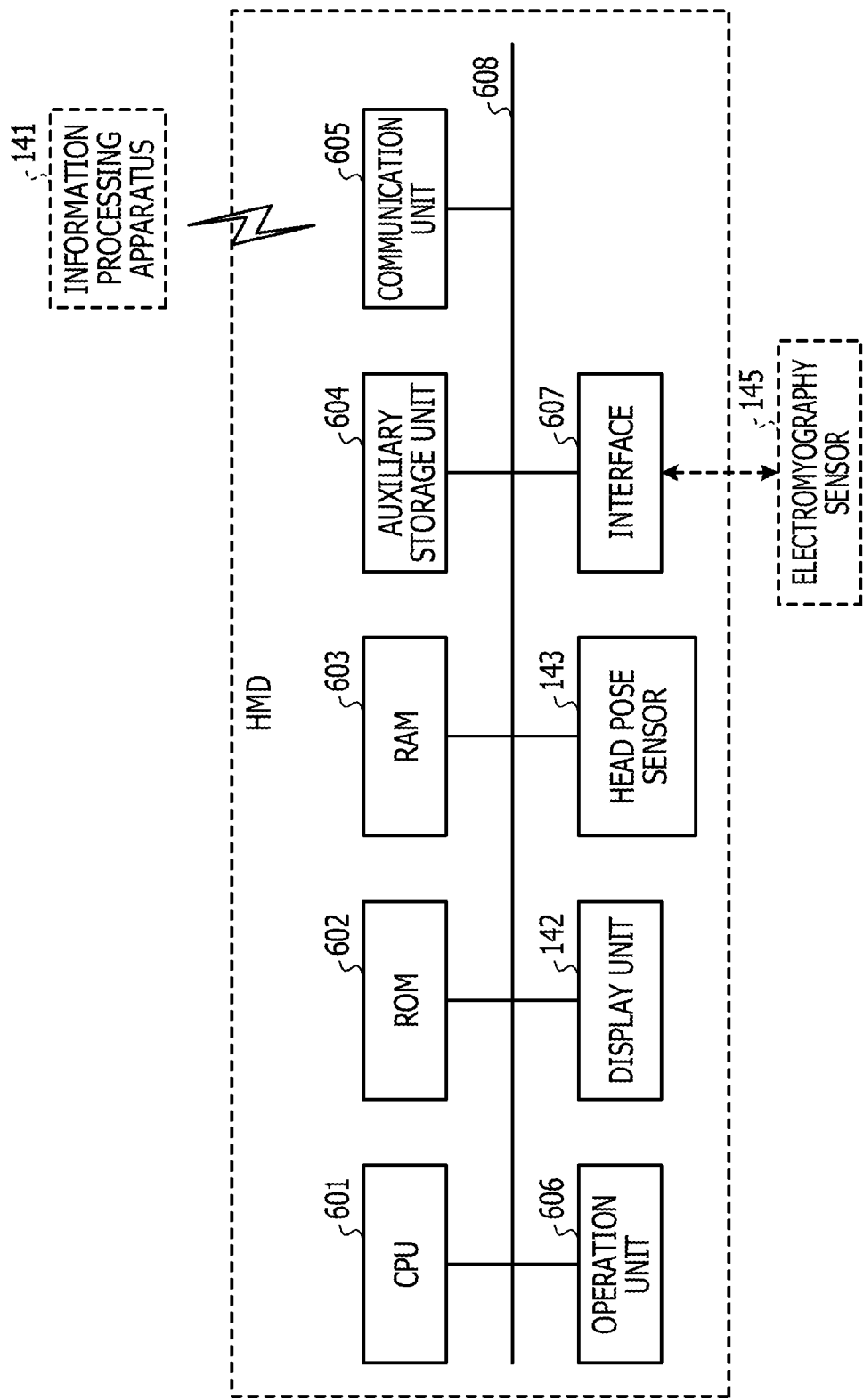
FIG. 5 is a diagram illustrating an example of the hardware configuration of a head-mounted display according to the embodiment.

Next, the hardware configuration of the HMD will be described. FIG. 5 is a diagram illustrating an example of the hardware configuration of the HMD. As illustrated in FIG. 5, the HMD includes a CPU 601, a ROM 602, and a RAM 603. The HMD also includes an auxiliary storage unit 604 and a communication unit 605. The HMD further includes an operation unit 606, the display unit 142, the head orientation sensor 143, and an interface 607. These components are connected to one another through a bus 608. The HMD is also provided with a sound output device (a speaker or the like) and an audio capturing device (a microphone or the like), but because description of communication of audio data is omitted in the embodiments, description of the audio devices is also omitted.

The CPU 601 is a computer that executes various programs installed on the auxiliary storage unit 604. The ROM 602 is a nonvolatile memory. The ROM 602 is a main storage unit that stores various programs including a plurality of instructions, data, and the like used by the CPU 601 to execute the various programs stored in the auxiliary storage unit 604. More specifically, for example, the ROM 602 stores boot programs such as a BIOS and an EFI.

The RAM 603 is a volatile memory such as a DRAM or a SRAM and functions as a main storage unit. The RAM 603 provides a working area into which the various programs stored in the auxiliary storage unit 604 is loaded when the CPU 601 executes the various programs.

The auxiliary storage unit 604 stores the various programs and information used to execute the various programs. The communication unit 605 is a device for communicating with the information processing apparatus 141.

The operation unit 606 is a device used to input various instructions to the HMD. The display unit 142 is a device that displays an image of a virtual space included in virtual space information transmitted from the image generation apparatus 110 through the information processing apparatus 141.

The head orientation sensor 143 senses an orientation of the head included in a nonverbal behavior in the real space and outputs head orientation data.

The interface 607 is connected to the electromyography sensor 145 and obtains electromyography data output from the electromyography sensor 145.

The communication unit 605 transmits the obtained sensor data such as the head orientation data and the electromyography data to the information processing apparatus 141.

Although FIG. 5 illustrates a case where the HMD is a single device, the HMD may include a plurality of separate devices, instead.

First Embodiment

Figure 6:
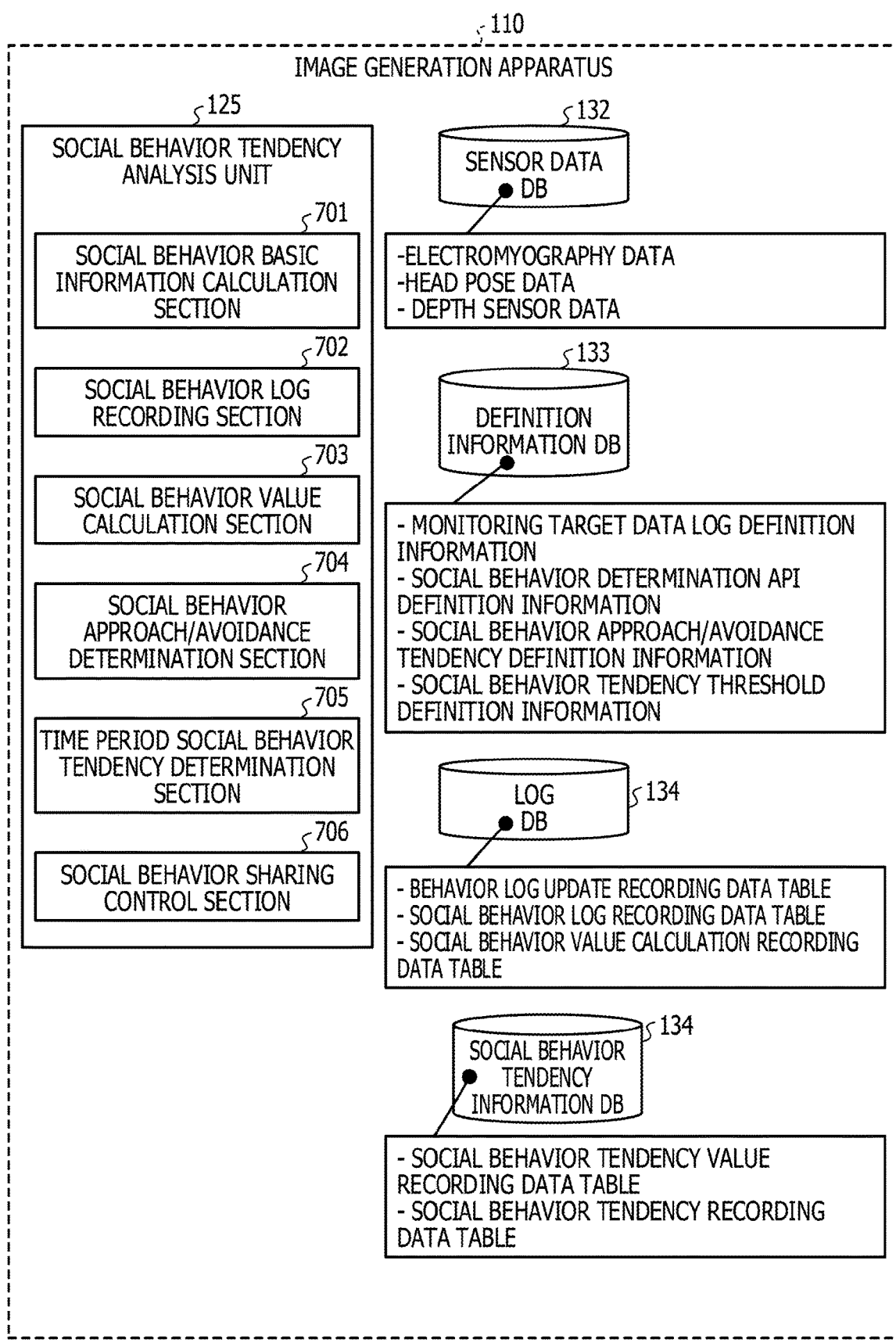
FIG. 6 is a diagram illustrating an example of the functional configuration of a social behavior tendency analysis unit of an image generation apparatus and databases according to a first embodiment.

Functional Configuration of Social Behavior Tendency Analysis Unit of Image Generation Apparatus and Databases Next, the functional configuration of a social behavior tendency analysis unit 125 of the image generation apparatus 110 and databases according to a first embodiment will be described with reference to FIG. 6. FIG. 6 illustrates an example of the functional configuration of the social behavior tendency analysis unit 125 and the databases according to the first embodiment. The social behavior tendency analysis unit 125 includes a social behavior basic information calculation section 701, a social behavior log recording section 702, a social behavior value calculation section 703, a social behavior approach/avoidance determination section 704, a time duration social behavior tendency determination section 705, and a social behavior sharing control section 706.

An electromyography data table, a head orientation data table, and a depth sensor data table are stored in the sensor data database 132. Monitoring target data log definition information, social behavior determination application programming interface (API) definition information, social behavior approach/avoidance tendency definition information, social behavior tendency threshold definition information are stored in a definition information database 133.

A behavior log update recording data table, a social behavior log recording data table, and a social behavior value calculation recording data log table are stored in the log database 134.

A social behavior tendency value recording data log table and a social behavior tendency recording data table are stored in a social behavior tendency information database 135. Details of the components of the social behavior tendency analysis unit 125 and details of the tables stored in the databases will be described hereinafter.

Functions of Components of Social Behavior Tendency Analysis Unit

Social Behavior Basic Information Calculation Section

The functions of the components of the social behavior tendency analysis unit 125 will be described. The social behavior basic information calculation section 701 calculates social behavior basic information such as a physical distance between a first avatar, which is an avatar of a first user, and a second avatar, which is an avatar of a second user, with whom the first user communicates, in a virtual space (shared environment space) shared by the first and second avatars and relative orientations of the first and second avatars. The social behavior basic information calculation section 701 also calculates physical distances between objects in the shared environment space and the first and second avatars and orientations of the first and second avatars relative to the objects.

The first avatar, which is the avatar of the first user, may be the user avatar of the user 160 or the user avatar of the user 170 illustrated in FIG. 2. The second user is a partner with whom the first user communicates and may be the machine avatar or the user avatar of the user 160 or 170. Similarly, the second avatar, which is the avatar of the second user, may be the machine avatar or the user avatar of the user 160 or 170.

In the following description, an avatar that has displayed a behavior will be referred to as an "active avatar", and an avatar who is a target of the behavior will be referred to as a "passive avatar". Although the active avatar is basically the first avatar and the passive avatar is basically second avatar herein, the same holds when the active avatar is the second avatar and the passive avatar is the first avatar.

Figure 8:
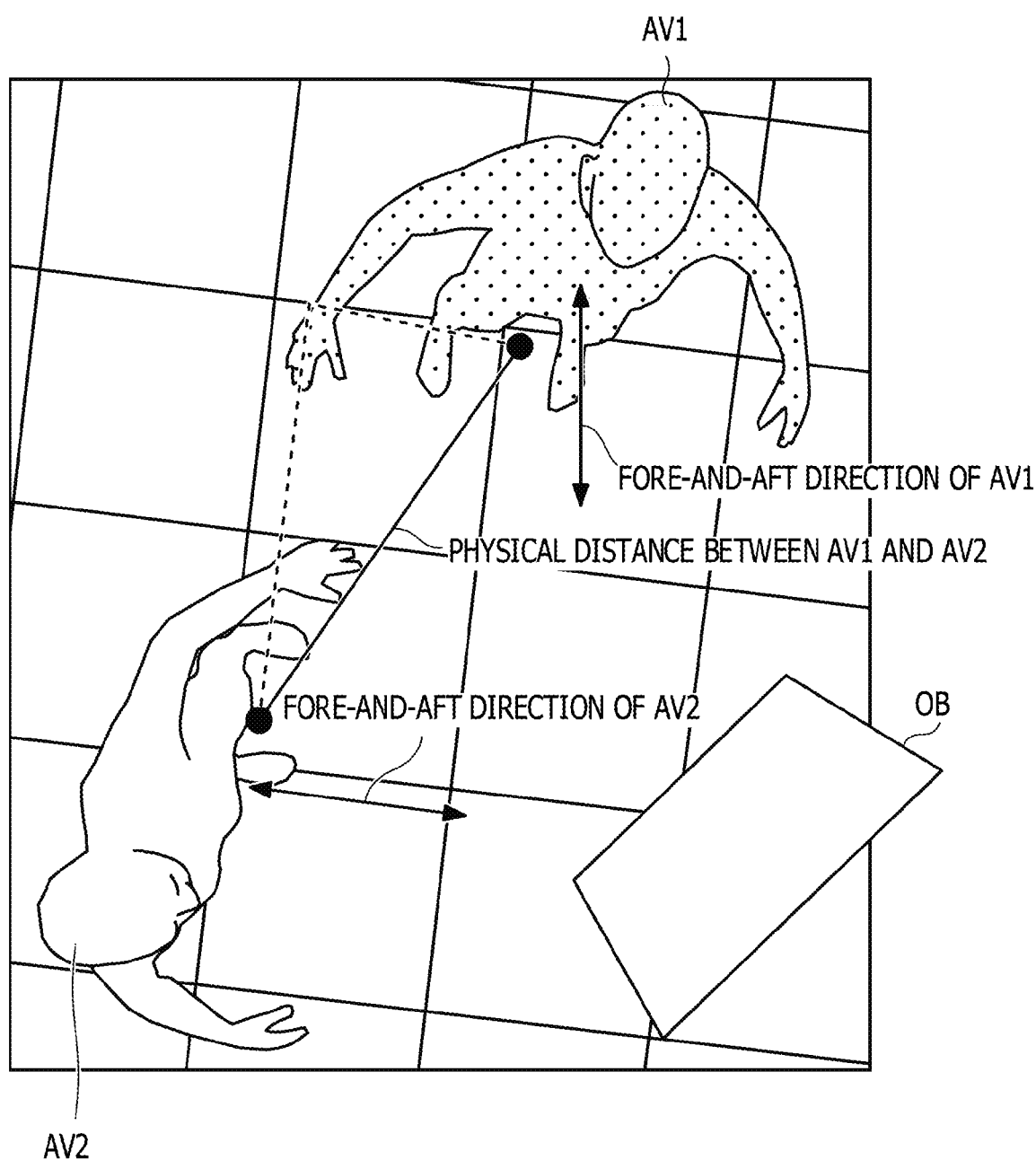
FIG. 8 is a diagram illustrating social behavior basic information.

FIG. 8 is a diagram illustrating social behavior basic information calculated by the social behavior basic information calculation section 701. In a shared environment space where a first avatar AV1, a second avatar AV2, and an object OB illustrated in FIG. 8 exist, for example, positions of the avatars are represented as sets of coordinates (x, y, z). In FIG. 8, position coordinates (0, 0, 0) of the first avatar AV1 and position coordinates (10, 0, 17.32) of the second avatar AV2 are calculated. Although any point on or around each avatar may be used as a reference, a midpoint between left and right feet of each avatar is used as a reference in FIG. 8. Rotation angles of the avatars are represented as rotation angles about the X, Y, and Z axes. In FIG. 8, rotation angles (0, 0, 0) of the first avatar AV1 and rotation angles (0, −90, 0) of the second avatar AV2 are calculated. Position coordinates and rotation angles of bodies and body parts of the first and second avatars AV1 and AV2 are updated by performing a process for generating an image using sensor data, which will be described later, as input data.

A physical distance between the first and second avatars AV1 and AV2 are also calculated. For example, the physical distance between the first and second avatars AV1 and AV2 are calculated as 20 (=0.2 m).

A rotation angle of an upper body of the second avatar AV2 toward the first avatar AV1 on an X-Z plane is calculated as 0 degree based on a fore-and-aft direction of the second avatar AV2. A rotation angle of an upper body of the first avatar AV1 toward the second avatar AV2 is calculated as 0 degree based on a fore-and-aft direction of the first avatar AV1. Similarly, position coordinates (−6, 21, 17) and rotation angles (90, 140, 0) of the object OB are calculated.

The social behavior basic information includes position coordinates and rotation angles of bodies and body parts of avatars and physical distances between the avatars and the like. The social behavior basic information is a set of data regarding a physical positional relationship between avatars in a shared environment space. The social behavior basic information is updated when the physical positional relationship between the avatars in the shared environment space or the like has changed after a social behavior is detected and applied to a corresponding avatar.

Social Behavior Log Recording Section

The social behavior log recording section 702 updates log data regarding a series of behaviors found in data regarding a target one of the bodies and the body parts of the first and second avatars AV1 and AV2. More specifically, if data regarding a body or a body part that is an update monitoring target, which is defined in monitoring target data log definition information 870 illustrated in FIG. 12, satisfies a condition of an update threshold, for example, the social behavior log recording section 702 records behavior log data (recording start time data, recording update time data, and the like) in a behavior log update recording data table 840 illustrated in FIG. 9 and changes an update status to "change being recorded". If the data regarding the body or the body part that is the update monitoring target does not satisfy the condition of the update threshold, the social behavior log recording section 702 changes the update status to "no change recorded" and does not record recording start time data or recording update time data.

When the series of behaviors has ended and the update status has been updated from "change being recorded" to "no change recorded", the social behavior log recording section 702 records data regarding social behavior included in the series of behaviors in a social behavior log recording data table 850 illustrated in FIG. 10 if the log data regarding the series of behaviors corresponds to a social behavior of an avatar displayed to another avatar.

For example, the social behavior log recording section 702 records, in the social behavior log recording data table 850 as a social behavior displayed to a partner with whom a user communicates, a change in orientation relative to an object in a shared environment space during rotation of the user's body or body part and a change in a degree of attention to the partner's body or body part and an object in the shared environment space during movement or the rotation of the user's body or body part.

The social behavior log recording section 702 also records, as a social behavior displayed to the partner with whom the user communicates, a state of a behavior displayed to the partner's body or body part or the object in the shared environment space during the movement or the rotation of the user's body or body part.

Social Behavior Value Calculation Section

The social behavior value calculation section 703 calculates, for each social behavior recorded in the social behavior log recording data table 850, a type, intensity, duration, distance, orientation and an attribute value based on the calculated social behavior basic information, and records the calculated values in a social behavior value calculation recording data table 860. An attribute value varies depending on the social behavior, and includes variables such as "Distance" and "Orientation". For example, "Directto" indicates the number of times that a user has turned to a partner, and "Indirectto" indicates the number of times that a user has turned away from a direction opposite a partner.

Values of types, magnitude, and the like calculated by the social behavior value calculation section 703 are recorded in the social behavior value calculation recording data table 860 illustrated in FIG. 11. The values of types, magnitude, and the like calculated by the social behavior value calculation section 703 may be may be defined using social behavior determination APIs, APIs for identifying types, APIs for identifying magnitude, or the like.

Social Behavior Approach/Avoidance Determination Section

The social behavior approach/avoidance determination section 704 determines whether a social behavior recorded in the social behavior value calculation recording data table 860 exhibits an approach tendency or an avoidance tendency toward a partner. The social behavior approach/avoidance determination section 704 makes the determination based on a social behavior approach/avoidance tendency definition information 890 illustrated in FIG. 14. A result of the determination is recorded in a "social behavior approach/avoidance tendency" field of the social behavior value calculation recording data table 860 illustrated in FIG. 11.

Time Duration Social Behavior Tendency Determination Section

The time duration social behavior tendency determination section 705 determines, based on the number of times or the time amount of exhibition of an approach tendency and an avoidance tendency of social behaviors displayed by a first user to a second user in a certain time duration recorded in a social behavior tendency value recording data table 910 illustrated in FIG. 15, whether a tendency of the social behaviors displayed by the first user to the second user is an approach tendency, an avoidance tendency, or an intermediate tendency. A result of the determination is recorded in a "social behavior tendency" field of a social behavior tendency recording data table 920 illustrated in FIG. 17.

Social Behavior Sharing Control Section

The social behavior sharing control section 706 refers to latest data regarding a tendency of social behaviors recorded by the time duration social behavior tendency determination section 705 in the social behavior tendency recording data table 920 and controls presentation of an avatar for a user who is a communication partner based on the recorded tendency (an approach tendency, an avoidance tendency, or an intermediate tendency). It is assumed, for example, that first and second users are a learner and a lecturer represented as a machine avatar, respectively, and it is desired that the second avatar be presented in accordance with a tendency of social behaviors of the first user. In this case, a record of a tendency of social behaviors displayed by the first user to the second user is referred to, and presentation of a social behavior displayed by the second user to the first user is controlled based on the recorded tendency. If the tendency recorded in the "social behavior tendency" field is an avoidance tendency, for example, social behaviors of the second user is changed to be unobtrusive. If the recorded tendency is an intermediate tendency, the second user in a shared environment space is moved to a more visible position.

Tables Stored in Databases

Next, the tables stored in the databases (the sensor data database 132, the definition information database 133, the log database 134, and the social behavior tendency information database 135) will be described.

(1) Sensor Data Tables

First, the sensor data tables stored in the sensor data database 132 will be described. The sensor data collection management section 111 stores the sensor data tables in the sensor data database 132.

FIGS. 7A to 7C are diagrams illustrating an example of the data tables stored in the sensor data database 132. FIG. 7A illustrates an electromyography data table 810 storing electromyography data. As illustrated in FIG. 7A, the electromyography data table 810 storing electromyography data includes a "database recording time" field, a "sensor recording time" field, a "user name" field, an "information collection apparatus ID" field, and an "electromyographic activity value" field.

The "database recording time" field stores timestamps provided when electromyographic data transmitted from the client systems 140 and 150 has been stored in the sensor data database 132.

The "sensor recording time" field stores timestamps provided when the electromyography sensor 145 and an electromyography sensor 155 have sensed the users 160 and 170, respectively.

The "user name" field stores identifiers of the users 160 and 170 sensed by the electromyography sensors 145 and 155.

The "information collection apparatus ID" field stores identifiers of electromyography sensors. The electromyography sensors have different identifiers for different body parts to be sensed. "TcA_c3_zygomaticus(cheek)" in a first data row illustrated in FIG. 7A is an identifier of an electromyographic sensor that senses cheeks. "TcA_c3_orbicularis(under eye)" in a second data row illustrated in FIG. 7A is an identifier of an electromyography sensor that senses regions under eyes. "TcA_c3_corrugator (brow)" in a third data row illustrated in FIG. 7A is an identifier of an electromyography sensor that senses eyebrows.

The "electromyographic activity value" field stores values of electromyography data obtained by the electromyography sensors.

FIG. 7B illustrates a head orientation data table 820 storing head orientation data. As illustrated in FIG. 7B, the head orientation data table 820 includes substantially the same fields as the electromyography data table 810.

In an "information collection apparatus ID" field of the head orientation data table 820, "TcA_c1" indicates that an information processing apparatus whose information processing apparatus ID is "TcA" is associated with an information collection apparatus whose type is "c1". More specifically, for example, "TcA_c1" indicates the head orientation sensor 143 associated with the information processing apparatus 141.

A "head orientation data" field stores data indicating a position of a head and data indicating rotation angles of the head.

FIG. 7C illustrates a depth sensor data file table 830 storing depth sensor data. As illustrated in FIG. 7C, the depth sensor data file table 830 includes a "database recording time" field, a "user name" field, an "information collection ID" field, and a "sensor recording start time" field. The depth sensor data file table 830 also includes a "sensor recording end time" field and a "depth sensor data recording field uniform resource identifier (URI)" field.

The "sensor recording start time" field stores points in time at which the depth sensor 144 and a depth sensor 154 have started sensing. The depth sensors 144 and 154 output depth sensor data as files having a certain recording length. The "sensor recording start time" field stores timestamps provided when first pieces of depth sensor data included in the files have been sensed.

The "sensor recording end time" field stores points in time at which the depth sensors 144 and 154 have stopped sensing. More specifically, for example, the "sensor recording end time" field stores timestamps provided when last pieces of depth sensor data included in the files having the certain recording length have been sensed.

The "depth sensor data recording field URI" field stores URIs indicating storage locations of the files having the certain recording length.

In the "information collection apparatus ID" field of the depth sensor data file table 830, "TcA_c2" indicates that an information processing apparatus whose information processing apparatus ID is "TcA" is associated with an information collection apparatus whose type is "c2". More specifically, for example, "TcA_c2" indicates the depth sensor 144 associated with the information processing apparatus 141.

(2) Log Table

Next, the log table stored in the log database 134 will be described.

Behavior Log Update Recording Data Table

The social behavior log recording section 702 stores the behavior log update recording data table 840 illustrated in FIG. 9 in the log database 134. As illustrated in FIG. 9, the behavior log update recording data table 840 includes a "database recording time" field, a "recording start time" field, a "recording update time" field, an "active avatar name" field, a "behavior log type label" field, an "update monitoring target" field, an "update status" field, a "recording start time data" field, a "recording update time data" field, and a "social behavior log recording ID reference value" field. Information stored in the fields of the behavior log update recording data table 840 will also be referred to as "behavior log update recording data".

The "database recording time" field stores points in time at which behavior log update recording data has been recorded. The "recording start time" field stores points in time at which recording of behavior log update recording data has started. The "recording update time" field stores points in time at which recording of behavior log update recording data has been updated.

The "active avatar name" field stores an identifier of an avatar that has displayed behaviors indicated by behavior log update recording data (hereinafter referred to as an "active avatar"). The active avatar may be a user avatar corresponding to a user or a machine avatar. An avatar with which the active avatar communicates is a "passive avatar". The passive avatar may be a user avatar or a machine avatar.

The "behavior log type label" stores information indicating types of a user's behavior. Labels including "Orientation" described in the "behavior log type label" field indicate behaviors relating to changes in an orientation of a user's body or body parts. "Orientation_Face" described in a second row of the "behavior log type label" illustrated in FIG. 9, for example, indicates a behavior relating to a change in an orientation of a user's face.

Labels including "Lean" described in the "behavior log type label" field indicate behaviors relating to forward or backward inclination of a user's body. "Lean_Upperbody" described in a fourth row of the "behavior log type label" illustrated in FIG. 9, for example, indicates a behavior relating to forward or backward inclination of a user's upper body.

Labels including "Gesture" described in the "behavior log type label" field indicate behaviors relating to changes in a user's gesture or facial expression. "Gesture_NegativemeaningGesture1" described in a ninth row of the "behavior log type label" illustrated in FIG. 9, for example, indicates a user's negative gesture (for example, crossing of arms). Positive gestures are also included (for example, nodding, smiles, and the like).

Labels including "Distance" described in the "behavior log type label" field, which will be described later, indicate behaviors relating to changes in a position of a user's body or body part. Labels including "Attention" described in the "behavior log type label" field indicate behaviors relating to changes in a user's attention.

The "update monitoring target" field defines components of a user avatar to be monitored in order to detect certain nonverbal behaviors of a user. In the example illustrated in FIG. 9, "Bone_Head" indicates that a head component of a skeleton model of an active avatar is to be monitored.

In the "update status" field, "no change recorded" is recorded if a change in the motion of a component of a skeleton model to be monitored for update is equal to or smaller than a threshold. "Change being recorded" is recorded if a change in the motion of a component of a skeleton model to be monitored for update is equal to or larger than the threshold.

When "change being recorded" is recorded in the "update status" field, position coordinates and rotation angles of a component to be monitored for update at a time of a start of recording are recorded in the "recording start time data", and position coordinates and rotation angles of a component to be monitored for update at a time of an update of recording are recorded in the "recording update time data" field.

When "no change recorded" is recorded in the "update status" field, "null", which indicates that there is no data, is recorded in the "recording start time data" field and the "recording update time data" field.

In the "social behavior log recording ID reference value" field, IDs (social behavior log recording IDs) provided for the social behavior log recording data table 850 illustrated in FIG. 10 are recorded in order to link the behavior log update recording data with social behavior log recording data recorded in the social behavior log recording data table 850 illustrated in FIG. 10 and refer to the behavior log update recording data.

A third row in the example illustrated in FIG. 9 indicates that the user 160 whose active avatar name is "AV1" has displayed a nonverbal behavior and position coordinates and rotation angles of a chest component (Bone_Chest) in an image of the user avatar AV1 were ((2.24, 1.17, 1.68), (−2.40, 3.61, 2.74)) at a recording start time of 12:00:00.000 on Feb. 21, 2017. The third row also indicates that position coordinates and rotation angles of the chest component (Bone_Chest) of the user avatar AV1 were ((2.24, 1.17, 1.68), (−2.40, 20, 2.74)) at a recording update time of 12:00:02.000 on Feb. 21, 2017. The third row also indicates that behavior log update recording data including the position coordinates and the rotation angles was recorded in the log database 134 at 12:00:02.010 on Feb. 21, 2017.

Although behavior log update recording data regarding behaviors of the avatar AV1 is recorded in the behavior log update recording data table 840 illustrated in FIG. 9, behavior log update recording data regarding behaviors of the avatar AV2 is also recorded.

Social Behavior Log Recording Data Table

Next, the social behavior log recording data table 850 will be described with reference to FIG. 10. The social behavior log recording section 702 stores the social behavior log recording data table 850 illustrated in FIG. 10 in the log database 134. The social behavior log recording data table 850 includes a "database recording time" field, a "recording start time" field, a "recording update time" field, an "active avatar name" field, a "passive avatar name" field, a "social behavior log recording ID" field, a "social behavior type label" field, and a "behavior log type label" field.

The "passive avatar name" field stores an identifier of an avatar with whom an avatar indicated by the "active avatar name" field communicates. The "social behavior log recording ID" field stores IDs provided in order to refer to behavior log update recording data corresponding to social behaviors.

The "social behavior type label" field stores types of social behavior. A method for identifying a social behavior type label will be described later.

Social Behavior Value Calculation Recording Data Table

Next, the social behavior value calculation recording data table 860 will be described with reference to FIG. 11. When the social behavior log recording section 702 records a social behavior log, the social behavior value calculation section 703 calculates a type, intensity, duration, distance, orientation and an attribute value based on the calculated social behavior basic information and records the calculated values in the social behavior value calculation recording data table 860 of the log database 134. The social behavior value calculation recording data table 860 includes a "database recording time" field, a "recording start time" field, a "recording update time" field, an "active avatar name" field, a "passive avatar name" field, a "social behavior log recording ID" field, a "social behavior type label" field, a "social behavior type" field, a "social behavior intensity" field, a "social behavior attribute value" field, a "social behavior duration" field, and a "social behavior approach/avoidance tendency" field.

The "social behavior type" field indicates a type of social behavior of a social behavior type label. In a second row in the example illustrated in FIG. 11, for example, "Orientation_Upperbody_Directto" in the "social behavior type label" field indicates that an orientation of an upper body of an avatar indicated in the "active avatar name" field changes toward a partner. In the corresponding "social behavior type" field, "payattention" indicates the change in the orientation of the upper body belongs to a type of social behavior for paying attention to a partner.

The "social behavior intensity" field indicates the intensity of a social behavior indicated in the "social behavior type label" field. In the example illustrated in FIG. 11, the "social behavior intensity" field stores a value ranging from 1 to 10. The larger the value, the higher the intensity of a social behavior.

The "social behavior attribute value" field indicates the number of times or the speed of a social behavior. In the second row in the example illustrated in FIG. 11, for example, the "social behavior attribute value" field indicates that attention paid to a partner was friendly (a highest value on a scale of 10). An attribute value may be a user's personality (introverted or extroverted), gender, a health problem, or the like.

The "social behavior duration" field indicates the duration of a social behavior indicated in the "social behavior type label" field.

The "social behavior approach/avoidance tendency" field stores information indicating whether a social behavior displayed by an active avatar to a passive avatar exhibits an approach tendency or an avoidance tendency.

(3) Definition Information

Next, the definition information stored in the definition information database 133 will be described.

Monitoring Target Data Log Definition Information

FIG. 12 illustrates an example of the monitoring target data log definition information 870 stored in the definition information database 133. As illustrated in FIG. 12, the monitoring target data log definition information 870 includes a "behavior log type label" field, an "update threshold" field, an "update monitoring target" field, a "sensor input information" field, and an "information collection apparatus type ID" field.

The monitoring target data log definition information 870 defines an update threshold and an update monitoring target for each behavior log type label. A second row in the example illustrated in FIG. 12 defines that absolute values of changes in position coordinates of body parts to be monitored indicated by "Distance_Bodyparts", namely a head, a right arm, and a left arm, among components of a user avatar to be monitored are larger than 1 in X, Y, and Z coordinates (>|1|, >|1|, >|1|) and there are no thresholds for rotation angles (*, *, *). When a difference between the "recording start time data" field and the "recording update time data" field of the behavior log update recording data table 840 illustrated in FIG. 9 satisfies a condition of an update threshold of a corresponding behavior log type label, it is determined that the motion of a component of a skeleton model to be monitored for update is equal to or larger than a threshold, and "change being recorded" is recorded in the "update status" field illustrated in FIG. 9. When a difference between the "recording start time data" field and the "recording update time data" field does not satisfy a condition of an update threshold of a corresponding behavior log type label, on the other hand, it is determined that the motion of a component of a skeleton model to be monitored for update is equal to or smaller than the threshold, and "no change recorded" is recorded in the "update status" field illustrated in FIG. 9.

The "sensor input information" field stores types of sensor that detects sensor data. The "information collection apparatus type ID" field defines apparatus type IDs indicating types of sensor apparatus used to collect sensor data.

Social Behavior Determination API Definition Information

FIG. 13 illustrates an example of social behavior determination API definition information 880 stored in the definition information database 133. The social behavior determination API definition information 880 includes a "social behavior type label" field, a "social behavior determination API" field, and a "behavior log type label" field. The "social behavior determination API" field defines calling functions (APIs) in a system used to determine whether a type of behavior of a user defined in the "behavior log type label" field is a social behavior defined in the "social behavior type label" field.

The "behavior log type label" field defines behavior log type labels provided for behaviors that produce data input to APIs. The input data is, for example, sensor input data recorded in a time period from a recording start time to a recording update time for data for which no change has been recorded corresponding to the "behavior log type label" field of the behavior log update recording data table 840. Alternatively, recording start time data and recording update time data for data for which a change regarding an update monitoring target has been recorded immediately before data for which no change regarding the update monitoring target has been recorded corresponding to the "behavior log type label" field of the behavior log update recording data table 840 may be used.

The "social behavior determination API" field defines names of calling functions of APIs, that is, for example, names of APIs called when social behavior type labels are determined based on data input to the APIs. The "social behavior type label" field defines social behavior type labels determined based on APIs.

A first row in the example illustrated in FIG. 13 indicates that whether a behavior of "Distance_Upperbody" (for example, a change from corresponding recording start time data to corresponding recording update time data defined in the behavior log update recording data table 840) defined in the "behavior log type label" field is "Distance_Upperbody_Closeto" or "Distance_Upperbody_Farfrom" defined in the "social behavior type label" field may be determined using a movement check API. That is, by inputting corresponding data to the API, for example, whether "Distanece_Upperbody" is "Distance_Upperbody_Closeto" or "Distance_Upperbody_Farfrom" may be checked based on the API.

Data defined in the "social behavior type label" field of the social behavior determination API definition information 880 indicates the following behaviors. "Distance_Upperbody_Closeto", for example, indicates that an upper body becomes closer to a partner. "Distance_Upperbody_Farfrom" indicates that an upper body becomes farther from a partner. "Distance_Bodyparts_Closeto" indicates that a body part becomes closer to a partner. "Distance_Bodyparts_Farfrom" indicates that a body part becomes farther from a partner. "Distance_Face_Closeto" indicates that a head becomes closer to a partner. "Distance_Face_Farfrom" indicates that a head becomes farther from a partner.

"Attention_Mutual" indicates that a user and a partner look at each other. The expression "look at each other" does not necessarily mean that a user and a partner look at each other's face but may mean, for example, that one of them looks at the other's hand and the other looks at the one's face. "Attention_Averted" indicates that a user looks away from a partner. "Attention_Joint" indicates that a user and a partner look at the same thing, and "Attention_Following" indicates that a user follows a thing that a partner has been looking at.

"Orientation_Face_Directto" indicates that a user turns his/her face to a partner, and "Orientation_Face_Indirectto" indicates that a user turns his/her face away from a partner. "Orientation_Upperbody_Directto" indicates that a user's turns his/her upper body to a partner, and "Orientation_Upperbody_Indirectto" indicates that a user turns his/her upper body away from a partner.

"Lean_Upperbody_Forward" indicates that a user inclines his/her body forward, and "Lean_Upperbody_Backward" indicates that a user inclines his/her body backward.

"Gesture_Smileto" indicates that a user smiles at a partner. "Gesture_Positivemeaninggestureto" indicates that a user makes a positive gesture to a partner, and "Gesture_Negativemeaninggestureto" indicates that a user makes a negative gesture to a partner. Behaviors other than those described in the social behavior determination API definition information 880 illustrated in FIG. 13 may also be defined in the social behavior determination API definition information 880 as behaviors exhibiting an approach tendency or an avoidance tendency.

Social Behavior Approach/Avoidance Tendency Definition Information

FIG. 14 illustrates an example of the social behavior approach/avoidance tendency definition information 890 stored in the definition information database 133. The social behavior approach/avoidance tendency definition information 890 includes a "social behavior type label" field and an "approach/avoidance tendency" field. The "approach/avoidance tendency" field defines an approach tendency or an avoidance tendency for social behaviors defined in the "social behavior type label" field.

A first row in the example illustrated in FIG. 14, for example, defines that "Distance_Upperbody_Closeto", that is, for example, a social behavior of moving an upper body toward a partner, exhibits an approach tendency. "Distance_Upperbody_Farfrom", that is, for example, a social behavior of moving an upper body away from a partner, exhibits an avoidance tendency.

(4) Social Behavior Tendency Information

Next, the information stored in the social behavior tendency information database 135 will be described.

Social Behavior Tendency Recording Data Table

FIG. 15 illustrates an example of the social behavior tendency value recording data table 910 stored in the social behavior tendency information database 135. As illustrated in FIG. 15, the social behavior tendency value recording data table 910 includes a "database recording time" field, a "determination period start time" field, a "determination period end time" field, an "active avatar name" field, a "passive avatar name" field, an "approach tendency value (count)" field, an "avoidance tendency value (count)" field, an "approach tendency value (time [sec])" field, an "avoidance tendency value (time [sec])" field, an "approach tendency value (count ratio)" field, an "avoidance tendency value (count ratio)" field, an "approach tendency value (time [sec] ratio)" field, and an "avoidance tendency value (time [sec] ratio)" field.

The "database recording time" field stores timestamps provided when results of determinations as to a tendency of social behaviors are stored in the social behavior tendency value recording data table 910 illustrated in FIG. 15.

The "active avatar name" stores a name of an avatar of a first user who performs communication, and the "passive avatar name" field stores a name of an avatar of a second user with whom the first user communicates.

The "determination period start time" and "determination period end time" fields store points in time at which social behaviors displayed by an active avatar to a passive avatar recorded in a certain time duration and determined by the time duration social behavior tendency determination section 705 have started and ended, respectively.

The "approach tendency value (count)" and "avoidance tendency value (count)" fields store the number of times of exhibition of an approach tendency and an avoidance tendency, respectively, of social behaviors displayed by an active avatar to a passive avatar recorded in a certain time period.

The "approach tendency value (time [sec])" and "avoidance tendency value (time [sec])" fields store the time amount of exhibition of approach tendencies and avoidance tendencies, respectively, of social behaviors displayed by an active avatar to a passive avatar recorded in certain periods.

The "approach tendency value (count ratio)" field stores a ratio of an approach tendency value to the sum of the approach tendency value (count) and an avoidance tendency value (count). In the example illustrated in FIG. 15, the "approach tendency value (count ratio)" stores 0.45 (=10/(10+12)).

The "avoidance tendency value (count ratio)" field stores a ratio of the avoidance tendency value (count) to the sum. In the example illustrated in FIG. 15, the "avoidance tendency value (count ratio)" field stores 0.55 (=12/(10+12)).

The "approach tendency value (time [sec] ratio)" stores a ratio of an approach tendency value (time [sec]) to the length of a whole period. The length of the whole period is indicated by the "determination period start time" and "determination period end time" fields and 60 seconds in the example illustrated in FIG. 15. In the example illustrated in FIG. 15, therefore, the "approach tendency value (time [sec] ratio)" field stores 0.18 (=11/60).

The "avoidance tendency value (time [sec] ratio)" field stores a ratio of an avoidance tendency value (time [sec]) to the whole period. In the example illustrated in FIG. 15, the "avoidance tendency value (time [sec] ratio)" stores 0.25 (=15/60).

Social Behavior Tendency Threshold Definition Information

FIG. 16 illustrates an example of social behavior tendency threshold definition information 900 stored in the definition information database 133. The social behavior tendency threshold definition information 900 includes a "determination" field, a "threshold-count ratio" field, and a "threshold-time [sec] ratio" field.

The "determination" field defines, if a tendency value of social behaviors displayed by an active avatar to a passive avatar recorded in certain time duration satisfies a certain condition, whether a tendency of the social behaviors is an approach tendency, an avoidance tendency, or an intermediate tendency.

The "threshold-count ratio" field defines, for social behaviors displayed by an active avatar to a passive avatar recorded in certain time duration, a threshold (a condition of a count ratio for identifying an approach tendency) for the approach tendency value (count ratio) calculated from the approach tendency value (count) and the avoidance tendency value (count) and a threshold (a condition of a count ratio for identifying an avoidance tendency) for the avoidance tendency value (count ratio). The "threshold-count ratio" field also defines a condition for identifying an intermediate tendency (a case where a tendency of social behaviors is determined as both an approach tendency and an avoidance tendency based on the above thresholds and a case where a tendency of social behaviors is determined as neither an approach tendency nor an avoidance tendency based on the above thresholds).

The "threshold-time [sec] ratio" field defines, for social behaviors displayed by an active avatar to a passive avatar recorded in certain time duration, a threshold (a condition of a time ratio for identifying an approach tendency) for the approach tendency value (time [sec] ratio) calculated from the approach tendency values (time [sec]) and the avoidance tendency value (time [sec]) and a threshold (a condition of a time ratio for identifying an avoidance tendency) for the avoidance tendency value (time [sec] ratio). The "threshold-time ratio" field also defines a condition for identifying an intermediate tendency (a case where a tendency of social behaviors is determined as both approach tendency and avoidance tendency based on the above thresholds and a case where a tendency of social behaviors is determined as neither an approach tendency nor an avoidance tendency based on the above thresholds).

Social Behavior Tendency Recording Data Table

FIG. 17 illustrates an example of the social behavior tendency recording data table 920 stored in the social behavior tendency information database 135. As illustrated in FIG. 17, the social behavior tendency recording data table 920 includes a "database recording time" field, a "determination period start time" field, a "determination period end time" field, an "active avatar name" field, a "passive avatar name" field, and a "social behavior tendency" field.

The "database recording time" field stores points in time at which social behavior tendencies were recorded. The "determination period start time", "determination period end time", "active avatar name", and "passive avatar name" fields store information stored in the corresponding fields of the social behavior tendency value recording data table 910 illustrated in FIG. 15. The "social behavior tendency" field stores tendencies identified using the thresholds defined in the social behavior tendency threshold definition information 900 illustrated in FIG. 16.

When the approach tendency value (count ratio) and the avoidance tendency value (count ratio) are used for a determination in the example illustrated in FIG. 15, the approach tendency value (count ratio) is 0.45, which does not satisfy the condition of an approach tendency value 0.55 defined in the "threshold-count ratio" field illustrated in FIG. 16. The avoidance tendency value (count ratio), on the other hand, is 0.55, which satisfies the condition of an avoidance tendency value ≥0.55 defined in the "threshold-count ratio" field. "Avoidance tendency", therefore, is recorded in a first row of the "social behavior tendency" field illustrated in FIG. 17 corresponding to the example illustrated in FIG. 15.

Alternatively, the approach tendency value (time [sec] ratio) and the avoidance tendency value (time [sec] ratio) may be used for a determination. In this case, the approach tendency value (time [sec] ratio) is 0.18, which does not satisfy the condition of an approach tendency value ≥0.20 defined in the "threshold-time [sec] ratio" field illustrated in FIG. 16. The avoidance tendency value (time [sec] ratio), on the other hand, is 0.25, which satisfies the condition of an avoidance tendency value ≥0.10 defined in the "threshold-time [sec] ratio" field. In this case, too, "avoidance tendency" is recorded in the "social behavior tendency" field illustrated in FIG. 17. If results of the above two determinations do not match, "intermediate tendency" may be recorded.

In the social behavior tendency analysis unit 125 illustrated in FIG. 6, the functions of the social behavior basic information calculation section 701, the social behavior value calculation section 703, the social behavior approach/avoidance determination section 704, the time duration social behavior tendency determination section 705, and the social behavior sharing control section 706 may be achieved, for example, when a program installed on the image generation apparatus 110 causes the CPU 501 to perform a process.

The social behavior log recording section 702 stores various pieces of data in the sensor data database 132, the definition information database 133, the log database 134, and the social behavior tendency information database 135. The sensor data database 132, the definition information database 133, the log database 134, and the social behavior tendency information database 135 may be stored in a recording area such as the ROM 502, the RAM 503, or the auxiliary storage unit 504, or may be stored in a recording area of a cloud computer through a network.

Process for Collecting Social Behavior Information

Figure 18:
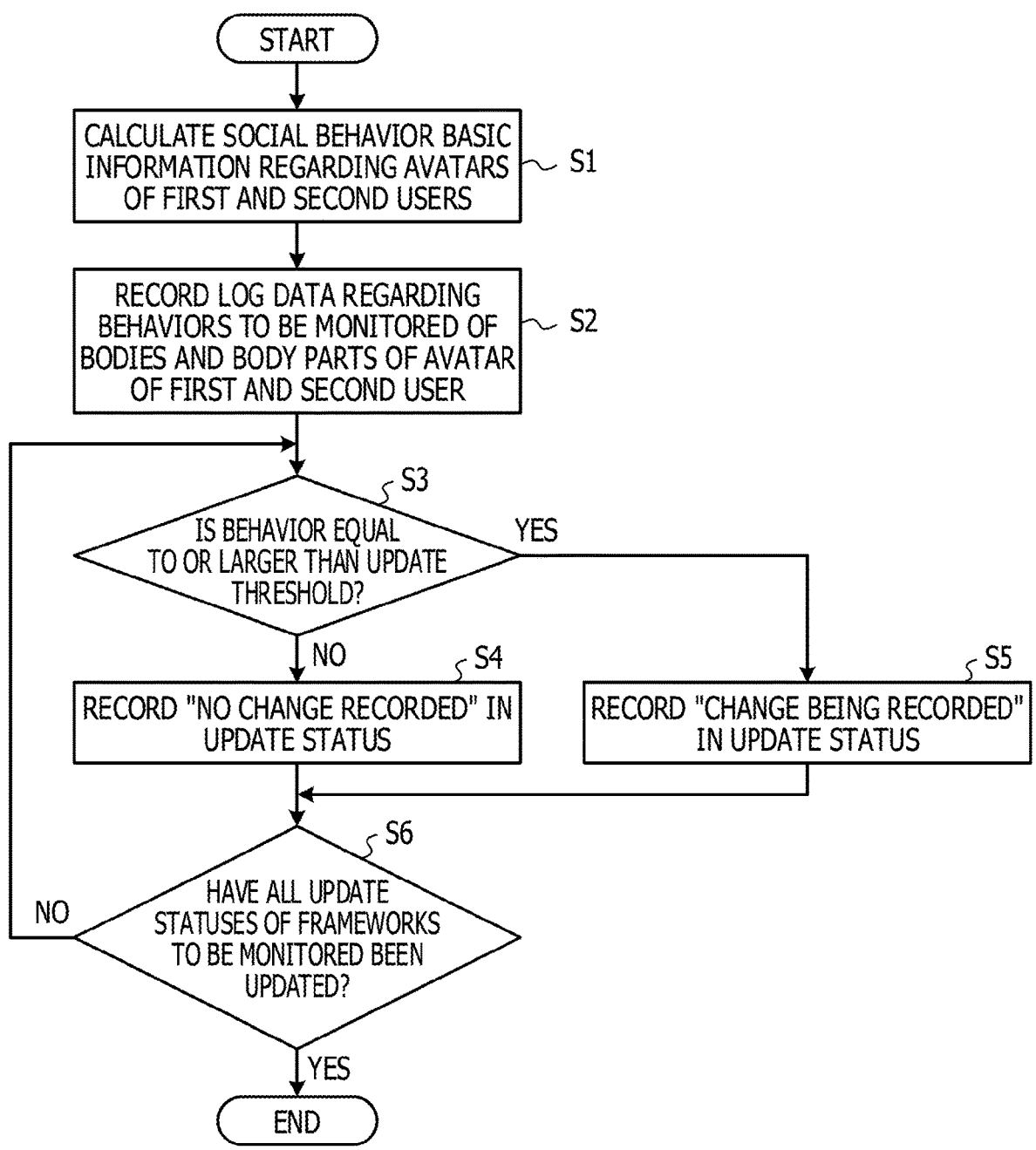
FIG. 18 is a flowchart illustrating an example of a process for collecting social behavior information according to the first embodiment.

Next, an example of a process for collecting social behavior information according to the first embodiment will be described with reference to FIG. 18. FIG. 18 is a flowchart illustrating an example of the process for collecting social behavior information according to the first embodiment.

The process starts at a time (time $t_m$) at which an image of a shared environment space viewed by a first user is updated. The time $t_m$ refers to a time at which virtual space information (image) regarding current avatars is generated (updated). More specifically, for example, the time $t_m$ refers to a time at which a flowchart of updating of an image starts. A time $t_{m-1}$ refers to a time at which previous virtual space information was updated, and a time $t_{m+1}$ refers to a time at which next virtual space information is to be updated. The time $t_{m-n}$, therefore, refers to a time at which an n-th piece of virtual space information in retrospect was updated.

After the process starts, the social behavior basic information calculation section 701 calculates social behavior basic information based on information regarding an avatar of the first user to which sensor data obtained from the first user has been applied and information regarding an avatar of a second user to which sensor data obtained from the second user has been applied (step S1). The social behavior basic information includes position coordinates and rotation angles of the avatars. The avatar of the first user will be referred to as a "first avatar" or an "avatar AV1", and the avatar of the second user will be referred to as a "second avatar" or an "avatar AV2". The first avatar may be an active avatar and the second avatar may be a passive avatar, or the first avatar may be a passive avatar and the second avatar may be an active avatar.

Next, the social behavior log recording section 702 records log data (behavior log update recording data) regarding behaviors to be monitored of bodies and body parts of the avatar of the first user and the avatar of the second user in the behavior log update recording data table 840 (step S2).

Next, the social behavior log recording section 702 determines whether a change from recording start time data to recording update time data recorded in the behavior log update recording data table 840 is equal to or larger than an update threshold defined in the monitoring target data log definition information 870 (step S3). If determining that the change from the recording start time data to the recording update time data is not equal to or larger than the update threshold, the social behavior log recording section 702 records "no change recorded" in the "update status" field of the behavior log update recording data table 840 (step S4), and the process proceeds to step S6. If determining that the change from the recording start time data to the recording update time data is equal to or larger than the update threshold, the social behavior log recording section 702 records "change being recorded" in the "update status" field of the behavior log update recording data table 840 (step S5), and the process proceeds to step S6.

Next, the social behavior log recording section 702 determines whether all update statuses of skeletons to be monitored have been updated (step S6). If the social behavior log recording section 702 determines that not all the update statuses of the skeletons to be monitored have been updated, the process returns to step S3, and steps S3 to S6 are repeated. If the social behavior log recording section 702 determines that all the update statuses of the skeletons to be monitored have been updated, the process ends.

Process for Determining Social Behaviors

Figure 19:
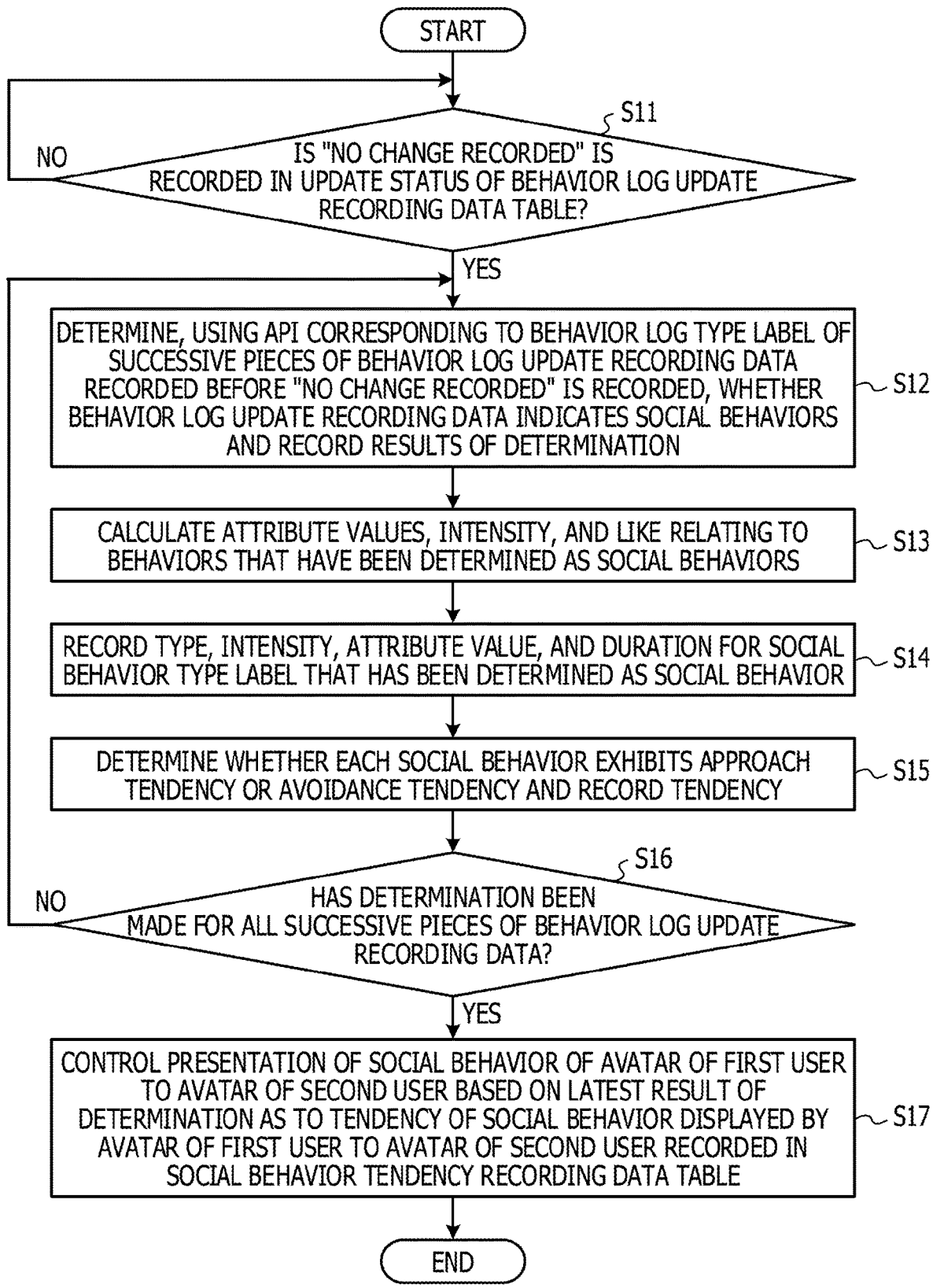
FIG. 19 is a flowchart illustrating an example of a process for determining a social behavior according to the first embodiment.

Next, an example of a process for determining social behaviors according to the first embodiment will be described with reference to FIG. 19. FIG. 19 is a flowchart illustrating an example of the process for determining social behaviors according to the first embodiment.

In the process, the social behavior log recording section 702 determines whether "no change recorded" is recorded in the "update status" field of the behavior log update recording data table 840 (step S11). While the social behavior log recording section 702 keeps determining that "no change recorded" is not recorded in the "update status" field, that is, while the social behavior log recording section 702 keeps determining that "change being recorded" is recorded, for example, step S11 is repeatedly performed.

If determining that "no change recorded" is recorded in the "update status" field, on the other hand, the social behavior log recording section 702 extracts behavior log update recording data regarding an update monitoring target successively recorded in the behavior log update recording data table 840 immediately before the "update status" field changes to "no change recorded" (step S12). In a fifth row in the example illustrated in FIG. 9, for example, "no change recorded" is recorded in the "update status" field at a database recording time of 12:00:03.010 on Feb. 21, 2017 corresponding to Bone_Chest, which is a body part to be monitored for update. In this case, the social behavior log recording section 702 extracts preceding successive pieces of behavior log data whose update statuses are "change being recorded". In this example, two success pieces of behavior log update recording data, namely recording start time data ((2.24, 1.17, 1.68), (−2.40, 3.61, 2.74)) and recording update data ((2.24, 1.17, 1.68), (−2.40, 20, 2.74)) at a database recording time of 12:00:02.010 on Feb. 21, 2017 and recording start time data ((−1.07, 0.87, 1.99), (22.35, −4.21, −7.15)) and recording update time data ((−1.07, 0.87, 1.99), (25, −4.21, −7.15)) at a database recording time of 12:00:02.020 on Feb. 21, 2017, are extracted. The extracted piece of behavior log update recording data recorded at the database recording time of 12:00:02.010 on Feb. 21, 2017 is data regarding a chest component (Bone_Chest). The extracted piece of behavior log update recording data recorded at the database recording time of 12:00:02.020 on Feb. 21, 2017 is data regarding a spine component (Bone_Spine).

Next, the social behavior value calculation section 703 identifies an API corresponding to a behavior log type label of the extracted successive pieces of behavior log update recording data from the social behavior determination API definition information 880. The social behavior value calculation section 703 then determines, using the identified API, whether the successive pieces of behavior log update recording data indicate social behaviors, and records results of the determination in the social behavior log recording data table 850 (step S12).

In the third row in the example illustrated in FIG. 9, a behavior log type label is "Orietantion_Upperbody". An orientation check API, therefore, is identified as a social behavior determination API corresponding to the behavior log type label "Orientation_Upperbody" from the social behavior determination API definition information 880 illustrated in FIG. 13. The social behavior value calculation section 703 then determines, using the identified orientation check API, whether a behavior corresponding a change in the position and the rotation angle from recording start time data ((2.24, 1.17, 1.68), (−2.40, 3.61, 2.74)) to recording update data ((2.24, 1.17, 1.68), (−2.40, 20, 2.74)) is a social behavior. In a second row in the example illustrated in FIG. 10, "Orientation_Upperbody_Directto" is recorded in the "social behavior type label" field of the social behavior log recording data table 850 as a result of the determination.

In a fourth row in the example illustrated in FIG. 9, the behavior log type label is "Lean_Upperbody". A forward and backward inclination check API, therefore, is identified as a social behavior determination API corresponding to the behavior log type label "Lean_Upperbody" from the social behavior determination API definition information 880 illustrated in FIG. 13. The social behavior value calculation section 703 then determines, using the identified forward and backward inclination check API, whether a behavior corresponding a change in the position and the rotation angles from recording start time data ((−1.07, 0.87, 1.99), (22.35, −4.21, −7.15)) to recording update data ((−1.07, 0.87, 1.99), (25, −4.21, −7.15)) is a social behavior. In a third row in the example illustrated in FIG. 10, "Lean_Upperbody_Forward" is recorded in the "social behavior type label" field of the social behavior log recording data table 850 as a result of the determination.

Alternatively, an API does not have to be used, and whether a behavior is a social behavior may be directly determined from sensor data.

In FIG. 19, the social behavior value calculation section 703 then calculates attribute values, intensity, and the like relating to the behaviors that have been determined as social behaviors (step S13). Next, the social behavior value calculation section 703 calculates an attribute value and the duration of each social behavior using types and magnitude of changes in distance and orientation caused by the social behavior and the social behavior basic information calculated in step S13 and records a social behavior type, social behavior intensity, a social behavior attribute value, and social behavior duration in the social behavior value calculation recording data table 860 while associating these pieces of information with the social behavior type label (step S14).

Next, the social behavior approach/avoidance determination section 704 determines whether each social behavior recorded in the social behavior log recording data table 850 exhibits an approach tendency or an avoidance tendency, and records the identified tendency in the "social behavior approach/avoidance tendency" field of the social behavior value calculation recording data table 860 (step S15). At this time, the social behavior approach/avoidance determination section 704 identifies the tendency of each social behavior while associating the tendency with the social behavior type label based on the social behavior approach/avoidance tendency definition information 890. In a second row in the example illustrated in FIG. 11, for example, the social behavior type label is "Orientation_Upperbody_Directto". In this case, "approach tendency" defined in the "approach/ avoidance tendency" field corresponding to the social behavior type label "Orientation_Upperbody_Directto" is identified based on the social behavior approach/avoidance tendency definition information 890 illustrated in FIG. 14. As a result, "approach tendency" is recorded in the "social behavior approach/avoidance tendency" field in the second row of the social behavior value calculation recording data table 860 illustrated in FIG. 11.

In FIG. 19, the social behavior approach/avoidance determination section 704 then determines whether the determination has been made for all the successive pieces of behavior log update recording data (step S16). If the social behavior approach/avoidance determination section 704 determines that the determination has not been made for all the successive pieces of behavior log update recording data, the process returns to step S12, and steps S12 to S16 are repeated until the determination has been made for all the success pieces of behavior log update recording data. If the social behavior approach/avoidance determination section 704 determines in step S16 that the determination has been made for all the successive pieces of behavior log update recording data, the social behavior sharing control section 706 controls presentation of a social behavior of the second user to the first user based on a latest result of a determination of a tendency of a social behavior displayed by the first user to the second user recorded in the "social behavior tendency" field of the social behavior tendency recording data table 920 (step S17), and the process ends. If the avatar of the second user, who is a lecturer, is the avatar AV2 and the avatar of the first user, who is a learner, is the avatar AV1, presentation of a social behavior of the second user, who is the lecturer, to the first user, who is the learner, is controlled while referring to a social behavior tendency exhibited by the learner avatar AV1 to the lecturer avatar AV2.

In step S11, pieces of behavior log update recording data successively recorded immediately before the "update status" field changes to "no change recorded" are extracted when the "update status" field has changed to "no change recorded". That is, when an ongoing behavior has ended and data has been updated from "change being recorded" to "no change recorded", for example, successive pieces of behavior log update recording data are recorded in the social behavior log recording data table 850 if the successive pieces of behavior log update recording data correspond to social behaviors displayed by an avatar to a partner avatar.

As described in the present embodiment, however, information regarding a change in motion does not be extracted when an ongoing behavior has ended. Pieces of behavior log update recording data successively recorded immediately before a certain behavior (for example, a partner turns away his/her face, so that "Attention_Mutual" (looking at each other) ends) of a partner avatar (a user avatar or a machine avatar) is detected or a change in social behavior basic information (for example, a change in an object in an environment) is detected may be extracted and recorded.

That is, for example, the determination as to social behaviors in steps S12 and later may be made based on behaviors of a partner avatar, in consideration of an effect of the behaviors of the partner avatar upon behaviors of a user avatar. Because behaviors of an avatar changes in accordance with changes in environment information (sound, vibration, turning on and off of lights, and the like), the determination as to social behaviors in step S12 and later may be made based on changes in the environment information.

Process for Determining Social Behavior Tendency

Figure 20:
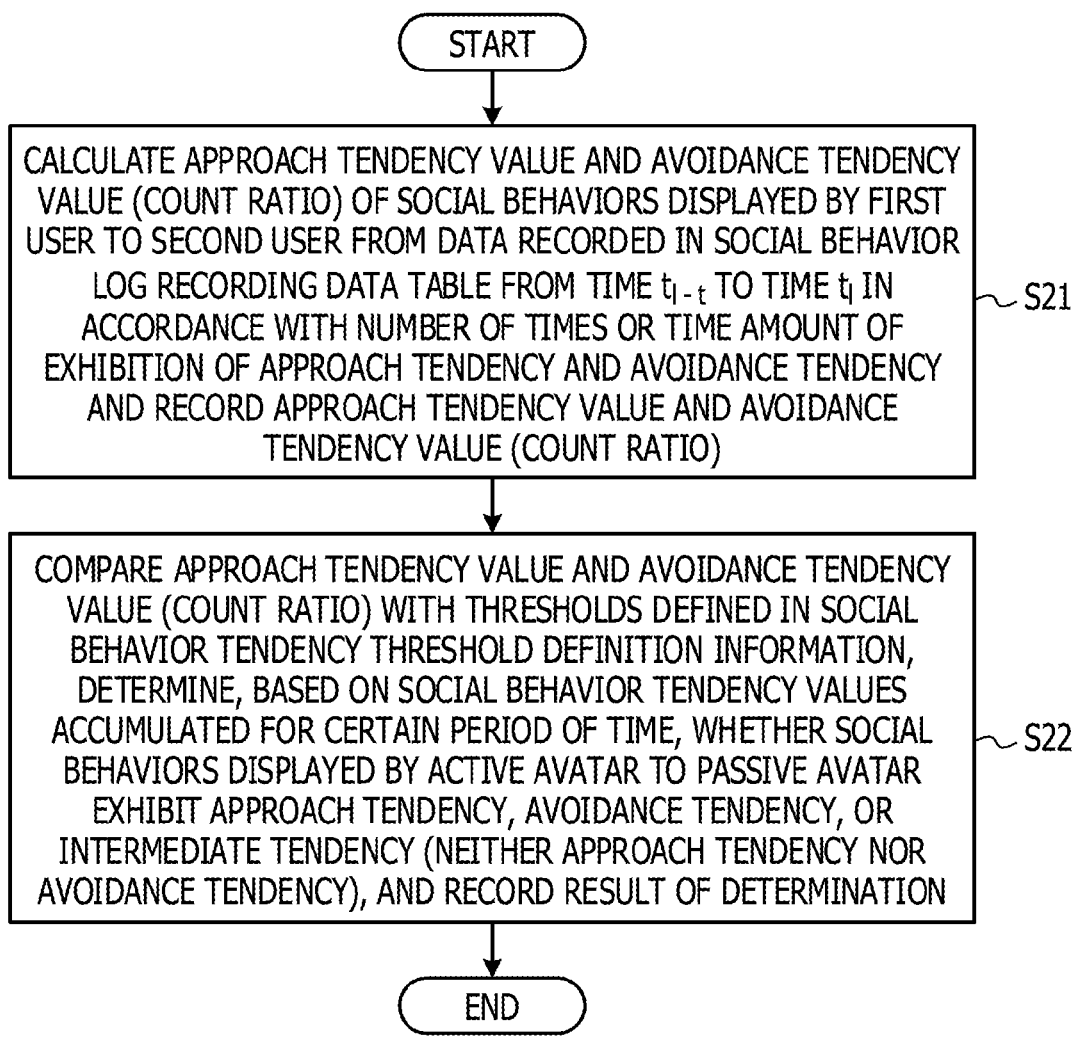
FIG. 20 is a flowchart illustrating an example of a process for determining a social behavior tendency according to the first embodiment.

An example of a process for determining a social behavior tendency according to the first embodiment will be described with reference to FIG. 20. FIG. 20 is a flowchart illustrating an example of the process for determining a social behavior tendency according to the first embodiment.

The process starts at a time $t_l$, for example, when a certain amount of unprocessed social behavior log recording data or more has been accumulated in the social behavior log recording data table 850 illustrated in FIG. 10, when a certain period of time has elapsed since this process was performed previously, or when a conversation has stopped. The time $t_l$ is a current update timing, a time $t_{l-1}$ is a previous update timing, and a time $t_{l+1}$ is a next update timing. A time$_{l-n}$, therefore, is an n-th update timing in retrospect. An example of input data in the process for determining a social behavior tendency according to the present embodiment is a social behavior displayed by the first user to the second user in a certain time period t.

After the process starts, the time duration social behavior tendency determination section 705 calculates an approach tendency value (count ratio) and an avoidance tendency value (count ratio) of social behaviors displayed by the first user to the second user from data recorded in the social behavior log recording data table 850 from the previous update timing $t_{l-t}$ to the current update timing $t_l$ in accordance with the number of times of exhibition of an approach tendency and an avoidance tendency. The time duration social behavior tendency determination section 705 then records the approach tendency value (count ratio) and the avoidance tendency value (count ratio) in the social behavior tendency value recording data table 910 (step S21).

The time duration social behavior tendency determination section 705 calculates an approach tendency value (time

[sec] ratio) and an avoidance tendency value (time [sec] ratio) of social behaviors displayed by the first user to the second user from data recorded in the social behavior log recording data table 850 from the previous update timing $t_{l-t}$ to the current update timing $t_l$ in accordance with the time amount of exhibition of approach tendencies and avoidance tendencies. The time duration social behavior tendency determination section 705 then records the approach tendency value (time [sec] ratio) and the avoidance tendency value (time [sec] ratio) in the social behavior tendency value recording data table 910 (step S21).

Alternatively, the time duration social behavior tendency determination section 705 may calculate only either the approach tendency value (count ratio) and the avoidance tendency value (count ratio) or the approach tendency value (time [sec] ratio) and the avoidance tendency value (time [sec] ratio).

Next, the time duration social behavior tendency determination section 705 compares the approach tendency value (count ratio) with the threshold for the approach tendency value defined in the "threshold-count ratio" field of the social behavior tendency threshold definition information 900. The time duration social behavior tendency determination section 705 also compares the avoidance tendency value (count ratio) with the threshold for the avoidance tendency value defined in the "threshold-count ratio" field of the social behavior tendency threshold definition information 900. The time duration social behavior tendency determination section 705 then determines, based on results of the comparison, whether the social behaviors displayed by the first user to the second user exhibit an approach tendency, an avoidance tendency, or an intermediate tendency, and records a result of the determination in the "social behavior tendency" field of the social behavior tendency recording data table 920 (step S22).

If the approach tendency value (count ratio) exceeds the threshold for the approach tendency value and the avoidance tendency value (count ratio) does not exceed the threshold for the avoidance tendency value, the time duration social behavior tendency determination section 705 determines that the social behaviors displayed by the first user to the second user exhibit an approach tendency.

If the approach tendency value (count ratio) does not exceed the threshold for the approach tendency value and the avoidance tendency value (count ratio) exceeds the threshold for the avoidance tendency value, the time duration social behavior tendency determination section 705 determines that the social behaviors displayed by the first user to the second user exhibit an avoidance tendency.

If both the approach tendency value (count ratio) and the avoidance tendency value (count ratio) do not exceed their respective thresholds, the time duration social behavior tendency determination section 705 determines that the social behaviors displayed by the first user to the second user exhibit an intermediate tendency.

If both the approach tendency value (count ratio) and the avoidance tendency value (count ratio) exceed their respective thresholds, the time duration social behavior tendency determination section 705 determines that the social behaviors displayed by the first user to the second user exhibit an intermediate tendency.

The time duration social behavior tendency determination section 705 compares the approach tendency value (time [sec] ratio) with the threshold for the approach tendency value defined in the "threshold-time [sec] ratio" field of the social behavior tendency threshold definition information 900. The time duration social behavior tendency determination section 705 also compares the avoidance tendency value (time [sec] ratio) with the threshold for the avoidance tendency value defined in the "threshold-time [sec] ratio" field of the social behavior tendency threshold definition information 900. The time duration social behavior tendency determination section 705 determines, based on results of the comparison, whether the social behaviors displayed by the first user to the second user exhibit an approach tendency, an avoidance tendency, or an intermediate tendency. The time duration social behavior tendency determination section 705 records a result of the determination in the "social behavior tendency" field of the social behavior tendency recording data table 920 (step S22), and the process ends. A determination method is the same as when the approach tendency value (count ratio) and the avoidance tendency value (count ratio) are used, and description thereof is omitted.

If the result of the determination based on the approach tendency value (count ratio) and the avoidance tendency value (count ratio) and the result of the determination based on the approach tendency value (time [sec] ratio) and the avoidance tendency value (time [sec] ratio) are different from each other, the time duration social behavior tendency determination section 705 may determine that the social behaviors displayed by the first user to the second user exhibit an intermediate tendency.

Alternatively, only the determination based on the approach tendency value (count ratio) and the avoidance tendency value (count ratio) may be made, or only the approach tendency value (time [sec] ratio) and the avoidance tendency value (time [sec] ratio) may be made.

The thresholds (the thresholds for the approach tendency value and the thresholds for the avoidance tendency value) defined in the social behavior tendency threshold definition information 900 may be dynamically determined based on past data or the like or may be changed in accordance with a level of a relationship between the first and second users.

As described above, with the image generation system 100 according to the first embodiment, whether an overall social behavior of a user in a time period from the time $t_{l-1}$ to the time $t_l$ exhibits an approach tendency, an avoidance tendency, or an intermediate tendency is determined based on comparison with definition information, and sharing of a social behavior with a partner is controlled. The overall social behavior of the user in the time period from the time $t_{l-1}$ to the time $t_l$ is recorded, for example, as the number of times or the time amount of exhibition of approach tendencies and avoidance tendencies of social behaviors displayed by the first user to the second user in the time period per minute.

As a result, the following two cases are distinguished for a behavior such as the first user not looking at the second user in an environment where, in VR, AR, or mixed reality (MR), a peripheral visual field, a viewing angle, or the like is not the same as in a real space and it is not easy to see social behaviors of a partner while viewing content in remote learning or the like, and sharing of a social behavior between the first and second users is controlled. Case 1: The first user displays a social behavior that exhibits an approach tendency or an avoidance tendency to the second user. Case 2: The first user does not display a social behavior that exhibits an approach tendency or an avoidance tendency to the second user.

With the image generation system 100 according to the present embodiment, for example, social behaviors displayed by the first user to the second user from the time $t_{l-1}$ to the time $t_l$ are checked as a whole, and it is determined, for example, that an avoidance tendency exhibited by "Attention" of the first user falls into Case 2 (intermediate tendency) and it is likely that the first user does not look at the second user simply because the first user does not see the second user. In this case, it is determined that the first user does not exhibit either an approach tendency or an avoidance tendency as a whole, and sharing of a social behavior between the first and second users is controlled in such a way as to amplify behaviors of the second user.

Since an overall tendency of social behaviors (for example, an approach tendency of concentrating upon content explained by the second user or an avoidance tendency of not smiling at the second user) of the first user is determined in advance, presentation of a behavior of the second user that ignores behaviors of the first user is avoided.

As a result, when the first user's field of vision is not good, social behaviors of the second user, who is the partner, are presented more saliently. In Case 1, on the other hand, an avatar of the second user moves without ignoring social behaviors of the first user that exhibit an approach tendency or an avoidance tendency, and a more desirable relationship between the users that is similar to one in a real space is built in a virtual space.

Second Embodiment

Figure 21:
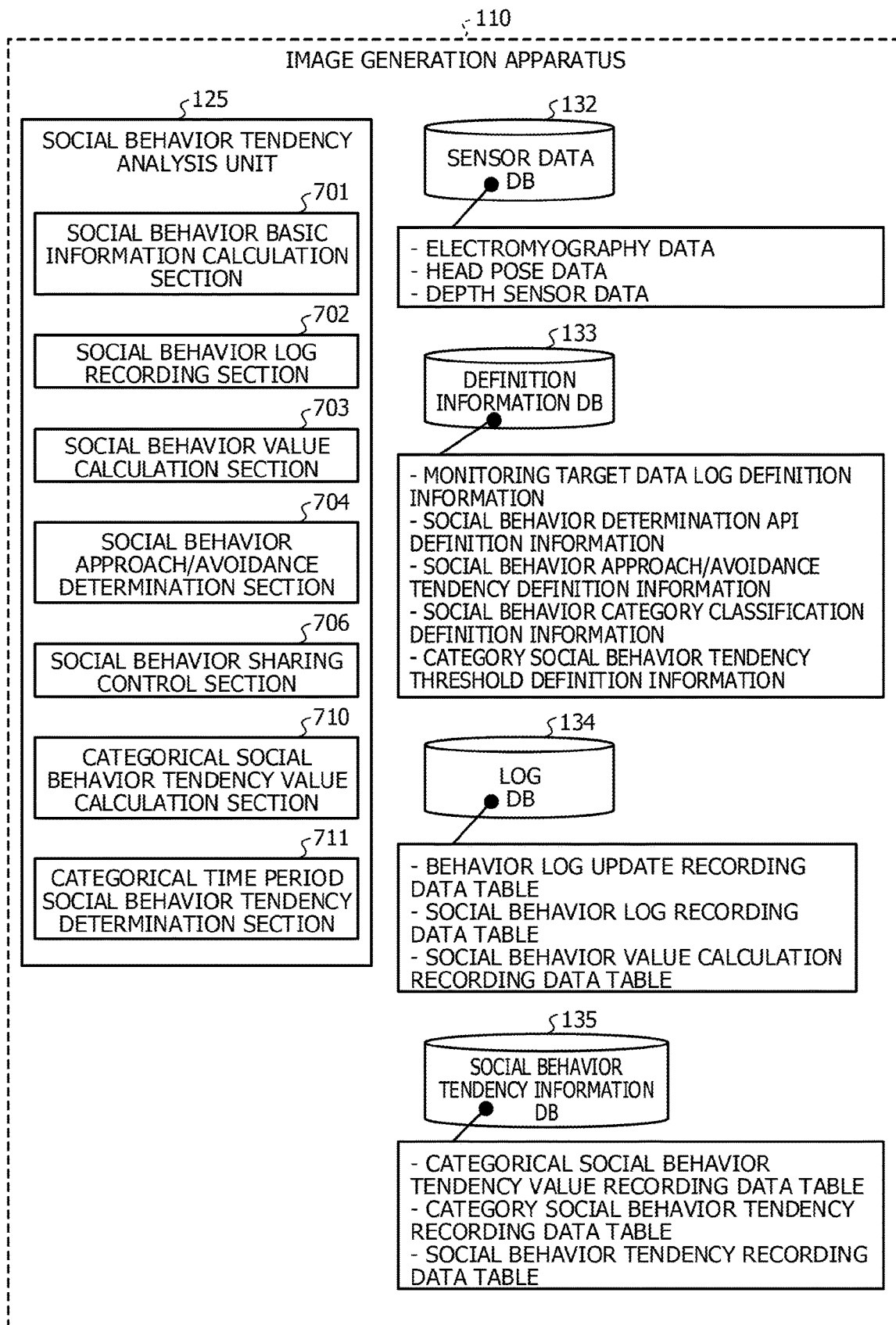
FIG. 21 is a diagram illustrating an example of the functional configuration of a social behavior tendency analysis unit and databases according to a second embodiment.

Functional Configuration of Social Behavior Tendency Analysis Unit of Image Generation System and Databases Next, the functional configuration of a social behavior tendency analysis unit 125 and databases according to a second embodiment will be described with reference to FIG. 21. FIG. 21 illustrates an example of the functional configuration of the social behavior tendency analysis unit 125 and the databases according to the second embodiment. The social behavior tendency analysis unit 125 according to the second embodiment is different from that according to the first embodiment in that the social behavior tendency analysis unit 125 according to the second embodiment includes a categorical social behavior tendency value calculation section 710 and a categorical time duration social behavior tendency determination section 711, as well as the social behavior basic information calculation section 701, the social behavior log recording section 702, the social behavior value calculation section 703, the social behavior approach/avoidance determination section 704, and the social behavior sharing control section 706.

The definition information database 133 according to the second embodiment is different from that according to the first embodiment in that the definition information database 133 according to the second embodiment stores social behavior category classification definition information illustrated in FIG. 22 and categorical social behavior tendency threshold definition information illustrated in FIG. 23. The social behavior tendency information database 135 according to the second embodiment is different from that according to the first embodiment in that the social behavior tendency information database 135 according to the second embodiment stores a categorical social behavior tendency value recording data table illustrated in FIG. 24, a categorical social behavior tendency recording data table illustrated in FIG. 25, and a social behavior tendency recording data table illustrated in FIG. 26. The functional configuration of the social behavior tendency analysis unit 125 and the databases according to the present embodiment will be described hereinafter while focusing upon these differences.

Categorical Social Behavior Tendency Value Calculation Section

The categorical social behavior tendency value calculation section 710 calculates information regarding social behavior values calculated by the social behavior value calculation section 703, that is, for example, the number of times or the time amount of exhibition of approach tendencies and avoidance tendencies of social behaviors displayed by the first user to the second user recorded in certain time duration for each category as an approach tendency value and an avoidance tendency value for the category.

Categorical Time Duration Social Behavior Tendency Determination Section

The categorical time duration social behavior tendency determination section 711 determines a social behavior tendency in the certain time duration for each category based on the calculated social behavior tendency Values for the Category.

Social Behavior Category Classification Definition Information

FIG. 22 illustrates an example of social behavior category classification definition information 1000 according to the second embodiment. The social behavior category classification definition information 1000 includes a "category ID" field, a "category name" field, and a "social behavior type label" field.

The "category ID" field stores identifiers provided for five social behavior categories indicated in the "category name" field.

A category of social behaviors whose category names are "Distance" (hereinafter also referred to as "D") is a category of social behaviors indicating changes in a position of a body or a body part of an active avatar. The "category ID" field stores "1" corresponding to the category "D".

A category of social behaviors whose category names are "Orientation" (hereinafter also referred to as "O") is a category of social behaviors indicating changes in an orientation of a body or a body part of an active avatar. The "category ID" field stores "2" corresponding to the category "O".

A category of social behaviors whose category names are "Lean" (hereinafter also referred to as "L") is a category of social behaviors indicating changes in an inclination of a body of an active avatar. The "category ID" field stores "3" corresponding to the category "L".

A category of social behaviors whose category names are "Attention" (hereinafter also referred to as "A") is a category of social behaviors indicating attention (looking) of an active avatar. The "category ID" field stores "4" corresponding to the category "A".

A category of social behaviors whose category names are "Gesture" (hereinafter also referred to as "G") is a category of social behaviors indicating gestures and other behaviors of an active avatar. The "category ID" field stores "5" corresponding to the category "G".

The "social behavior type label" field defines types of social behavior included in each category. The category "D", for example, includes types of social behavior "Distance_Bodyparts_Closeto", "Distance_Bodyparts_Farfrom", "Distance_Upperbody_Closeto", and "Distance_Upperbody_Farfrom".

Categorical Social Behavior Tendency Threshold Definition Information

FIG. 23 illustrates an example of categorical social behavior tendency threshold definition information 1010 according to the second embodiment. The categorical social behavior tendency threshold definition information 1010 includes a "category ID" field, a "determination" field, a "threshold-count ratio" field, and a "threshold-time [sec] ratio" field.

In the categorical social behavior tendency threshold definition information 1010 illustrated in FIG. 23, a "category ID" field is added to the social behavior tendency threshold definition information 900 illustrated in FIG. 16. The categorical social behavior tendency threshold definition information 1010 defines a determination and thresholds (a threshold-count ratio and a threshold-time [sec] ratio) for each category of social behaviors identified by category IDs.

Categorical Social Behavior Tendency Value Recording Data Table

FIG. 24 illustrates an example of a categorical social behavior tendency value recording data table 1020 according to the second embodiment. In the categorical social behavior tendency value recording data table 1020, a "category ID" field is added to the social behavior tendency value recording data table 910 illustrated in FIG. 15. The categorical social behavior tendency value recording data table 1020 stores social behavior tendency values for each category of social behavior identified in the "category ID" field (approach tendency values (count, time, count ratio, and time ratio) and avoidance tendency values (count, time, count ratio, and time ratio)).

Categorical Social Behavior Tendency Recording Data Table

FIG. 25 illustrates an example of a categorical social behavior tendency recording data table 1030 according to the second embodiment. In the categorical social behavior tendency recording data table 1030, a "category ID" field is added to the social behavior tendency recording data table 920 illustrated in FIG. 17. The categorical social behavior tendency recording data table 1030 stores social behavior tendencies.

Social Behavior Tendency Recording Data Table

FIG. 26 illustrates an example of a social behavior tendency recording data table 1040 according to the second embodiment. The social behavior tendency recording data table 1040 includes the same fields as the social behavior tendency recording data table 920 illustrated in FIG. 17. A "social behavior tendency" field of the social behavior tendency recording data table 1040 stores a social behavior tendency determined from social behavior tendencies recorded in the "social behavior tendency" field of the categorical social behavior tendency recording data table 1030 by a majority vote.

In the social behavior tendency analysis unit 125 illustrated in FIG. 21, the functions of the social behavior basic information calculation section 701, the social behavior value calculation section 703, the social behavior approach/avoidance determination section 704, the social behavior sharing control section 706, the categorical social behavior tendency value calculation section 710, and the categorical time duration social behavior tendency determination section 711 are achieved, for example, when a program installed on the image generation apparatus 110 causes the CPU 501 to perform a process.

Process for Collecting and Determining Social Behavior Information

A process for collecting and determining social behavior information according to the second embodiment is the same as that according to the first embodiment illustrated in the flowcharts of FIGS. 18 and 19, and description thereof is omitted.

Process for Determining Social Behavior Tendency

Figure 27:
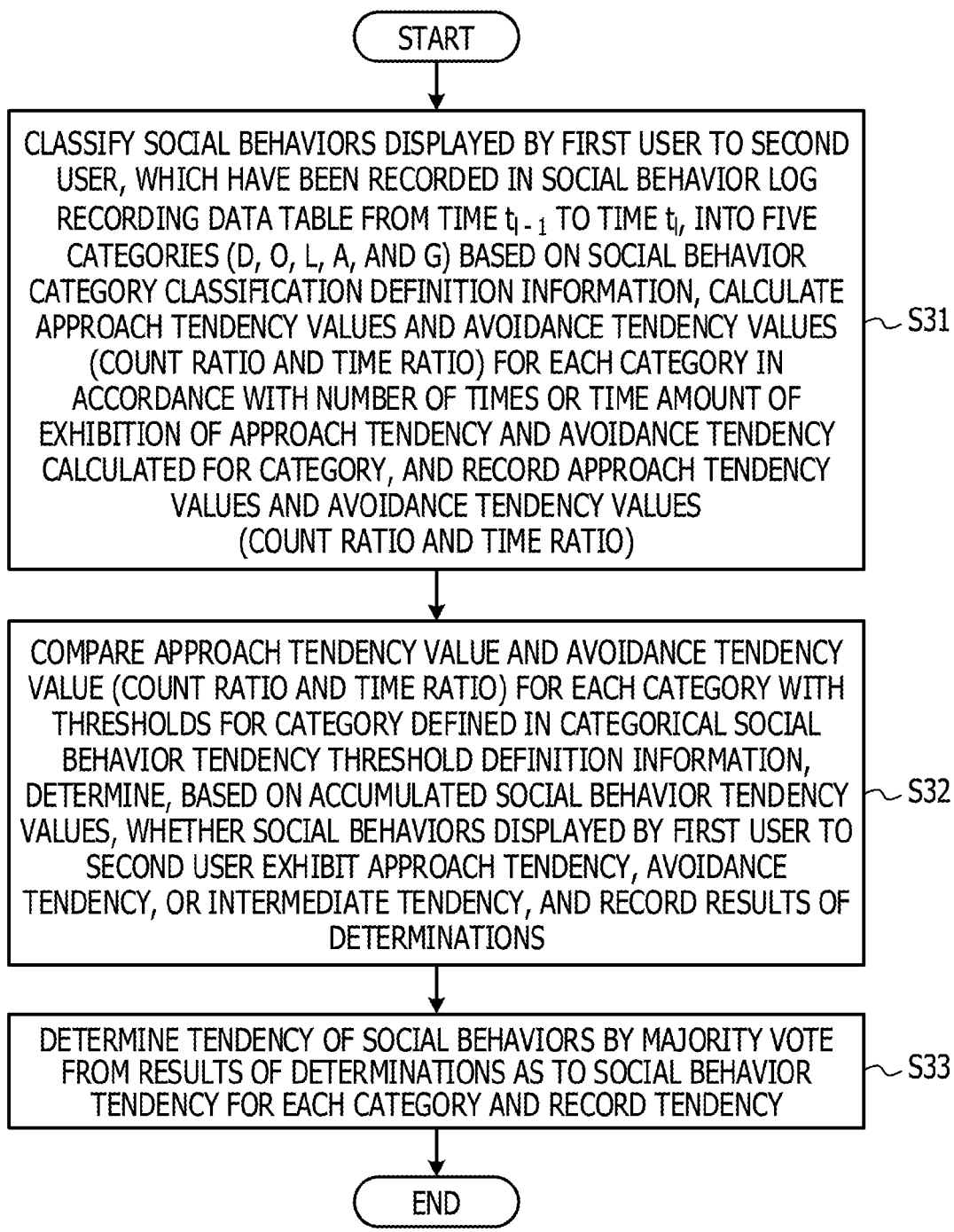
FIG. 27 is a flowchart illustrating an example of a process for determining a social behavior tendency according to the second embodiment.

Next, an example of a process for determining a social behavior tendency according to the second embodiment will be described with reference to FIG. 27. FIG. 27 is a flowchart illustrating an example of the process for determining a social behavior tendency according to the second embodiment. Input data in the process for determining a social behavior tendency according to the present embodiment is social behaviors displayed by the first user to the second user in the certain time period t.

After the process starts, the categorical social behavior tendency value calculation section 710 classifies social behaviors displayed by the first user to the second user, which have been recorded in the social behavior log recording data table 850 from the previous update timing $t_{i-1}$ to the current update timing $t_i$, into five categories (D, O, L, A, and G) based on the social behavior category classification definition information 1000 (step S31). The categorical social behavior tendency value calculation section 710 calculates an approach tendency value (count ratio) and an avoidance tendency value (count ratio) for each category in accordance with the number of times of exhibition of an approach tendency and an avoidance tendency calculated for the category and records the approach tendency value (count ratio) and the avoidance tendency value (count ratio) in the categorical social behavior tendency value recording data table 1020 (step S31).

The categorical social behavior tendency value calculation section 710 also calculates an approach tendency value (time ratio) and an avoidance tendency value (time ratio) for each category in accordance with the time amount of exhibition of approach tendencies and avoidance tendencies calculated for the category and records the approach tendency value (time ratio) and the avoidance tendency value (time ratio) in the categorical social behavior tendency value recording data table 1020 (step S31). Either the approach tendency values or the avoidance tendency values may be calculated, or both the approach tendency values and the avoidance tendency values may be calculated.

Next, the categorical time duration social behavior tendency determination section 711 compares the approach tendency value (count ratio) for each category with the threshold for the approach tendency value for the category defined in the "threshold-count ratio" field of the categorical social behavior tendency threshold definition information 1010. The categorical time duration social behavior tendency determination section 711 also compares the avoidance tendency value (count ratio) for each category with the threshold for the avoidance tendency value for the category defined in the "threshold-count ratio" field of the categorical social behavior tendency threshold definition information 1010. The categorical time duration social behavior tendency determination section 711 determines, as a result of the comparison for each category, whether the social behaviors displayed by the first user to the second user exhibit an approach tendency, an avoidance tendency, or an intermediate tendency, and records a result of the determination in the "social behavior tendency" field corresponding to the "category ID" field of the categorical social behavior tendency recording data table 1030 (step S32).

The categorical time duration social behavior tendency determination section 711 compares the approach tendency value (time [sec] ratio) for each category with the threshold for the approach tendency value for the category defined in the "threshold-time [sec] ratio" field of the categorical social behavior tendency threshold definition information 1010. The categorical time duration social behavior tendency determination section 711 also compares the avoidance tendency value (time [sec] ratio) for each category with the threshold for the avoidance tendency value for the category defined in the "threshold-time [sec] ratio" field of the categorical social behavior tendency threshold definition information 1010. The categorical time duration social behavior tendency determination section 711 determines, as a result of the comparison for each category, whether the social behaviors displayed by the first user to the second user exhibit an approach tendency, an avoidance tendency, or an intermediate tendency, and records a result of the determination in the "social behavior tendency" field corresponding to the "category ID" field of the categorical social behavior tendency recording data table 1030 (step S32).

Next, the categorical time duration social behavior tendency determination section 711 determines a tendency of the social behaviors displayed by the first user to the second user by a majority vote from the results of the determinations as to the social behavior tendency for each category recorded in the "social behavior tendency" field of the categorical social behavior tendency recording data table 1030. The categorical time duration social behavior tendency determination section 711 then records the tendency in the "social behavior tendency" field of the social behavior tendency recording data table 1040 (step S33), and the process ends.

In the example illustrated in FIG. 25, the social behavior tendency for each category recorded in the "social behavior tendency" field of the categorical social behavior tendency recording data table 1030 is subjected to a majority vote, and an avoidance tendency is recorded as an overall social behavior tendency for all the categories indicated in the "social behavior tendency" field of the social behavior tendency recording data table 1040.

As described above, with the image generation system 100 according to the second embodiment, whether an overall tendency of social behaviors of a user in the time period from the time $t_{l-1}$ to the time $t_l$ is determined for each category (D, O, L, A, and G) as an approach tendency, an avoidance tendency, or an intermediate tendency through comparison with the definition information, and sharing of a social behavior with a partner is controlled. The overall tendency of the social behaviors of the user in the time period from the time $t_{l-1}$ to the time $t_l$ is recorded for each category as, for example, the number of times or the time amount of exhibition of approach tendencies and avoidance tendencies of social behaviors displayed by the first user to the second user in the time period per minute.

As a result, with the image generation system 100 according to the present embodiment, an overall tendency of social behaviors displayed by the first user to the second user in the time period from the time $t_{l-1}$ to the time $t_l$ is collected for each category and checked, and sharing of a social behavior between the first and second users is controlled more accurately. According to the present embodiment, when "Attention" of the first user exhibits an avoidance tendency, social behavior tendencies for the other categories (D, O, L, and G) are checked as a whole, and whether a reason why the avoidance tendency is exhibited in "Attention" of the first user is that there is an actual avoidance tendency toward the second user or that it is likely that the first user does not look at the second user simply because the first user does not see the second user is determined.

As a result, when the first user's field of vision is not good, social behaviors of the second user, who is the partner, are presented more evidently. In addition, an avatar of the second user moves without ignoring social behaviors of the first user that exhibit an approach tendency or an avoidance tendency, and a more desirable relationship between the users that is similar to one in a real space is built in a virtual space.

Third Embodiment

Figure 28:
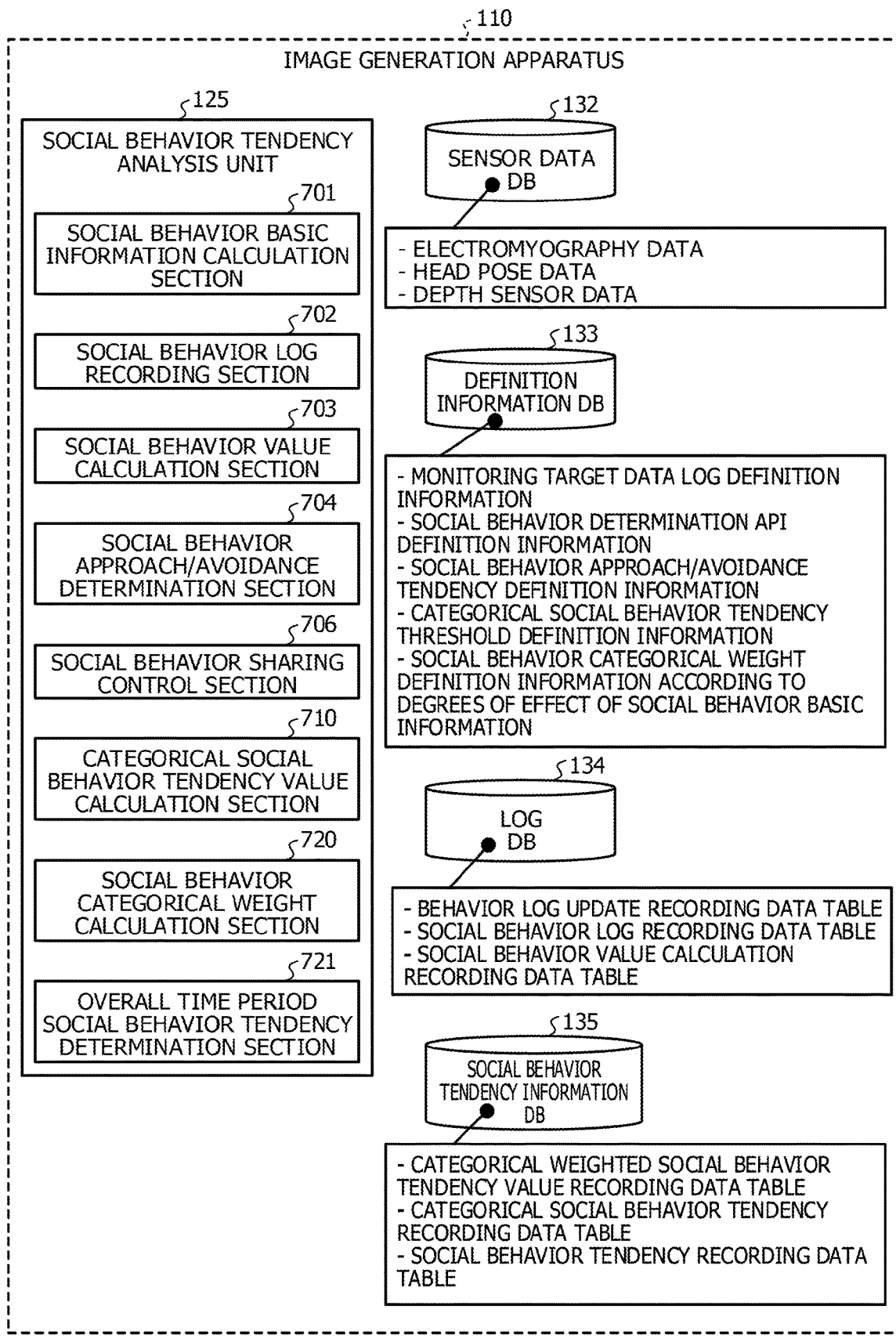
FIG. 28 is a diagram illustrating an example of the functional configuration of a social behavior tendency analysis unit and databases according to a third embodiment.

Functional Configuration of Social Behavior Tendency Analysis Unit and Databases Next, the functional configuration of a social behavior tendency analysis unit 125 and databases according to the third embodiment will be described with reference to FIG. 28. FIG. 28 illustrates an example of the functional configuration of the social behavior tendency analysis unit 125 and the databases according to the third embodiment. The social behavior tendency analysis unit 125 includes a social behavior categorical weight calculation section 720 and an overall time duration social behavior tendency determination section 721, as well as the social behavior basic information calculation section 701, the social behavior log recording section 702, the social behavior value calculation section 703, the social behavior approach/avoidance determination section 704, the social behavior sharing control section 706, and the categorical social behavior tendency value calculation section 710.

The definition information database 133 stores social behavior categorical weight definition information according to degrees of an effect of social behavior basic information illustrated in FIG. 29. The social behavior tendency information database 135 stores categorical weighted social behavior tendency value recording data table illustrated in FIG. 30, a categorical social behavior tendency recording data table illustrated in FIG. 31, and a social behavior tendency recording data table illustrated in FIG. 32. The functional configuration of the social behavior tendency analysis unit 125 and the databases according to the present embodiment will be described hereinafter.

Social Behavior Categorical Weight Calculation Section

The social behavior categorical weight calculation section 720 calculates a weight for each category in accordance with a degree of the effect of the social behavior basic information in order to classify social behaviors into the categories.

Overall Time Duration Social Behavior Tendency Determination Section

The overall time duration social behavior tendency determination section 721 weights approach tendency values and avoidance tendency values using the weight for each category calculated by the social behavior categorical weight calculation section 720 and determines a social behavior tendency in a time duration using the weighted approach tendency values and avoidance tendency values as a whole.

Social Behavior Categorical Weight Definition Information According to Degrees of Effect of Social Behavior Basic Information FIG. 29 illustrates an example of social behavior categorical weight definition information 1100 according to degrees of an effect of a circumstance to be taken into consideration (looking in this environment is different from looking in an actual environment or the like) according to the third embodiment. In the print job property screen 1100 according to the degrees of the effect of the social behavior basic information, a "degree of effect" field and a "weight" field are added to the fields of the social behavior category classification definition information 1000 illustrated in FIG. 22.

The "degree of effect" field and the "weight" field define degrees of the effect of the circumstance to be taken into consideration and weights, respectively, for social behavior type labels included in the categories identified by the category IDs. Definitions of the degrees of the effect and the weights will be described hereinafter.

It is assumed that input data is social behaviors displayed by the first user (a user A) to the second user (a user B) in the certain time period t. In the following description, the circumstance to be taken into consideration is an environment where a field of vision of the user A is not good (an avatar of the user B is hidden behind something or the like). In the following description, operations that are likely to be affected by the circumstance to be taken into consideration in each category will be enclosed in double quotation marks.

In order to cause an avatar to exhibit an approach tendency of "Bodyparts_Closeto" or an avoidance tendency of "Bodyparts_Farfrom" in the category "D" in a virtual space, the following operations (1) to (4) are performed. (1) "A position of the user B is identified." (2) A position of the user A is identified. (3) A range within which the user A may move is identified based on the two identified positions. (4) A distance from a head of the user A to the user B, for example, is decreased or increased on an X-Z plane in the identified range within which the user A may move. Similarly, for "Upperbody_Closeto" (approach tendency) or "Upperbody_Farfrom" (avoidance tendency) in the category "D", the following operations (1) to (4) are performed. (1) "The position of the user B is identified." (2) The position of the user A is identified. (3) The range within which the user A may move is identified based on the two identified positions. (4) A distance from a chest of the user A to the user B is decreased or increased on the X-Z plane in the identified range within which the user A may move. The operation (1) is likely to be affected by the environment where the field of vision of the user A is not good.

For "Face_Directto" (approach tendency) or "Face_Indirectfrom" (avoidance tendency) in the category "O", the following operations (1) to (3) are performed. (1) "The position of the user B is identified." (2) The position of the user A is identified. (3) Rotation angles of the head of the user A relative to the user B are decreased or increased about a Y axis in a direction on the X-Z plane connecting the two identified positions to each other. Similarly, for "Upperbody_Directto" (approach tendency) or "Upperbody_Indirectfrom" (avoidance tendency) in the category "O", the following operations (1) to (3) are performed. (1) "The position of the user B is identified." (2) The position of the user A is identified. (3) Rotation angles of the chest of the user A relative to the user B are decreased or increased about the Y axis in a direction on the X-Z plane connecting the two identified positions to each other. Among (1) to (3), an occurrence frequency of the operation (1) is likely to be affected.

For "Lean_Forward" (approach tendency) or "Lean_Backward" (avoidance tendency) in the category "L", the following operations (1) and (2) are performed. (1) A front direction of the user A is identified. (2) Rotation angles of the chest of the user A relative to the user B are decreased or increased about an X axis in the front direction on a Y-Z plane. The operations (1) and (2) are not likely to be affected by the environment where the field of vision of the user A is not good.

For "Mutual" (approach tendency) in the category "A", the following operations (1) to (7) are performed. (1) "1-1. The position of the user B is identified." (2) 1-2. The front direction of the user A is identified. (3) 1-3. The front direction of the user A is directed to the user B on the X-Z plane. (4) "2-1. The user B identifies the position of the user A." (5) 2-2. The user B identifies a front direction thereof. (6) 2-3. The user B directs the front direction thereof to the user A on the X-Z plane. (7) "1-1 to 1-3 and 2-1 to 2-3 are repeated." Among (1) to (7), occurrence frequencies of the operations (1), (4), and (7) are likely to be affected.

For "Averted" (avoidance tendency) in the category "A", the following operations (1) to (5) are performed. (1) "1. The position of the user B is identified." (2) 2. The front direction of the user A is identified. (3) 3. The front direction of the user A is directed to the user B on the X-Z plane. (4) "1 to 3 are repeated. 1 and 2 are performed." (5) The front direction of the user A is directed to a position other than the user B on the X-Z plane. Among (1) to (5), occurrence frequencies of the operations (1) and (4) are likely to be affected. For "Joint" (approach tendency) in the category "A", there is no operation that is likely to be affected by the environment where the field of vision of the user A is not good (the avatar of the user B is hidden behind something or the like).

In the category "G" (others), there is no operation that is likely to be affected by the environment where the field of vision of the user A is not good (the avatar of the user B is hidden behind something or the like).

In the above description, a degree of an effect of the environment where the field of vision of the user A is not good upon the operations in each category is indicated by a ratio of the number of operations that are likely to be affected by the environment where the field of vision of the user A is not good to the total number of operations.

Among the operations (1) to (4) in the category "D", for example, the operation (1) is affected by the environment where the field of vision of the user A is not good, regardless of whether the operations (1) to (4) are performed for a change in the position of the body part or a change in the position of the upper body. The degree of the effect of the environment where the field of vision of the user A is not good in the category "D", therefore, is 0.25 (=¼). In the example illustrated in FIG. 29, "0.25" is defined in the "degree of effect" field and the "weight" field for the category "D".

Among the operations (1) to (3) in the category "O", for example, the operation (1) is affected by the environment where the field of vision of the user A is not good, regardless of whether the operations (1) to (3) are performed for a change in the orientation of the face or a change in the orientation of the upper body. The degree of the effect of the environment where the field of vision of the user A is not good in the category "O", therefore, is 0.33 (=⅓). In the example illustrated in FIG. 29, "0.33" is defined in the "degree of effect" field and the "weight" field for the category "O".

The operations (1) and (2) in the category "L" are not affected by the environment where the field of vision of the user A is not good. In the example illustrated in FIG. 29, "0" is defined in the "degree of effect" field for the category "L". "0.05" is defined in the "weight" field as a value other than 0 but close to 0.

Among the operations (1) to (7) for "Mutual" in the category "A", the operations (1), (4), and (7) are affected by the environment where the field of vision of the user A is not good. Among the operations (1) to (5) for "Averted", on the other hand, the operations (1) and (4) are affected by the environment where the field of vision of the user A is not good. The degree of the effect of the environment where the field of vision of the user A is not good in the category "A", therefore, is 0.41 (an average of 3/7 and 2/5). In the example illustrated in FIG. 29, "0.41" is defined in the "degree of effect" field and the "weight" field for the category "A".

The operations (1) and (2) in the category "G" are not affected by the environment where the field of vision of the user A is not good. Since the category "G" includes various other social behaviors as well as gestures (since such gestures are more likely to be affected by the environment where the field of vision of the user A is not good than in the category "L"), "0.1" is defined in the "degree of effect" field and the "weight" field for the category "G" in the example illustrated in FIG. 29.

Categorical Weighted Social Behavior Tendency Value Recording Data Table

FIG. 30 illustrates an example of a categorical weighted social behavior tendency value recording data table 1110 according to the third embodiment. In the categorical weighted social behavior tendency value recording data table 1110, a "weighted approach tendency value (count ratio)" field, a "weighted avoidance tendency value (count ratio)" field, a "weighted approach tendency value (time [sec] ratio)" field, and a "weighted avoidance tendency value (time [sec] ratio)" field are added to the categorical social behavior tendency value recording data table 1020 illustrated in FIG. 24.

In the "approach tendency value (count)" field and the "avoidance tendency value (count)" field of the categorical weighted social behavior tendency value recording data table 1110, an example of collected data for each category, that is, for example, the total number of social behaviors that have exhibited an approach tendency or an avoidance tendency for each category in a certain time duration (for example, the time period t) is recorded. In the example illustrated in FIG. 30, "10" and "12" are recorded in the "approach tendency value (count)" field and the "avoidance tendency value (count)" field, respectively, corresponding to a category ID "1". As a result, "0.45" (=10/(10+12)) and "0.55" (=12/(10+12)) are recorded in the "approach tendency value (count ratio)" field and the "avoidance tendency value (count ratio)" field, respectively, for the category before the weighting.

A weighted approach tendency value (count ratio) for each category is calculated by multiplying an approach tendency value (count ratio) and a weight (=the degree of the effect of the environment where a field of vision is not good). In the example illustrated in FIG. 30, "0.11" (=0.45×0.25) is recorded in the "weighted approach tendency value (count ratio)" field corresponding to the category ID "1". "0.14" (=0.55×0.25) is recorded in the "weighted avoidance tendency value (count ratio)" field for the category ID "1" (=category "D").

In the "approach tendency value (time)" field and the "avoidance tendency value (time)" of the categorical weighted social behavior tendency value recording data table 1110, an example of collected input data for each category, that is, for example, the total duration of social behaviors that have exhibited an approach tendency or an avoidance tendency for each category in a certain time duration (for example, the time period t) is recorded. In the example illustrated in FIG. 30, "11" (seconds) and "15" are recorded in the "approach tendency value (time)" field and the "avoidance tendency value (time)" field, respectively, corresponding to the category ID "1". As a result, "0.18" (=11/60) and "0.25" (=15/60) are recorded in the "approach tendency value (time ratio)" field and the "avoidance tendency value (time ratio)" field, respectively, for the category before the weighting. The denominator of 60 seconds used for the calculation is a period of time from a point in time at which a determination period is disclosed to a point in time at which the disclosure ends.

A weighted approach tendency value (time ratio) for each category is calculated by multiplying an approach tendency value (time ratio) and the weight (=the degree of the effect of the environment where a field of vision is not good). In the example illustrated in FIG. 30, "0.05" (=0.18×0.25) is recorded in the "weighted approach tendency value (time ratio)" field corresponding to the category ID "1". "0.06" (=0.25×0.25) is recorded in the "weighted avoidance tendency value (time ratio)" field of the category ID "1" (=category "D").

Categorical Social Behavior Tendency Recording Data Table

FIG. 31 illustrates an example of a categorical social behavior tendency recording data table 1120 according to the third embodiment. The categorical social behavior tendency recording data table 1120 includes the same fields as the categorical social behavior tendency recording data table 1030 illustrated in FIG. 25.

Social Behavior Tendency Recording Data Table

FIG. 32 illustrates an example of a social behavior tendency recording data table 1130 according to the third embodiment. The social behavior tendency recording data table 1130 includes the same fields as the social behavior tendency recording data table 1040 illustrated in FIG. 26.

In the social behavior tendency analysis unit 125 illustrated in FIG. 28, the functions of the social behavior basic information calculation section 701, the social behavior value calculation section 703, the social behavior approach/avoidance determination section 704, the social behavior sharing control section 706, the categorical social behavior tendency value calculation section 710, the social behavior categorical weight calculation section 720, and the overall time duration social behavior tendency determination section 721 are achieved when a program installed on the image generation apparatus 110 causes the CPU 501 to perform a process.

Process for Collecting and Determining Social Behavior Information

A process for collecting and determining social behavior information according to the third embodiment is the same as that according to the first embodiment illustrated in the flowcharts of FIGS. 18 and 19, and description thereof is omitted.

Process for Determining Social Behavior Tendency

Figure 33:
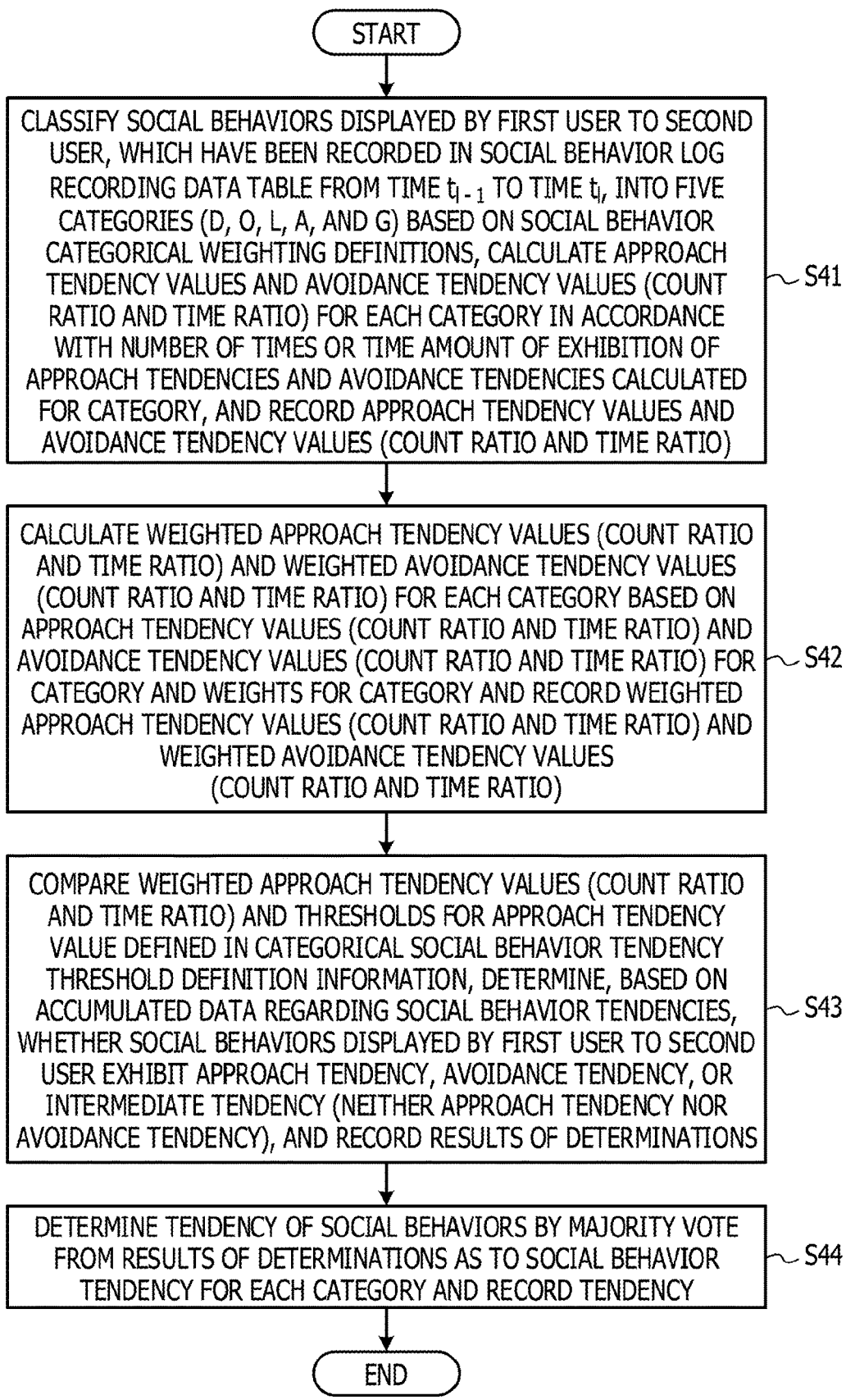
FIG. 33 is a flowchart illustrating an example of a process for determining a social behavior tendency according to the third embodiment.

Next, an example of a process for determining a social behavior tendency according to the third embodiment will be described with reference to FIG. 33. FIG. 33 is a flowchart illustrating an example of the process for determining a social behavior tendency according to the third embodiment.

It is assumed that input data on the process for determining a social behavior tendency according to the present embodiment is social behaviors displayed by the first user to the second user in the certain time period t. The number of times or the duration of social behaviors that exhibit an approach tendency (the first user physically moves closer to the second user, turns his/her upper body to the second user, or the like) or an avoidance tendency (the first user physical moves farther from the second user, turns his/her upper body away from the second user, or the like) displayed by the user A to the user B in the time period t, for example, is calculated by obtaining changes in positions and orientations of body parts of the avatar AV1 relative to the avatar AV2 based on information regarding the positions and the orientations of the body parts (at least a head, arms, hands, a chest, a hip, a bottom, legs, and feet) of the avatar AV1 and expansion and contraction of skin and muscle of the avatar AV1 in a coordinate system of a space.

In the process for determining a social behavior tendency according to the present embodiment, the input data is collected for each category, in which degrees of an effect of an environment (for example, a field of vision is not good) are similar to each other between behaviors, as behaviors that exhibit an approach tendency or an avoidance tendency and weighted by a degree of the effect of the environment for the category, and output data is obtained by determining an overall approach tendency value and an overall avoidance tendency value for all the category (for example, obtaining averages) while assuming that the output data is affected by the environment. The data output in this process indicates an overall tendency (an approach tendency, an avoidance tendency, or an intermediate tendency (a tendency that does not fall into an approach tendency or an avoidance tendency)) in the time period t.

More specifically, after the process illustrated in FIG. 33 starts, for example, the categorical social behavior tendency value calculation section 710 classifies data regarding social behaviors displayed by the first user to the second user, which have been recorded in the social behavior log recording data table 850 from the previous update timing $t_{l-1}$ to the current update timing $t_l$, into categories based on the social behavior category classification definition information 1000 (step S41). The categorical social behavior tendency value calculation section 710 calculates an approach tendency value (count ratio) and an avoidance tendency value (count ratio) for each category in accordance with the number of times of exhibition of an approach tendency and an avoidance tendency for the category and records the approach tendency value (count ratio) and the avoidance tendency value (count ratio) in the categorical weighted social behavior tendency value recording data table 1110 (step S41).

The categorical social behavior tendency value calculation section 710 also calculates an approach tendency value (time ratio) and an avoidance tendency value (time ratio) for each category in accordance with the time amount of exhibition of approach tendencies and avoidance tendencies for the category and records the approach tendency value (time ratio) and the avoidance tendency value (time ratio) in the categorical weighted social behavior tendency value recording data table 1110 (step S41). An approach tendency value and an avoidance tendency value may be calculated in terms of either a count ratio or a time ratio or may be calculated in terms of both.

Next, the social behavior categorical weight calculation section 720 calculates a weighted approach tendency value (count ratio) and a weighted avoidance tendency value (count ratio) for each category based on the approach tendency value (count ratio) and the avoidance tendency value (count ratio) for the category and the weight defined in the print job property screen 1100. The social behavior categorical weight calculation section 720 then records the weighted approach tendency value (count ratio) and the weighted avoidance tendency value (count ratio) in the categorical weighted social behavior tendency value recording data table 1110 (step S42).

The social behavior categorical weight calculation section 720 also calculates a weighted approach tendency value (time ratio) and a weighted avoidance tendency value (time ratio) for each category based on the approach tendency value (time ratio) and the avoidance tendency value (time ratio) for the category and the weight defined in the print job property screen 1100. The social behavior categorical weight calculation section 720 then records the weighted approach tendency value (time ratio) and the weighted avoidance tendency value (time ratio) in the categorical weighted social behavior tendency value recording data table 1110 (step S42).

Next, the overall time duration social behavior tendency determination section 721 compares the weighted approach tendency value (count ratio) and the threshold for the approach tendency value for the category defined in the "threshold-count ratio" field of the categorical social behavior tendency threshold definition information 1010. The overall time duration social behavior tendency determination section 721 also compares the weighted avoidance tendency value (count ratio) and the threshold for the avoidance tendency value for the category defined in the "threshold-count ratio" field of the categorical social behavior tendency threshold definition information 1010. The overall time duration social behavior tendency determination section 721 determines, as a result of the comparison for each category, whether the social behaviors displayed by the first user to the second user exhibit an approach tendency, an avoidance tendency, or an intermediate tendency, and records a result of the determination in the "social behavior tendency" field of the categorical social behavior tendency recording data table 1120 (step S43).

The overall time duration social behavior tendency determination section 721 compares the weighted approach tendency value (time [sec] ratio) and the threshold for the approach tendency value for the category defined in the "threshold-time [sec] ratio" field of the categorical social behavior tendency threshold definition information 1010. The overall time duration social behavior tendency determination section 721 also compares the weighted avoidance tendency value (time [sec] ratio) and the threshold for the avoidance tendency value for the category defined in the "threshold-time [sec] ratio" field of the categorical social behavior tendency threshold definition information 1010. The overall time duration social behavior tendency determination section 721 determines, as a result of the comparison for each category, whether the social behaviors displayed by the first user to the second user exhibit an approach tendency, an avoidance tendency, or an intermediate tendency, and records a result of the determination in the "social behavior tendency" field of the categorical social behavior tendency recording data table 1120 (step S43).

Next, the overall time duration social behavior tendency determination section 721 determines a tendency of the social behaviors displayed by the first user to the second user by a majority vote based on the results of the determination stored in the "social behavior tendency" field of the categorical social behavior tendency recording data table 1120. The overall time duration social behavior tendency determination section 721 records the tendency in the "social behavior tendency" field of the social behavior tendency recording data table 1130 (step S44), and the process ends.

As described above, with the image generation system 100 according to the third embodiment, social behavior tendency values are calculated by weighting social behaviors displayed by the first user to the second user from the time $t_{l-1}$ to the time $t_l$ using a degree of an effect for each category, and an overall tendency of a user (a tendency of the social behaviors of the user) is checked based on the weighted social behavior tendency values for the category. As a result, sharing of a social behavior between the first and second users is controlled in consideration of the degree of the effect for each category, and a relationship between the users that is similar to one in a real space is built in a virtual space.

Fourth Embodiment

Figure 34:
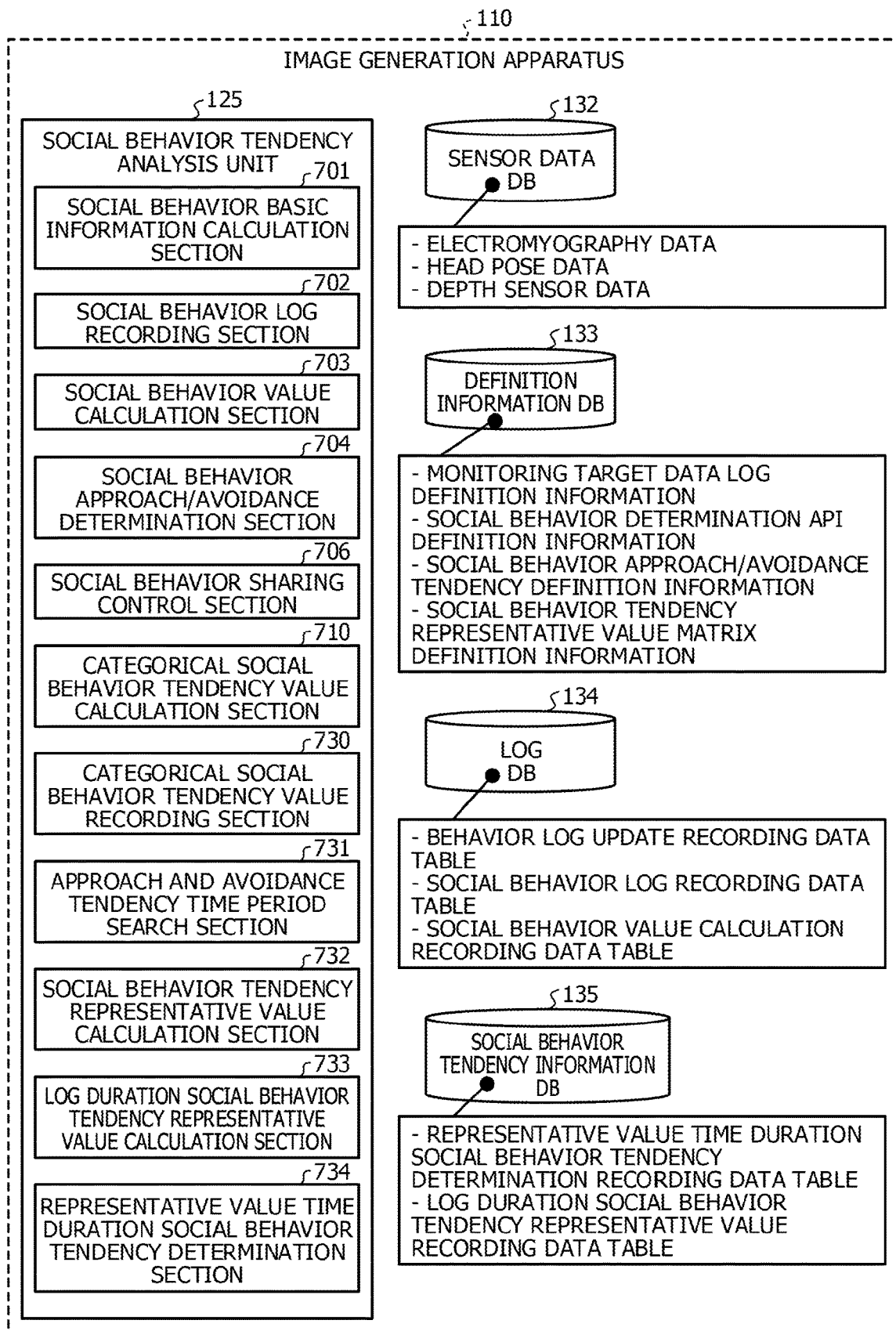
FIG. 34 is a diagram illustrating an example of the functional configuration of a social behavior tendency analysis unit and databases according to a fourth embodiment.

Functional Configuration of Social Behavior Tendency Analysis Unit and Databases Next, the functional configuration of a social behavior tendency analysis unit 125 and databases according to a fourth embodiment will be described with reference to FIG. 34. FIG. 34 illustrates an example of the functional configuration of the social behavior tendency analysis unit 125 and the databases according to the fourth embodiment. The social behavior tendency analysis unit 125 according to the fourth embodiment includes a categorical social behavior tendency value recording section 730, an approach and avoidance tendency time period search section 731, a social behavior tendency representative value calculation section 732, a log duration social behavior tendency representative value calculation section 733, and a representative value time duration social behavior tendency determination section 734, as well as the social behavior basic information calculation section 701, the social behavior log recording section 702, the social behavior value calculation section 703, the social behavior approach/avoidance determination section 704, the social behavior sharing control section 706, and the categorical social behavior tendency value calculation section 710.

The definition information database 133 stores social behavior tendency representative value matrix definition information illustrated in FIG. 35. The social behavior tendency information database 135 stores a representative value time duration social behavior tendency determination recording data table illustrated in FIG. 37 and a log duration social behavior tendency representative value recording data table illustrated in FIG. 36. The functional configuration of the social behavior tendency analysis unit 125 and the databases according to the present embodiment will be described hereinafter.

Categorical Social Behavior Tendency Value Recording Section

The categorical social behavior tendency value recording section 730 stores categorical time duration social behavior tendency values calculated by the categorical social behavior tendency value calculation section 710.

Approach and Avoidance Tendency Time Period Search Section

The approach and avoidance tendency time period search section 731 searches recorded data regarding social behavior tendency values in time duration for each category for a time period in which an approach tendency or an avoidance tendency has been evidently exhibited.

Social Behavior Tendency Representative Value Calculation Section

The social behavior tendency representative value calculation section 732 obtains representative values of a tendency of data regarding social behaviors in a certain time period. The social behavior tendency representative value calculation section 732 calculates, as a matrix of representative values of the social behaviors in the certain time period, a value indicating a ratio of an approach tendency in the certain time period, a value indicating a ratio of an avoidance tendency in the certain time period, and a value indicating a ratio of the approach tendency and the avoidance tendency from a time $j_{l-1}$ to a time $j_l$ (for example, time intervals of 1 second or variable time intervals of several seconds), for example, based on data recorded in the social behavior log recording data table 850.

A method for calculating a matrix of representative values will be described. When a search result period lasts for 600 seconds, namely from a start time of 12:00:00.000 on Feb. 21, 2017 to an end time of 12:10:00.000 on Feb. 21, 2017, for example, the following ratios are calculated for this period.

A representative value matrix [3, 5, 3, 3] in a second row in the example illustrated in FIG. 37 is calculated as follows. That is, for example, the value indicating the ratio of an approach tendency is "Orientation_Face_Directto/Orientation_Upperbody_Directto"=3 as defined in a "value definition" field of social behavior tendency representative value matrix definition information 1210 corresponding to the ratio of an approach tendency.

The value indicating the ratio of an avoidance tendency is "Orientation_Face_Indirectto/Orientation_Upperbody_Indirectto"=5 as defined in the "value definition" field of the social behavior tendency representative value matrix definition information 1210 corresponding to the ratio of an avoidance tendency.

The value indicating the ratio of an approach tendency and an avoidance tendency is "Orientation_Face_Directto/Orientation_Face_Indirectto"=3 and "Orientation_Face_Indirectto/Orientation_Upperbody_Directto"=3 as defined in the "value definition" field of the social behavior tendency representative value matrix definition information 1210 corresponding to the ratio of and an approach tendency and an avoidance tendency.

Log Duration Social Behavior Tendency Representative Value Calculation Section

The log duration social behavior tendency representative value calculation section 733 extracts a time period in which an approach tendency has been evidently exhibited and a time period in which an avoidance tendency has been evidently exhibited from past recorded data regarding a certain log duration using the approach and avoidance tendency time period search section 731 and calculates representative values in the log duration using the social behavior tendency representative value calculation section 732.

Representative Value Time Duration Social Behavior Tendency Determination Section The representative value time duration social behavior tendency determination section 734 compares social behavior tendency representative values in a certain time period with social behavior tendency representative values in a certain log duration to calculate a degree of matching between the social behavior tendency representative values in the certain time period and the social behavior tendency representative values in the certain log duration. As a result, the representative value time duration social behavior tendency determination section 734 determines whether a tendency of social behaviors displayed by the first user to the second user is an approach tendency, an avoidance tendency, or an intermediate tendency.

Social Behavior Tendency Representative Value Matrix Definition Information

FIG. 35 illustrates an example of the social behavior tendency representative value matrix definition information according to the fourth embodiment. The social behavior tendency representative value matrix definition information 1210 includes a "value type" field and the "value definition" field.

The "value type" field stores the ratio of an approach tendency, the ratio of an avoidance tendency, and the ratio of an approach tendency and an avoidance tendency. A value definition is provided for each type.

When the value type is the ratio of an approach tendency, "Orientation_Face_Directto/Orientation_Upperbody_Directto" is defined in the "value definition" field. When the value type is the ratio of an avoidance tendency, "Orientation_Face_Indirectto/Orientation_Upperbody_Indirectto" is defined in the "value definition" field. When the value type is the ratio of and approach tendency and an avoidance tendency, "Orientation_Face_Directto/Orientation_Face_Indirectto" or "Orientation_Face_Indirectto/Orientation_Upperbody_Directto" is defined in the "value definition" field.

Log Duration Social Behavior Tendency Representative Value Recording Data Table

FIG. 36 illustrates an example of the log duration social behavior tendency representative value recording data table according to the fourth embodiment. A log duration social behavior tendency representative value recording data table 1230 includes a "database recording time" field, a "determination period start time" field, a "determination period end time" field, an "active avatar name" field, a "passive avatar name" field, a "time duration evident feature" field, and a "representative value matrix" field.

The "time duration evident feature" field stores a tendency in time duration in which an approach tendency or an avoidance tendency has been evidently exhibited in recorded data regarding social behavior tendency values in a certain time period.

The "representative value matrix" field stores a matrix of representative values in a time period in which an approach tendency or an avoidance tendency has been evidently exhibited at a time when the time period has been extracted.

Representative Value Time Duration Social Behavior Tendency Determination Recording Data Table FIG. 37 illustrates an example of the representative value time duration social behavior tendency determination recording data table according to the fourth embodiment. A representative value time duration social behavior tendency determination recording data table 1220 includes a "database recording time" field, a "determination period start time" field, a "determination period end time" field, an "active avatar name" field, a "passive avatar name" field, a "time duration evident feature" field, a "representative value matrix" field, and a "distance" field.

The "distance" field stores a distance calculated by comparing a representative value matrix recorded in past several days and a representative value matrix obtained for social behavior log recording data in certain time duration.

The fields of the representative value time duration social behavior tendency determination recording data table 1220 illustrated in FIG. 37 other than the "distance" field are the same as those of the log duration social behavior tendency representative value recording data table 1230 illustrated in FIG. 36, and description thereof is omitted.

In the social behavior tendency analysis unit 125 illustrated in FIG. 34, the functions of the social behavior basic information calculation section 701, the social behavior value calculation section 703, the social behavior approach/avoidance determination section 704, the social behavior sharing control section 706, the categorical social behavior tendency value calculation section 710, the categorical social behavior tendency value recording section 730, the approach and avoidance tendency time period search section 731, the social behavior tendency representative value calculation section 732, the log duration social behavior tendency representative value calculation section 733, and the representative value time duration social behavior tendency determination section 734 are achieved, for example, when a program installed on the image generation apparatus 110 causes the CPU 501 to perform a process.

Process for Collecting and Determining Social Behavior Information

A process for collecting and determining social behavior information according to the fourth embodiment is the same as that according to the first embodiment illustrated in FIGS. 18 and 19.

The process may start at the same timing as a process for determining a social behavior tendency according to the fourth embodiment, which will be described next, or may start at a different timing.

The process starts at a time $j_l$, for example, when a certain amount of unprocessed social behavior log recording data or more has been accumulated in the social behavior log recording data table 850 illustrated in FIG. 10, when a certain period of time has elapsed since this process was performed previously, or when a conversation has stopped. The time $j_l$ is a current update timing, a time $j_{l-1}$ is a previous update timing, and a time $j_{l+1}$ is a next update timing.

Process for Calculating Social Behavior Tendency Representative Values

Next, an example of a process for calculating social behavior tendency representative values according to the fourth embodiment will be described with reference to a flowchart of FIG. 38.

After the process starts, the approach and avoidance tendency time period search section 731 searches social behavior log recording data from a time $j_{k-1}$ to a time $j_k$ for time periods in which social behaviors displayed by the first user to the second user have evidently exhibited an approach tendency or an avoidance tendency (step S61). For the search, time intervals of 1 second or variable time intervals of several seconds, for example, may be used. A time period in which an approach tendency or an avoidance tendency has been evidently exhibited refers, for example, to a case where an approach tendency remains exhibited for a certain period of time or a case where a social behavior tendency value for a tendency is significantly larger than those for other tendencies.

Next, the log duration social behavior tendency representative value calculation section 733 extracts, for the time periods in which an approach tendency or an avoidance tendency has been evidently exhibited, time periods in which an approach tendency or an avoidance tendency has been evidently exhibited from past log recording data in a certain log duration using the approach and avoidance tendency time period search section 731. The log duration social behavior tendency representative value calculation section 733 then calculates representative values in the log duration using the social behavior tendency representative value calculation section 732 (step S62), and the process ends.

Process for Determining Social Behavior Tendency

Figure 39:
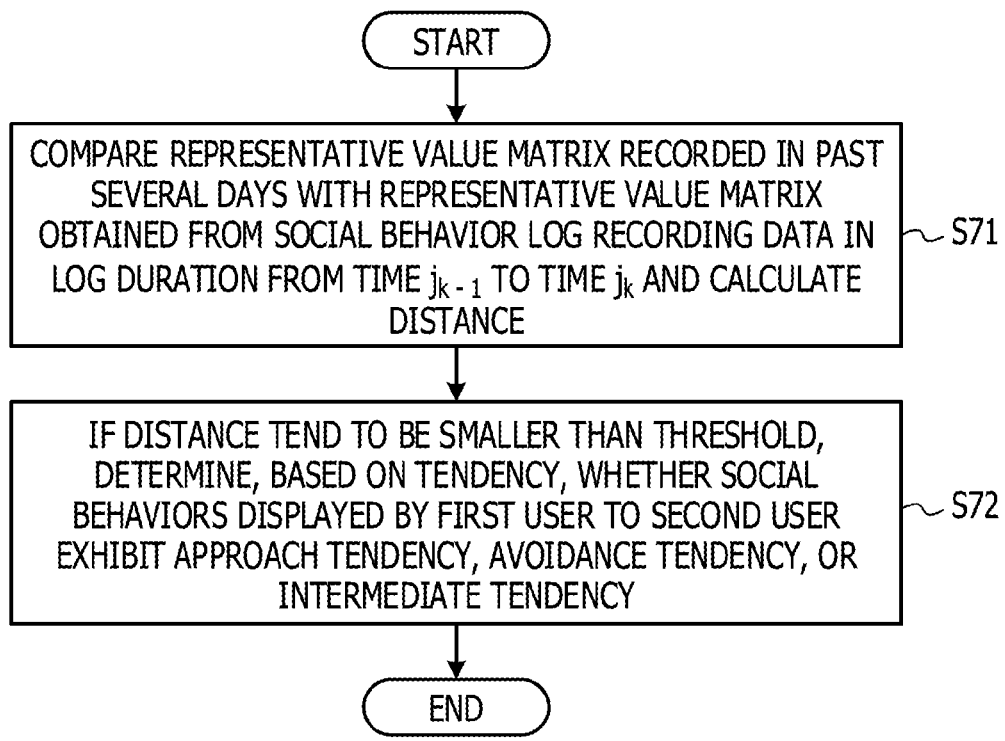
FIG. 39 is a flowchart illustrating an example of a process for determining a social behavior tendency according to the fourth embodiment.

Next, an example of the process for determining a social behavior tendency according to the fourth embodiment will be described with reference to FIG. 39 will be described with reference to a flowchart of FIG. 39.

After the process starts, the representative value time duration social behavior tendency determination section 734 compares a representative value matrix recorded in a past several days (for example, 10 days) with a representative value matrix obtained from social behavior log recording data in a log duration from the time $j_{k-1}$ to the time $j_k$ and calculates a distance (step S71).

Next, if the distance tends to be smaller than a threshold (on average, for example), the representative value time duration social behavior tendency determination section 734 determines, based on the tendency, whether social behaviors displayed by the first user to the second user exhibit an approach tendency, an avoidance tendency, or an intermediate tendency (step S72), and the process ends.

Figure 38:
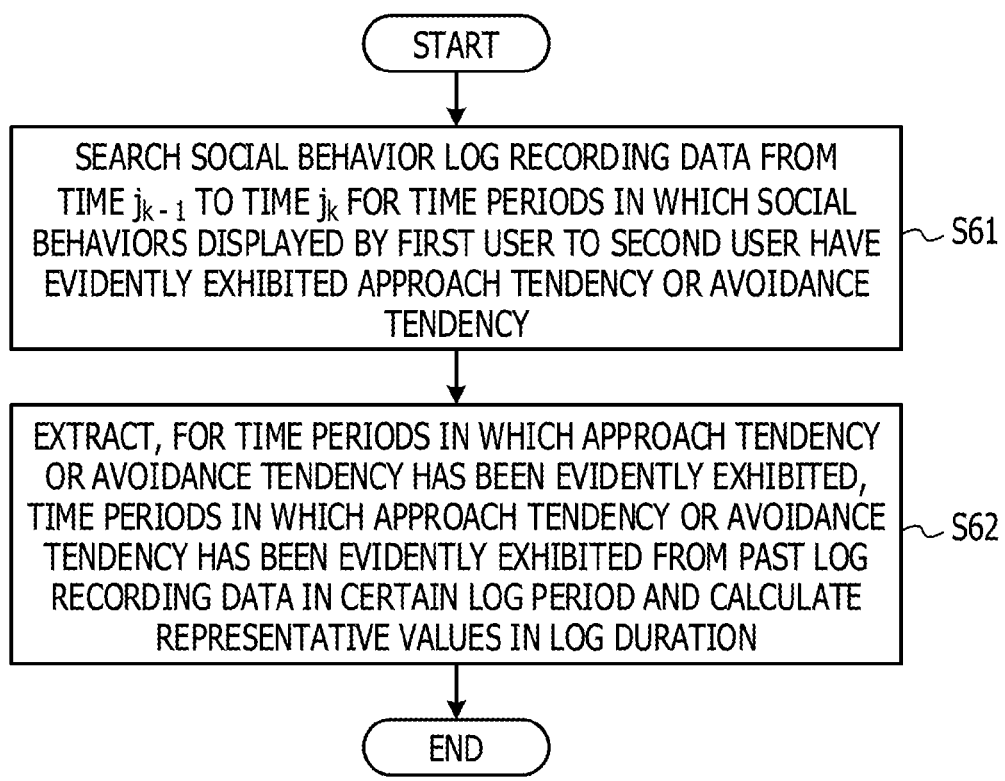
FIG. 38 is a flowchart illustrating an example of a process for calculating social behavior tendency representative values according to the fourth embodiment.

The representative value matrix recorded in the past several days is calculated using the flowchart of FIG. 38. For calculation of a degree of matching, for example, (1−distance between matrices) may be used. A distance between a matrix [3, 5, 3, 3] and a matrix [3, 5, 3, 7], for example, is calculated as sqrt(sqr(3−3)+sqr(5−5)+sqr(3−3)+sqr(3−7))=4. If the threshold for the distance is 5, the calculated distance of 4 is smaller than the threshold, and it is determined that the representative value matrix recorded in the past several days and the representative value matrix obtained from the social behavior log recording data in the log duration from the time $j_{k-1}$ to the time $j_k$ match.

That is, if a calculated distance is smaller than a predetermined threshold, for example, the representative value time duration social behavior tendency determination section 734 determines that a tendency indicating an evident feature in the time period is a tendency of social behaviors displayed by the first user to the second user, and the process ends.

As described above, with the image generation system 100 according to the fourth embodiment, since an overall tendency of social behaviors of a user in a certain time period, namely an approach tendency or an avoidance tendency, changes depending on an environment around the user, the tendency of the social behaviors of the user may be determined based on data regarding time periods in which the social behaviors of the user have evidently exhibited an approach tendency or an avoidance tendency. As a result, sharing of a social behavior between the first user and the second user is controlled more accurately, and a relationship between users that is more similar to one in actual space is built in a virtual space.

The social behavior approach/avoidance determination section 704 is an example of a determination unit that detects behaviors of a user who is a communication target for a certain period of time and that determines a tendency of behaviors of the user in the certain period of time from behavior information regarding the user in the certain period of time.

The time duration social behavior tendency determination section 705, the categorical time duration social behavior tendency determination section 711, the overall time duration social behavior tendency determination section 721, and the representative value time duration social behavior tendency determination section 734 are an example of a determination unit that determines, while referring to a recording unit storing condition information indicating a condition under which a tendency of behaviors of a user is determined and determination information regarding behaviors of the user corresponding to the condition information, whether a tendency of behaviors of the user satisfies the determination condition indicated by the condition information and that determines the behaviors of the user based on the determination information regarding the user's behaviors corresponding to the condition information in accordance with a result of the determination.

According to the above embodiments and modifications, behaviors of a user is detected, and a type of behavior of the user corresponding to the detected behaviors of the user is determined while referring to a storage unit storing types of behavior of the user associated with behaviors of the user.

If a plurality of behaviors of a user are detected and a plurality of types of behavior correspond to the detected behaviors of the user, a behavior reliable in determining a type is selected from the plurality of behaviors, and a type of behavior of the user is determined.

Information for determining a type of social behavior of a user may include condition information indicating a determination condition under which a tendency of behaviors of the user is determined and determination information regarding behaviors of the user corresponding to the condition information. The condition information indicating a determination condition under which a tendency of behaviors of the user is determined and the determination information regarding behaviors of the user corresponding to the condition information, for example, may be information regarding the thresholds and the determinations corresponding to the thresholds defined in the social behavior tendency threshold definition information 900.

Information for determining a type of behavior of a user for each category may include condition information for each category indicating a determination condition under which a tendency of behaviors of the user is determined and determination information regarding behaviors of the user corresponding to the condition information for each category. The information for determining a type of behavior of a user for each category may be, for example, information regarding the thresholds for each category and the determinations corresponding to the thresholds defined in the categorical social behavior tendency threshold definition information 1010.

Certain behaviors of a user may be weighted while referring to a storage unit storing weights indicating degrees of an effect of behaviors of the user, and a type of behavior of the user corresponding to the weighted behaviors of the user may be determined.

A type of behavior of a user corresponding to behaviors of the user detected in a certain time period may be determined based on a type of behavior of the user determined for behaviors of the user detected in a different time period. An example of behaviors of a user detected in a certain time period is information recorded in the social behavior log recording data table 850 from the time $j_{l-1}$ to the time $j_l$. The different time period may be, for example, a time period in which an approach tendency or an avoidance tendency has been evidently exhibited in past recorded data in a certain log duration (for example, 10 days), which is obtained, for example, from the social behavior log recording data table 850.

Although the determination program, the determination method, and the image generation apparatus have been described based on the above embodiments, a determination program, a determination method, and an image generation apparatus according to embodiments are not limited to those according to the above embodiments and may be altered and modified in various ways within the scope of the embodiments. A plurality of embodiments and modifications may be combined with each other insofar as no contradiction is caused.

The image generation system according to the embodiments may be used for a technique for helping a user build a relationship similar to one in a real space when an avatar of a partner is presented in the user's field of vision using a VR, AR, or MR technique. It is desired, for example, that a relationship similar to one in a real space be built between an English teacher and a learner in remote learning. In VR, AR, or MR, however, a peripheral visual field, a viewing angle, or the like is not the same as in a real space and it is not easy to see social behaviors of a partner while viewing content in remote learning or the like.

In order to build a relationship in such an environment, the image generation system according to the embodiments, which enables (especially in an environment where the user's field of vision is not good, for example) a user and a partner to share information indicating presence or absence of a behavior of the partner that exhibits an approach tendency or an avoidance tendency and a type of behavior, is beneficial. That is, with the image generation system according to the embodiments, for example, sharing of a social behavior between the first and second users is controlled more accurately, and a relationship between the first and second users that is similar to one in a real space is built in a virtual space.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determination apparatus comprising:
   one or more memories; and
   one or more processors coupled to the one or more memories and the one or more processors configured to
      perform, on the basis of data detected by a sensor that measures a first user who operates a first avatar, detection of a first behavior of the first user,
      determine a first type of behavior corresponding to the detected first behavior by referring to information indicating correspondence between a plurality of behaviors and a plurality of types of behavior,
      identify, for each category which classifies the determined first type of behavior, a tendency amount indicating an approach from the first user to a second user who operates a second avatar and an avoidance from the first user to the second user, and
      when a result of calculation using the identified tendency amount for each the category is not a result indicating the approach and avoidance, perform, on the basis of a behavior tendency of the first user determined in accordance with the first type of behavior, control of an output which amplifies the behavior of the second avatar in an environment where the first avatar exists.

2. The determination apparatus according to claim 1, wherein the detection is performed on the basis of a relationship between the first avatar and a second avatar in the environment.

3. The determination apparatus according to claim 2, wherein the output relates to the second avatar.

4. The determination apparatus according to claim 1, wherein the plurality of types of behavior includes at least one of a type relating to a distance between an avatar and another avatar, a type relating to an orientation of the avatar's body, a type relating to an inclination of the avatar's body, a type relating to the avatar's attention, and a type relating to the avatar's gesture.

5. The determination apparatus according to claim 1, wherein the behavior tendency of the first user is one of an approach tendency, an avoidance tendency, and an intermediate tendency.

6. The determination apparatus according to claim 1, wherein the one or more processors are configured to
   detect a first plurality of behaviors of the first user in a time period in which the first behavior has been detected,
   determine a first plurality of types of behavior corresponding to the first plurality of behaviors, and
   perform determination of the behavior tendency of the first user in accordance with the first type of behavior and the first plurality of types of behavior.

7. The determination apparatus according to claim 6, wherein the determination is performed in accordance with a plurality of coefficients corresponding to the first type of behavior and the first plurality of types of behavior by referring to information indicating coefficients corresponding to the plurality of types of behavior.

8. The determination apparatus according to claim 1, wherein the detection includes, when the first behavior includes a first plurality of behaviors and there are a plurality of types of behavior corresponding to the first plurality of behaviors, select, from the plurality of behaviors as the first behavior, a behavior reliable in determining a type of behavior.

9. The determination apparatus according to claim 1, wherein the behavior tendency of the first user is determined in response to at least one of detecting that a change between a first plurality of behaviors of the first user is no more than a threshold, detecting a specific behavior of a second avatar in the environment, and detecting a specific change in the environment.

10. A computer-implemented determination method comprising:
    detecting, on the basis of data detected by a sensor that measures a first user who operates a first avatar, a first behavior of the first user;
    determining a first type of behavior corresponding to the detected first behavior by referring to information indicating correspondence between a plurality of behaviors and a plurality of types of behavior,
    identifying, for each category which classifies the determined first type of behavior, a tendency amount indicating an approach from the first user to a second user who operates a second avatar and an avoidance from the first user to the second user, and
    when a result of calculation using the identified tendency amount for each the category is not a result indicating the approach and avoidance, controlling, on the basis of a behavior tendency of the first user determined in accordance with the first type of behavior, an output which amplifies the behavior of the second avatar in an environment where the first avatar exists.

11. The determination method according to claim 10, wherein the detecting is performed on the basis of a relationship between the first avatar and a second avatar in the environment.

12. The determination method according to claim 11, wherein the output relates to the second avatar.

13. The determination method according to claim 10, wherein the plurality of types of behavior includes at least one of a type relating to a distance between an avatar and another avatar, a type relating to an orientation of the avatar's body, a type relating to an inclination of the avatar's body, a type relating to the avatar's attention, and a type relating to the avatar's gesture.

14. The determination method according to claim 10, wherein the behavior tendency of the first user is one of an approach tendency, an avoidance tendency, and an intermediate tendency.

15. The determination method according to claim 10, further comprising:
   detecting a first plurality of behaviors of the first user in a time period in which the first behavior has been detected,
   determining a first plurality of types of behavior corresponding to the first plurality of behaviors, and
   perform determination of the behavior tendency of the first user in accordance with the first type of behavior and the first plurality of types of behavior.

16. The determination method according to claim 15, wherein the determination is performed in accordance with a plurality of coefficients corresponding to the first type of behavior and the first plurality of types of behavior by referring to information indicating coefficients corresponding to the plurality of types of behavior.

17. The determination method according to claim 10, wherein the detecting includes, when the first behavior includes a first plurality of behaviors and there are a plurality of types of behavior corresponding to the first plurality of behaviors, select, from the plurality of behaviors as the first behavior, a behavior reliable in determining a type of behavior.

18. The determination method according to claim 10, wherein the behavior tendency of the first user is determined in response to at least one of detecting that a change between a first plurality of behaviors of the first user is no more than a threshold, detecting a specific behavior of a second avatar in the environment, and detecting a specific change in the environment.

19. A non-transitory computer-readable medium storing instructions executable by one or more computers, the instructions comprising:
   one or more instructions for detecting, on the basis of data detected by a sensor that measures a first user who operates a first avatar, a first behavior of the first user;
   one or more instructions for determining a first type of behavior corresponding to the detected first behavior by referring to information indicating correspondence between a plurality of behaviors and a plurality of types of behavior;
   one or more instructions for identifying, for each category which classifies the determined first type of behavior, a tendency amount indicating an approach from the first user to a second user who operates a second avatar and an avoidance from the first user to the second user, and
   when a result of calculation using the identified tendency amount for each the category is not a result indicating the approach and avoidance, one or more instructions for controlling, on the basis of a behavior tendency of the first user determined in accordance with the first type of behavior, an output which amplifies the behavior of the second avatar in an environment where the first avatar exists.

* * * * *